US010880322B1

(12) United States Patent
Jakobsson et al.

(10) Patent No.: US 10,880,322 B1
(45) Date of Patent: *Dec. 29, 2020

(54) AUTOMATED TRACKING OF INTERACTION WITH A RESOURCE OF A MESSAGE

(71) Applicant: Agari Data, Inc., San Mateo, CA (US)

(72) Inventors: Bjorn Markus Jakobsson, Portola Valley, CA (US); Patrick Richard Peterson, San Francisco, CA (US)

(73) Assignee: Agari Data, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,739

(22) Filed: Oct. 9, 2018

Related U.S. Application Data

(63) Continuation-in-part of application No. 15/786,126, filed on Oct. 17, 2017, which is a continuation-in-part
(Continued)

(51) Int. Cl.
*H04L 29/06* (2006.01)
*G06F 16/955* (2019.01)
(Continued)

(52) U.S. Cl.
CPC ...... *H04L 63/1425* (2013.01); *G06F 16/9558* (2019.01); *G06F 16/9566* (2019.01);
(Continued)

(58) Field of Classification Search
CPC . H04L 63/1425; H04L 51/08; H04L 63/1416; G06F 16/9558; G06F 16/9566; G06F 21/602
(Continued)

(56) References Cited

U.S. PATENT DOCUMENTS 6,073,142 A  6/2000 Geiger
6,161,130 A  12/2000 Horvitz
(Continued)

FOREIGN PATENT DOCUMENTS

JP  2011100489  5/2011
WO  2018213457  11/2018

OTHER PUBLICATIONS

Caching Context Information in Persvasive System Ricky Robinson, Mylione Ahandarajah, Jadwiga Indulska MDS '06: Proceedings of the 3rd International Middleware doctoral Symposium. Nov. 2006, pp. 1 (Year: 2006) (Year: 2006).*
(Continued)

*Primary Examiner* — Noura Zoubair
*Assistant Examiner* — Mohammad S Shams
(74) *Attorney, Agent, or Firm* — Van Pelt, Yi & James LLP

(57) ABSTRACT

Information of an electronic message to be delivered to an intended recipient is received. For an original resource identifier included in the electronic message, a corresponding alternative resource identifier that can be at least in part used to obtain the original resource identifier is determined. The original resource identifier included in the electronic message is replaced with the corresponding alternative resource identifier to generate a modified electronic message. The modified electronic message with the alternative resource identifier is allowed to be delivered to the intended recipient instead of the electronic message with the original resource identifier. An interaction associated with the original resource identifier is tracked using the alternative resource identifier.

20 Claims, 17 Drawing Sheets

Related U.S. Application Data of application No. 15/453,737, filed on Mar. 8, 2017, now Pat. No. 9,847,973, application No. 16/155,739, which is a continuation-in-part of application No. 15/980,566, filed on May 15, 2018.

(60) Provisional application No. 62/570,559, filed on Oct. 10, 2017, provisional application No. 62/412,196, filed on Oct. 24, 2016, provisional application No. 62/399,821, filed on Sep. 26, 2016, provisional application No. 62/508,840, filed on May 19, 2017.

(51) Int. Cl.
*H04L 12/58* (2006.01)
*G06F 21/60* (2013.01)

(52) U.S. Cl.
CPC ............ *G06F 21/602* (2013.01); *H04L 51/08* (2013.01); *H04L 63/1416* (2013.01)

(58) Field of Classification Search
USPC .......................................................... 726/23
See application file for complete search history.

(56) References Cited

U.S. PATENT DOCUMENTS

| | | | |
|---|---|---|---|
| 6,574,658 B1 | 6/2003 | Gabber | |
| 6,721,784 B1 | 4/2004 | Leonard | |
| 7,293,063 B1 | 11/2007 | Sobel | |
| 7,299,261 B1 | 11/2007 | Oliver | |
| 7,464,408 B1 | 12/2008 | Shah | |
| 7,644,274 B1 | 1/2010 | Jakobsson | |
| 7,748,038 B2 | 6/2010 | Olivier | |
| 7,797,752 B1 | 9/2010 | Vaidya | |
| 7,809,795 B1 | 10/2010 | Cooley | |
| 7,809,796 B1 | 10/2010 | Bloch | |
| 7,814,545 B2 | 10/2010 | Oliver | |
| 7,831,522 B1 | 11/2010 | Satish | |
| 7,854,007 B2 | 12/2010 | Sprosts | |
| 7,899,213 B2 | 3/2011 | Otsuka | |
| 7,899,866 B1 | 3/2011 | Buckingham | |
| 7,917,655 B1 | 3/2011 | Coomer | |
| 7,941,842 B2 | 5/2011 | Prince | |
| 8,010,614 B1 | 8/2011 | Musat | |
| 8,131,655 B1 | 3/2012 | Cosoi | |
| 8,214,490 B1 | 7/2012 | Vos | |
| 8,230,505 B1 | 7/2012 | Ahrens | |
| 8,255,572 B1 | 8/2012 | Coomer | |
| 8,365,258 B2 | 1/2013 | Dispensa | |
| 8,489,689 B1 | 7/2013 | Sharma | |
| 8,560,962 B2 | 10/2013 | Wang | |
| 8,566,938 B1 | 10/2013 | Prakash | |
| 8,572,184 B1 | 10/2013 | Cosoi | |
| 8,583,915 B1 | 11/2013 | Huang | |
| 8,667,069 B1 | 3/2014 | Connelly | |
| 8,667,074 B1 | 3/2014 | Farkas | |
| 8,667,581 B2 | 3/2014 | Steeves | |
| 8,676,155 B2 | 3/2014 | Fan | |
| 8,719,940 B1 | 5/2014 | Higbee | |
| 8,752,172 B1 | 6/2014 | Dotan | |
| 8,769,684 B2 | 7/2014 | Stolfo | |
| 8,813,228 B2 | 8/2014 | Magee | |
| 8,832,202 B2 | 9/2014 | Yoshioka | |
| 8,880,604 B2 | 11/2014 | Chen | |
| 8,904,524 B1 | 12/2014 | Hodgman | |
| 8,949,353 B1 | 2/2015 | Beguin | |
| 8,959,163 B1 | 2/2015 | Ledet | |
| 8,984,640 B1 | 3/2015 | Emigh | |
| 8,996,042 B1 | 3/2015 | Hannigan | |
| 9,009,829 B2 | 4/2015 | Stolfo | |
| 9,027,134 B2 | 5/2015 | Foster | |
| 9,060,057 B1 | 6/2015 | Danis | |
| 9,154,514 B1 | 10/2015 | Prakash | |
| 9,203,791 B1 | 12/2015 | Olomskiy | |
| 9,245,115 B1 | 1/2016 | Jakobsson | |
| 9,258,314 B1 | 2/2016 | Xiao | |
| 9,277,049 B1 | 3/2016 | Danis | |
| 9,332,022 B1 | 5/2016 | Ashley | |
| 9,338,026 B2 | 5/2016 | Bandini | |
| 9,338,287 B1 | 5/2016 | Russo | |
| 9,471,714 B2 | 10/2016 | Iwasaki | |
| 9,473,437 B1 | 10/2016 | Jakobsson | |
| 9,491,155 B1 | 11/2016 | Johansson | |
| 9,501,639 B2 | 11/2016 | Stolfo | |
| 9,560,506 B2 | 1/2017 | Gudlavenkatasiva | |
| 9,613,341 B2 | 4/2017 | Shivakumar | |
| 9,654,492 B2 | 5/2017 | Maylor | |
| 9,781,149 B1 | 10/2017 | Himler | |
| 9,800,589 B1 | 10/2017 | Asveren | |
| 9,847,973 B1 * | 12/2017 | Jakobsson | ........... H04L 63/0254 |
| 9,906,554 B2 | 2/2018 | Higbee | |
| 9,910,984 B2 | 3/2018 | Valencia | |
| 9,940,482 B1 | 4/2018 | Nichols | |
| 10,122,715 B2 | 11/2018 | Dispensa | |
| 2002/0138271 A1 | 9/2002 | Shaw | |
| 2002/0184315 A1 | 12/2002 | Earnest | |
| 2003/0009694 A1 | 1/2003 | Wenocur | |
| 2003/0023736 A1 | 1/2003 | Abkemeier | |
| 2003/0200108 A1 | 10/2003 | Malnoe | |
| 2003/0225850 A1 | 12/2003 | Teague | |
| 2003/0229672 A1 | 12/2003 | Kohn | |
| 2003/0236845 A1 | 12/2003 | Pitsos | |
| 2004/0073617 A1 | 4/2004 | Milliken | |
| 2004/0148358 A1 | 7/2004 | Singh | |
| 2004/0176072 A1 | 9/2004 | Gellens | |
| 2004/0177120 A1 | 9/2004 | Kirsch | |
| 2004/0203589 A1 | 10/2004 | Wang | |
| 2004/0215977 A1 | 10/2004 | Goodman | |
| 2005/0021649 A1 | 1/2005 | Goodman | |
| 2005/0033810 A1 | 2/2005 | Malcolm | |
| 2005/0060643 A1 | 3/2005 | Glass | |
| 2005/0076084 A1 | 4/2005 | Loughmiller | |
| 2005/0076240 A1 | 4/2005 | Appleman | |
| 2005/0080857 A1 | 4/2005 | Kirsch | |
| 2005/0091320 A1 | 4/2005 | Kirsch | |
| 2005/0097320 A1 | 5/2005 | Golan | |
| 2005/0182735 A1 | 8/2005 | Zager | |
| 2005/0188023 A1 | 8/2005 | Doan | |
| 2005/0188045 A1 | 8/2005 | Katsikas | |
| 2005/0198173 A1 | 9/2005 | Evans | |
| 2005/0216587 A1 | 9/2005 | John | |
| 2005/0223076 A1 | 10/2005 | Barrus | |
| 2005/0235065 A1 | 10/2005 | Le | |
| 2005/0257261 A1 | 11/2005 | Shraim | |
| 2005/0283837 A1 | 12/2005 | Olivier | |
| 2006/0004772 A1 | 1/2006 | Hagan | |
| 2006/0015563 A1 | 1/2006 | Judge | |
| 2006/0026242 A1 | 2/2006 | Kuhlmann | |
| 2006/0031306 A1 | 2/2006 | Haverkos | |
| 2006/0037075 A1 | 2/2006 | Frattura | |
| 2006/0053279 A1 | 3/2006 | Coueignoux | |
| 2006/0053490 A1 | 3/2006 | Herz | |
| 2006/0085505 A1 | 4/2006 | Gillum | |
| 2006/0101334 A1 | 5/2006 | Liao | |
| 2006/0107323 A1 | 5/2006 | McLean | |
| 2006/0149821 A1 | 7/2006 | Rajan | |
| 2006/0153380 A1 * | 7/2006 | Gertner | ................. G06F 21/602 380/221 |
| 2006/0161989 A1 | 7/2006 | Reshef | |
| 2006/0168024 A1 | 7/2006 | Mehr | |
| 2006/0168329 A1 | 7/2006 | Tan | |
| 2006/0195542 A1 | 8/2006 | Nandhra | |
| 2006/0206713 A1 | 9/2006 | Hickman | |
| 2006/0224677 A1 | 10/2006 | Ishikawa | |
| 2006/0230461 A1 | 10/2006 | Hauser | |
| 2006/0253597 A1 | 11/2006 | Mujica | |
| 2006/0259558 A1 | 11/2006 | Yen | |
| 2006/0265498 A1 | 11/2006 | Turgeman | |
| 2006/0277259 A1 | 12/2006 | Murphy | |
| 2006/0282660 A1 | 12/2006 | Varghese | |
| 2007/0019235 A1 | 1/2007 | Lee | |
| 2007/0027992 A1 | 2/2007 | Judge | |
| 2007/0038718 A1 | 2/2007 | Khoo | |

(56) References Cited

U.S. PATENT DOCUMENTS

| | | |
|---|---|---|
| 2007/0067465 A1 | 3/2007 | Blinn |
| 2007/0078936 A1 | 4/2007 | Quinlan |
| 2007/0079379 A1 | 4/2007 | Sprosts |
| 2007/0086592 A1 | 4/2007 | Ellison |
| 2007/0100944 A1 | 5/2007 | Ford |
| 2007/0101423 A1 | 5/2007 | Oliver |
| 2007/0107053 A1 | 5/2007 | Shraim |
| 2007/0130618 A1 | 6/2007 | Chen |
| 2007/0136573 A1 | 6/2007 | Steinberg |
| 2007/0136806 A1 | 6/2007 | Berman |
| 2007/0143407 A1 | 6/2007 | Avritch |
| 2007/0143432 A1 | 6/2007 | Klos |
| 2007/0192169 A1 | 8/2007 | Herbrich |
| 2007/0198642 A1 | 8/2007 | Malik |
| 2007/0208850 A1 | 9/2007 | Lin |
| 2007/0214495 A1 | 9/2007 | Royer |
| 2007/0239639 A1 | 10/2007 | Loughmiller |
| 2007/0271343 A1 | 11/2007 | George |
| 2007/0276907 A1 | 11/2007 | Maes |
| 2007/0289018 A1 | 12/2007 | Steeves |
| 2007/0299916 A1 | 12/2007 | Bates |
| 2008/0004049 A1 | 1/2008 | Yigang |
| 2008/0022107 A1 | 1/2008 | Pickles |
| 2008/0046970 A1 | 2/2008 | Oliver |
| 2008/0050014 A1 | 2/2008 | Bradski |
| 2008/0098237 A1 | 4/2008 | Dung |
| 2008/0104235 A1 | 5/2008 | Oliver |
| 2008/0141374 A1 | 6/2008 | Sidiroglou |
| 2008/0175266 A1 | 7/2008 | Alperovitch |
| 2008/0178288 A1 | 7/2008 | Alperovitch |
| 2008/0235794 A1 | 9/2008 | Bogner |
| 2008/0276315 A1 | 11/2008 | Shuster |
| 2008/0290154 A1 | 11/2008 | Barnhardt |
| 2009/0037350 A1 | 2/2009 | Rudat |
| 2009/0064330 A1 | 3/2009 | Shraim |
| 2009/0089859 A1 | 4/2009 | Cook |
| 2009/0157708 A1 | 6/2009 | Bandini |
| 2009/0210708 A1 | 8/2009 | Chou |
| 2009/0228583 A1 | 9/2009 | Pocklington |
| 2009/0252159 A1 | 10/2009 | Lawson |
| 2009/0260064 A1 | 10/2009 | McDowell |
| 2009/0292781 A1 | 11/2009 | Teng |
| 2009/0319629 A1 | 12/2009 | De Guerre |
| 2010/0030798 A1 | 2/2010 | Kumar |
| 2010/0043071 A1 | 2/2010 | Wang |
| 2010/0054443 A1 | 3/2010 | Bhattiprolu |
| 2010/0070761 A1 | 3/2010 | Gustave |
| 2010/0077483 A1 | 3/2010 | Stolfo |
| 2010/0082758 A1 | 4/2010 | Golan |
| 2010/0094887 A1 | 4/2010 | Ye |
| 2010/0095374 A1 | 4/2010 | Gillum |
| 2010/0115040 A1 | 5/2010 | Sargent |
| 2010/0145900 A1 | 6/2010 | Zheng |
| 2010/0198928 A1 | 8/2010 | Almeida |
| 2010/0235636 A1 | 9/2010 | Cohen |
| 2010/0257222 A1 | 10/2010 | Hamilton, II |
| 2010/0287246 A1 | 11/2010 | Klos |
| 2010/0299399 A1 | 11/2010 | Wanser |
| 2010/0313253 A1 | 12/2010 | Reiss |
| 2011/0061089 A1 | 3/2011 | O'Sullivan |
| 2011/0066687 A1 | 3/2011 | Chen |
| 2011/0087485 A1 | 4/2011 | Maude |
| 2011/0145152 A1 | 6/2011 | McCown |
| 2011/0191688 A1 | 8/2011 | Hasegawa |
| 2011/0191847 A1 | 8/2011 | Davis |
| 2011/0214187 A1 | 9/2011 | Wittenstein |
| 2011/0271349 A1 | 11/2011 | Kaplan |
| 2011/0294478 A1 | 12/2011 | Trivi |
| 2012/0030293 A1 | 2/2012 | Bobotek |
| 2012/0084866 A1 | 4/2012 | Stolfo |
| 2012/0136780 A1 | 5/2012 | El-Awady |
| 2012/0167233 A1 | 6/2012 | Gillum |
| 2012/0192258 A1 | 7/2012 | Spencer |
| 2012/0227104 A1 | 9/2012 | Sinha |
| 2012/0242488 A1 | 9/2012 | Wilson |
| 2012/0246725 A1 | 9/2012 | Osipkov |
| 2012/0253810 A1 | 10/2012 | Sutton |
| 2012/0278694 A1 | 11/2012 | Washio |
| 2012/0311703 A1 | 12/2012 | Yanovsky |
| 2013/0060905 A1 | 3/2013 | Mickens |
| 2013/0067012 A1 | 3/2013 | Matzkel |
| 2013/0081142 A1 | 3/2013 | McDougal |
| 2013/0083129 A1 | 4/2013 | Thompson |
| 2013/0104198 A1 | 4/2013 | Grim |
| 2013/0128883 A1 | 5/2013 | Lawson |
| 2013/0185775 A1 | 7/2013 | Dispensa |
| 2013/0263226 A1 | 10/2013 | Sudia |
| 2013/0305318 A1 | 11/2013 | Deluca |
| 2013/0318580 A1 | 11/2013 | Gudlavenkatasiva |
| 2013/0346528 A1 | 12/2013 | Shinde |
| 2014/0007238 A1 | 1/2014 | Magee |
| 2014/0082726 A1 | 3/2014 | Dreller |
| 2014/0214895 A1 | 7/2014 | Higgins |
| 2014/0230061 A1* | 8/2014 | Higbee ............... H04L 63/1433 726/24 |
| 2014/0245396 A1 | 8/2014 | Oberheide |
| 2014/0250506 A1 | 9/2014 | Hallam-Baker |
| 2014/0258420 A1 | 9/2014 | Dent |
| 2014/0259158 A1* | 9/2014 | Brown ................... H04L 51/08 726/22 |
| 2014/0340822 A1 | 11/2014 | Lal |
| 2014/0366144 A1 | 12/2014 | Alperovitch |
| 2015/0030156 A1 | 1/2015 | Perez |
| 2015/0033343 A1* | 1/2015 | Jiang ................... H04L 63/1416 726/23 |
| 2015/0067833 A1 | 3/2015 | Verma |
| 2015/0081722 A1 | 3/2015 | Terada |
| 2015/0100896 A1 | 4/2015 | Shmarovoz |
| 2015/0113627 A1 | 4/2015 | Curtis |
| 2015/0148006 A1 | 5/2015 | Skudlark |
| 2015/0156154 A1 | 6/2015 | Russell |
| 2015/0172233 A1 | 6/2015 | She |
| 2015/0216413 A1 | 8/2015 | Soyao |
| 2015/0236990 A1 | 8/2015 | Shan |
| 2015/0288714 A1* | 10/2015 | Emigh ............... H04L 63/1441 726/22 |
| 2015/0326510 A1 | 11/2015 | Tomlinson |
| 2015/0334065 A1 | 11/2015 | Yan |
| 2015/0363839 A1 | 12/2015 | Zolty |
| 2015/0371212 A1 | 12/2015 | Giordano |
| 2015/0381653 A1* | 12/2015 | Starink ................... G06F 16/22 726/22 |
| 2016/0012222 A1 | 1/2016 | Stolfo |
| 2016/0014151 A1 | 1/2016 | Prakash |
| 2016/0037270 A1 | 2/2016 | Polinske |
| 2016/0087925 A1 | 3/2016 | Kalavagattu |
| 2016/0094566 A1 | 3/2016 | Parekh |
| 2016/0104132 A1 | 4/2016 | Abbatiello |
| 2016/0210662 A1* | 7/2016 | Duggal ............... G06Q 30/0251 |
| 2016/0225897 A1 | 8/2016 | Sridhar |
| 2016/0269437 A1* | 9/2016 | McDougal ............... H04L 51/08 |
| 2016/0277485 A1* | 9/2016 | Abrams ................... H04L 67/10 |
| 2016/0352840 A1 | 12/2016 | Negron |
| 2016/0359790 A1 | 12/2016 | Zhang |
| 2017/0005961 A1* | 1/2017 | Liebmann ............... H04L 51/18 |
| 2017/0078321 A1* | 3/2017 | Maylor ............... H04L 63/1433 |
| 2017/0085584 A1* | 3/2017 | Goutal ................... G06N 20/00 |
| 2017/0091274 A1 | 3/2017 | Guo |
| 2017/0126661 A1 | 5/2017 | Brannon |
| 2017/0195310 A1 | 7/2017 | Tyler |
| 2017/0206545 A1* | 7/2017 | Gupta ................... G06Q 30/0226 |
| 2017/0251006 A1* | 8/2017 | LaRosa ............... H04L 63/1425 |
| 2017/0324767 A1* | 11/2017 | Srivastava ............. H04L 51/12 |
| 2017/0331816 A1 | 11/2017 | Votaw |
| 2017/0331824 A1 | 11/2017 | Pender |
| 2018/0091453 A1 | 3/2018 | Jakobsson |
| 2018/0131686 A1 | 5/2018 | Brannon |
| 2018/0160387 A1 | 6/2018 | Chastain |
| 2018/0184289 A1 | 6/2018 | Dudley |
| 2018/0343246 A1 | 11/2018 | Benayed |

(56) References Cited

U.S. PATENT DOCUMENTS

2019/0012478 A1   1/2019   Narayanaswamy
2020/0067861 A1   2/2020   Leddy

OTHER PUBLICATIONS

Context Information-based application access central model Young-Gab Kim, Yonghan Lee IMCOM '16: Proceddings of the 10th International Conferenec on Ubiquidous Information Management and Communication. Jan. 2016, Article No. 75, pp. 1-5 (Year: 2016) (Year: 2016).*
A Security pass for messages: message keys Adrian E. McElligott CEAS '11: Proceedings of the 8th Annual Collaboration, Electronic messaging, Anti-abuse and Spam Conference. pp. 184-192 (Year: 2011).*
Efficient hardware implementations of high throughput SHA-3 candidates keccak, luffa and blue midnight wish for single- and multi-message hashing Abdulkadir Akin, Aydin Aysu, Onur Can Ulusel, SIN '10: Proceedings of the 3rd international confrence on security of information and network. pp. 168-177 (Year: 2010).*
Traceback for End-to-End Encrypted Messaging Nirvan Tyagi, Ian Miers, Thomas Ristenpart CCS '19: Proceeding of 2019 ACM SIGSAC Confrence on Computer and Communications Security. pp. 4134-4430 (Year: 2019).*
A. Whitten and J. D. Tygar. Why Johnny Can't Encrypt: A Usability Evaluation of PGP 5.0. In Proceedings of the 8th conference on USENIX Security Symposium—vol. 8, SSYM'99, Berkeley, CA, USA, 1999. USENIX Association.
Ahonen-Myka et al., "Finding Co-Occuring Text Phrases by Combining Sequence and Frequent Set Discovery", Proceedings of the 16th International Joint Conference on Artificial Intelligence IJCAI-99 Workshop on Text Mining: Foundations, Techniques, and Applications, (Jul. 31, 1999) 1-9.
Author Unknown, "An Effective Solution for Spam", downloaded from "https://web.archive.org/web/20050203011232/http:/home.nyc.rr.com/spamsolution/An%20Effective%20Solution%20for%20Spam.htm", Feb. 3, 2005.
Author Unknown, "Babastik: AntiSpam Personal", downloaded from "https://web.archive.org/web/20101031061734/babastik.com/AntiSpam-Personal/", Oct. 31, 2010.
Author Unknown, "bluebottle—trusted delivery", downloaded from "https://web.archive.org/web/20140715223712/https://bluebottle.com/trusted-delivery.php", Jul. 15, 2014.
Author Unknown, "Federal Court Denies Attempt by Mailblocks, Inc. to Shut Down Spamarrest LLC", downloaded from "http://www.spamarrest.com/pr/releases/20030611.jsp", Seattle, WA, Jun. 11, 2003.
Author Unknown, "First of all, Your Software Is Excellent", downloaded from "https://web.archive.org/web/20120182074130/http://www.spamresearchcenter.com/", Aug. 12, 2012.
Author Unknown, "Frequently asked questions regarding Spamboomerang: Test Drive how SPAM Boomerang treats unknown senders", downloaded from "https://web.archive.org/web/20080719034305/http:/www.triveni.com.au/Spamboomerang/Spam_Faq.html", Jul. 19, 2008.
Author Unknown, "Junk Mail Buffering Agent", downloaded from http://www.ivarch.com/programs/jmba.shtml, Jun. 2005.
Author Unknown, "No Software to Install", downloaded from "https://web.archive.org/web/201002095356/http://www.cleanmymailbox.com:80/howitworks.html", Oct. 2, 2010.
Author Unknown, "Rejecting spam with a procmail accept list", downloaded from "https://web.archive.org/web/20160320083258/http:/angel.net/~nic/spam-x/", Mar. 20, 2016.
Author Unknown, "SpamFry: Welcome to our Beta testers", downloaded from https://web.archive.org/web/20050404214637/http:www.spamfry.net:80/, Apr. 4, 2005.
Author Unknown, "Sporkie" From Syncelus Wiki, retrieved from "http://wiki.syncleus.com/index.php?title=Sporkie&oldid=1034 (https://web.archive.org/web/20150905224202/http://wiki.syncleus.com/index.php?title=Sporkie&oldid=1034)", Sep. 2015.
Author Unknown, "Stop Spam Mail, Block Offensive Materials, Save Time and Money", iPermitMail Email Firewall Version 3.0, 2003.
Author Unknown, (Steven)—Artificial Intelligence for your email, downloaded from "https://web.archive.org/web/20140607193205/http://www.softwaredevelopment.net.au:80/pge_steven.htm", Jun. 7, 2014.
Author Unknown, 0Spam.com, Frequently Asked Questions, downloaded from "https://web.archive.org/web/20150428181716/http://www.0spam.com:80/support.shtml#whatisit", Apr. 28, 2015.
Author Unknown, Affini: A Network of Trust, downloaded from https://web.archive.org/web/20100212113200/http://www.affini.com:80/main/info.html, Feb. 12, 2010.
Author Unknown, Alan Clifford's Software Page, downloaded from "https://web.archive.org/web/20150813112933/http:/clifford.ac/software_html", Aug. 13, 2015.
Author Unknown, ASB AntiSpam official home page, downloaded from "https://web.archive.org/web/20080605074520/http://asbsoft.netwu.com:80/index.html", Jun. 5, 2008.
Author Unknown, Boxbe, Wikipedia, Nov. 17, 2016, https://en.wikipedia.org/wiki/Boxbe?wprov=sfsi1.
Author Unknown, BoxSentry, An advanced email validation facility to prevent Spam, downloaded from "https://web.archive.org/web/20040803060108/http://www.boxsentry.com:80/workings.html", Aug. 3, 2004.
Author Unknown, CAPTCHA: Telling Humans and Computers Apart Automatically, downloaded from "https://web.archive.org/web/20160124075223/http:/www.captcha.ne/", Jan. 24, 2016.
Author Unknown, CashRamSpam.com, "Learn More about CRS: Welcome to CashRamSpam", downloaded from "https://web.archive.org/web/20151014175603/http:/cashramspam.com/learnmore/index.phtml", Oct. 14, 2015.
Author Unknown, drcc nsj, New Features: Query/Response system and Bayesian auto-leaning, downloaded from "https://web.archive.org/web/20150520052601/http:/domino-240.drcc.com:80/publicaccess/news.nsf/preview/DCRR-69PKU5", May 20, 2015.
Author Unknown, FairUCE: A spam filter that stops spam by verifying sender identity instead of filtering content, downloaded from "https://web.archive.org/web/20061017101305/https:/secure.alphaworks.ibm.com/tech/fairuce", posted Nov. 30, 2004, captured on Oct. 17, 2006.
Author Unknown, Home Page for "Countering Spam with Ham-Authenticated Email and the Guarded Email Protocol", downloaded from https://web.archive.org/web/20150913075130/http:/www.dwheeler.com/guarded-email/, Sep. 13, 2015.
Author Unknown, Home: About.com, downloaded from "https://web.archive.org/web/20110201205543/quarantinemail.com/" Feb. 1, 2011.
Author Unknown, How ChoiceMail Works, downloaded from "https://web.archive.org/web/20160111013759/http://www.digiportal.com:80/products/how-choicemail-works.html", Jan. 11, 2016.
Author Unknown, How Mail Unknown works., downloaded from "https://web.archive.org/web/20100123200126/http://www.mailunknown.com:80/HowMailUnknownWorks.asp#VerifyValidate", Jan. 23, 2010.
Author Unknown, Joe Maimon—Sendmail Page, downloaded from "https://web.archive.org/web/20150820074626/http:/www.jmaimon.com/sendmail/" Aug. 20, 2015.
Author Unknown, Kens Spam Filter 1.40, downloaded from "https://web.archive.org/web/20080317184558/http://www.kensmail.net:80/spam.html", Mar. 17, 2008.
Author Unknown, mailcircuit.com, Secure: Spam Protection, downloaded from "https://web.archive.org/web/20131109042243/http:/www.mailcircuit.com/secure/", Nov. 9, 2013.
Author Unknown, mailDuster, Tour 1: Show me how mailDuster blocks spam, downloaded from "https://web.archive.org/web/20070609210003/http://www.mailduster.com:80/tourl.phtml", Jun. 9, 2007.

(56) References Cited

OTHER PUBLICATIONS

Author Unknown, mailDuster, Tour 2: But how do my friends and colleagues send me email?, downloaded from "https://web.archive.org/web/20070609210039/http://www.mailduster.com:80/tour2.phtml", Jun. 9, 2007.
Author Unknown, mailDuster, Tour 3: How do I manage this "Allow and Deny List"?, downloaded from "https://web.archive.org/web/20070610012141/http://www.mailduster.com:80/tour3.phtml", Jun. 10, 2007.
Author Unknown, mailDuster, User Guide, downloaded from "https://web.archive.org/web/20070612091602/http://www.mailduster.com:80/userguide.phtml", Jun. 12, 2007.
Author Unknown, myprivacy.ca, "Welcome to myprivacy.ca: The simple yet effective whois-harvester-buster", downloaded from "https://web.archive.org/web/20160204100135/https://www.myprivacy.ca/ ", Feb. 4, 2016.
Author Unknown, PermitMail, Products: The most advanced email firewall available for your business, downloaded from "https://web.archive.org/web/20160219151855/http://ipermitmail.com/products/ ", Feb. 19, 2016.
Author Unknown, Petmail Design, downloaded from "https://web.archive.org/web/20150905235136if_/http:/petmail.lothar.com/design.html", Jul. 2005.
Author Unknown, PostShield.net, Challenge and Response, downloaded from "https://web.archive.org/web/20080117111334/http://www.postshield.net:80/ChallengeAndResponse.aspx", Jan. 17, 2008.
Author Unknown, privatemail.com, how it works: Experts say the best way to control spam is to use temporary "disposable" email addresses like from Yahoo or Hotmail that can be discarded after they start getting spam., downloaded from "https://web.archive.org/web/20100212231457/http:/privatemail.com:80/HowItWorksPage.aspx", Feb. 12, 2010.
Author Unknown, Product Information, "Sender Validation is the solution to your company's spam problem.", downloaded from "https://web.archive.org/web/20140413143328/http:/www.spamlion.com:80/Products.asp", Apr. 13, 2014.
Author Unknown, qconfirm—How it works, downloaded from https://web.archive.org/web/20150915060329/http://smarden.org/qconfirm/technical.html, Sep. 15, 2015.
Author Unknown, Say Goodbye to Email Overload, downloaded from "https://web.archive.org/web/20160119092844/http://www.boxbe.com:80/how-it-works", Jan. 19, 2016.
Author Unknown, sendio, "Inbox Security. Threats eliminated with a layered technology approach.", downloaded from "https://web.archive.org/web/20140213192151/http:/www.sendio.com/solutions/security/", Feb. 13, 2014.
Author Unknown, SPAM Pepper, Combatting Net Spam, downloaded from "https://web.archive.org/web/20141002210345/http://www.spampepper.com:80/spampepper-com/", Oct. 2, 2014.
Author Unknown, Spam Snag, Stop Unsolicited Emails forever!, downloaded from "https://web.archive.org/web/20081220202500/http://www.spamsnag.com:80/how.php", Dec. 20, 2008.
Author Unknown, Spam: Overview, downloaded from "https://web.archive.org/web/20090107024207/http:/www.spamwall.net/products.htm", Jan. 7, 2009.
Author Unknown, SpamBlocks is a Web based Mail filtering service which integrates with your existing mailbox., downloaded from "https://web.archive.org/web/20090107050428/http:/www.spamblocks.net/howitworks/detailed_system_overview.php", Jan. 7, 2009.
Author Unknown, SpamCerbere.com, downloaded from "https://web.archive.org/web/20070629011221/http:/www.spamcerbere.com:80/en/howitworks.php", Jun. 29, 2007.
Entrust: "Strong Multifactor Authentication Methods from Entrust IdentityGuard," https://web.archive.org/web/20110825101942/http://www.entrust.com/strong-authentication/authenticators.htm. Aug. 25, 2011.
Entrust: Mobile Authentication and Transaction Verification1,2,3, https://web.archive.org/web/20110814071521/http://www.entrust.com/mobile-security. Aug. 14, 2011.
Entrust: Proven Transaction Verification on Smartphones & Mobile Devices—Entrust,https://web.archive.org/web/20110918231205/http://www.entrust.com/transaction-verification/index.htm. Sep. 18, 2011.
Entrust: WP_Securing_Whats_At_Risk_Jul. 2008, https://web.archive.org/web/20110809104408/http://download.entrust.com/resources/download.cfm/22313/. Aug. 9, 2011.
eSphinx: ("Cyota launches new authentication platform for online banking," https://web.archive.org/web/20050508152420/http://www.cyota.com/news.asp?id=173. May 8, 2005.
eSphinx: "Cyota and Quova Reducing Online Fraud with Cyota's eVision Technology," https://web.archive.org/web/20060307092523/http://www.cyota.com/press-releases.asp?id=81. Mar. 7, 2006.
eSphinx: "Cyota eSphinx," https://web.archive.org/web/20051214102438/http://www.cyota.com/product_7.asp. Dec. 14, 2020.
eSphinx: Cyota releases eSphinx online authentication package, https://web.archive.org/web/20050508152435/http://www.cyota.com/news.asp?id=170. May 8, 2005.
eSphinx: "How Does it Work?"; https://web.archive.org/web/20051210112946/http://www.cyota.com/product_7_19.asp. Dec. 10, 2005.
eSphinx: "Key Features," https://web.archive.org/web/20051210114904/http://www.cyota.com/product_7_18.asp. Dec. 10, 2005.
Green Armor: Dec. 8, 2005 Press Release: "Green Armor Solutions™ Introduces Identity Cues Two Factor™"; http://www.greenarmor.com/Green_Armor_Solutions_News-2005-12-07.shtml.
Green Armor: Green Armor Solutions "Identity Cues Products"; https://web.archive.org/web/20060110032814/http:/www.greenarmor.com/products.shtml. Jan. 10, 2006.
Green Armor: Green Armor Solutions "Identity Cues Two Factor™ & Two Way Authentication"; https://web.archive.org/web/20060209211113/http:/www.greenarmor.com/DataSheets/Identity%20Cues%20Two%20Factor%20Data%20Sheet.pdf. Feb. 9, 2006.
RSA 7035_CONPRO_SB_0711: "RSA Identity Protection and Verification Suite: Managing risk against cybercrime"; http://web.archive.org/web/20111019060523/rsa.com/products/consumer/sb/7035_conpro_sb_0711.pdf. Oct. 19, 2011.
RSA 9697_AATF_SB_0808: "RSA Adaptive Authentication overview solution brief"; https://web.archive.org/web/20101225124323/http://www.rsa.com/products/consumer/sb/9697_AATF_SB_0808.pdf. Dec. 25, 2010.
RSA AAAM_SB_0208: "RSA Adaptive Authentication & RSA Access Manager solution brief"; https://web.archive.org/web/20081114221836/http://www.rsa.com/products/consumer/sb/AAAM_SB_0208.pdf. Nov. 14, 2008.
Toopher: https://web.archive.org/web/20120430105502/http://toopher.com/. Apr. 30, 2012.
Toopher: Toopher Developer Documentation; https://web.archive.org/web/20120523192419/https://www.toopher.com/developers.html. May 23, 2012.
Provisional U.S. Appl. No. 61/551,370, filed Oct. 25, 2011.
Binkley et al., "Improving identifier informativeness using part of speech information", MSR '11: Proceedings of the 8th Working Conference on Mining Software Repositories. May 2011, pp. 203-206. (Year: 2011).
Heinermann et al., "Recommending API methods based on identifier contexts", SUITE '11: Proceedings of the 3rd International Workshop on Search-Driven Development: Users, Infrastructure, Tools, and Evaluation. May 2011, pp. 1-4. (Year: 2011).
Laszka et al., "Integrity assurance in resource-bounded systems through stochastic message authentication", HotSoS '15: Proceedings of the 2015 Symposium and Bootcamp on the Science of security. Apr. 2015, Article No.: 1, pp. 1-12. https://doi.org/ (Year: 2015).
Peterson et al. "Authenticated Identity Management in the Session Initiation Protocol (SIP)". Jul. 15, 2013. https://www.ietf.org/archive/id/draft-jennings-dispatch-rfc4474bis-01.txt.
Peterson et al. "Authenticated Identity Management in the Session Initiation Protocol (SIP)". May 29, 2013. https://datatracker.ietf.org/doc/draft-jennings-dispatch-rfc4474bis/00/.
Search Query Report from IP.com (performed Jul. 31, 2020) (Year: 2020).

(56) References Cited

OTHER PUBLICATIONS

Author Unknown, SPAMjadoo: Ultimate Spam Protection, downloaded from "https://web.archive.org/web/20140512000636/http:/www.spamjadoo.com:80/esp-explained.htm" May 12, 2014.

Author Unknown, SpamKilling, "What is AntiSpam?", downloaded from "https://web.archive.org/web/20100411141933/http:/www.spamkilling.com:80/home_html.htm", Apr. 11, 2010.

Author Unknown, SpamRestraint.com: How does it work?, downloaded from "https://web.archive.org/web/20050206071926/http://www.spamrestraint.com:80/moreinfo.html", Feb. 6, 2005.

Author Unknown, Tagged Message Delivery Agent (TMDA), downloaded from "http://web.archive.org/web/20160122072207/http://www.tmda.net/", Jan. 22, 2016.

Author Unknown, UseBestMail provides a mechanism for validating mail from non-UseBestMail correspondents., downloaded from "https://web.archive.org/web/20090106142235/http://www.usebestmail.com/UseBestMail/Challenge_Response.html", Jan. 6, 2009.

Author Unknown, V@nquish Labs, "vqNow: How It Works", downloaded from "https://web.archive.org/web/20130215074205/http:/www.vanquish.com:80/products/products_how_it_works.php?product=vqnow", Feb. 15, 2013.

Author Unknown, V@nquishLabs, How it Works: Features, downloaded from "https://web.archive.org/web/20081015072416/http://vanquish.com/features/features_howit_works.shtml", Oct. 15, 2008.

Author Unknown, What is Auto Spam Killer, downloaded from "https://web.archive.org./web/20090215025157/http://knockmail.com:80/support/descriptionask.html", Feb. 15, 2009.

Author Unknown, White List Email (WLE), downloaded from "https://web.archive.org/web/20150912154811/http:/www.rfc1149.net/devel/wle.html", Sep. 12, 2015.

Bjorn Markus Jakobsson, U.S. Appl. No. 14/487,989 entitled "Detecting Phishing Attempts" filed Sep. 16, 2014.

Bjorn Markus Jakobsson, U.S. Appl. No. 14/535,064 entitled "Validating Automatic Number Identification Data" filed Nov. 6, 2014.

Bjorn Markus Jakobsson, U.S. Appl. No. 15/235,058 entitled "Tertiary Classification of Communications", filed Aug. 11, 2016.

Bjorn Markus Jakobsson, U.S. Appl. No. 15/414,489, entitled "Detection of Business Email Compromise", filed Jan. 24, 2017.

Brad Templeton, "Proper principles for Challenge/Response anti-spam systems", downloaded from "http://web.archive.org/web/2015090608593/http://www.templetons.com/brad/spam/challengeresponse.html", Sep. 6, 2015.

Danny Sleator, "Blowback: A Spam Blocking System", downlaoded from "https://web.archive.org/web/20150910031444/http://www.cs.cmu.edu/~sleator/blowback", Sep. 10, 2015.

David A. Wheeler, Countering Spam by Using Ham Passwords (Email Passwords), article last revised May 11, 2011; downloaded from https://web.archive.org/web/20150908003106/http:/www.dwheelercomiessays/spam-email-password.html, captured on Sep. 8, 2015.

David A. Wheeler, "Countering Spam with Ham-Authenticated Email and the Guarded Email Protocol", article last revised Sep. 11, 2003; downloaded from "https://web.archive.org/web/20150915073232/http:/www.dwheeler.com/guarded-email/guarded-email.html", captured Sep. 15, 2015.

E. Zwicky, F. Martin, E. Lear, T. Draegen, and K. Andersen. Interoper-ability Issues Between DMARC and Indirect Email Flows. Internet-Draft draft-ietf-dmarc-interoperability-18, Internet Engineering Task Force, Sep. 2016. Work in Progress.

Fleizach et al., "Slicing Spam with Occam's Razor", published Jun. 10, 2007, downloaded from "https://web.archive.org/web/20140214225525/http://csetechrep.ucsd.edu/Dienst/UI/2.0/Describe/ncstrl.ucsd_cse/C2007-0893", captured Feb. 14, 2014.

Jakobsson et al., U.S. Appl. No. 15/453,737 entitled "Mitigating Communication Risk by Detecting Similarity to a Trusted Message Contact" filed Mar. 8, 2017.

Jakobsson et al., U.S. Appl. No. 15/453,741 entitled "Mitigating Communication Risk by Verifying a Sender of a Message" filed Mar. 8, 2017.

James Thornton, "Challenge/Response at the SMTP Level", downloaded from "https://web.archive.org/web/20140215111642/http://original.jamesthornton.com/writing/challenge-response-at-smtp-level.html", Feb. 15, 2014.

Karsten M. Self, "Challenge-Response Anti-Spam Systems Considered Harmful", downloaded from "ftp://linuxmafia.com/faq/Mail/challenge-response.html", last updated Dec. 29, 2003.

Leddy et al., U.S. Appl. No. 14/963,116 entitled "Scam Evaluation System" filed Dec. 8, 2015.

M. Jakobsson and H. Siadati. SpoofKiller: You Can Teach People How to Pay, but Not How to Pay Attention. In Proceedings of the 2012 Workshop on Socio-Technical Aspects in Security and Trust (STAST), STAST '12, pp. 3-10, Washington, DC, USA, 2012. IEEE Computer Society.

Marco Paganini, Active Spam Killer, "How It Works", downloaded from "https://web.archive.org/web/20150616133020/http:/a-s-k.sourceforge.net:80/howitworks.html", Jun. 16, 2015.

NIST. Usability of Security. http://csrc.nist.gov/security-usability/HTML/research.html. May 1, 2015.

Park et al., "Scambaiter: Understanding Targeted Nigerian Scams on Craigslist", published in Network and Distributed System Security Symposium (NDSS), 2014.

Peter Simons, "mapSoN 3.x User's Manual", downloaded from "https://web.archive.org/web/20140626054320/http:/mapson.sourceforge.net/", Jun. 26, 2014.

R. Dhamija and J. D. Tygar. The Battle Against Phishing: Dynamic Security Skins. In Proceedings of the 2005 Symposium on Usable Privacy and Security, SOUPS '05, New York, NY, USA, 2005. ACM.

Ronald L. Rivest, "RSF Quickstart Guide", Sep. 1, 2004.

S. L. Garfinkel and R. C. Miller. Johnny 2: A User Test of Key Continuity Management with S/MIME and Outlook Express. In Proceedings of the 2005 Symposium on Usable Privacy and Security, Soups '05, New York, NY, USA, 2005. ACM.

* cited by examiner

1320

Patrick Peterson <ppeterson909@yahoo.com>
To: Markus Jakobsson <mjakobsson@agari.com>
need your help This message was flagged. Before you can respond to it, you need to classify it. Click to select:

This email is from
- ⊙ a colleague
- ⊙ a company I do business with
- ⊙ a friend or acquaintance
- ⊙ a stranger ―――― Original message sent by ppeterson909@yahoo.com: ――――

Hi Markus,

Are you at your desk? I need to talk to you.

Cheers,
Pat

Portions of the email may be obfuscated, and any web-links disabled. Classify the message to get full access.
Why was this message flagged?

Markus Jakobsson <mjakobsson@agari.com>  Today at 1:50 PM  (MJ)
To: ppeterson14014@yahoo.com
Reply-To: noreply@agari.com
Automated response - your message has been quarantined Hi Patrick Peterson, You recently sent a message to Markus Jakobsson <mjakobsson@agari.com>. The message has been placed in quarantine.

It is possible that you normally communicate with Markus Jakobsson <mjakobsson@agari.com> using another email address that is whitelisted by the security system.
If you think that is so, then here is what you must do to also whitelist your email address ppeterson14014@yahoo.com.

1. Forward this message in its entirety to the email address you normally use to communicate with Markus Jakobsson <mjakobsson@agari.com>.
2. Log in to that email account, find your forwarded message, and forward it again to whitelist@agari.com from that account.
3. You will then receive a confirmation email, and your message will be removed from quarantine and delivered.
4. You will only have to do this once for this email account, and not for each email you send.

Thanks, and have a good day!
The Agari Team

---
Security code GF686L88.

FIG. 14B

AUTOMATED TRACKING OF INTERACTION WITH A RESOURCE OF A MESSAGE

CROSS REFERENCE TO OTHER APPLICATIONS

This application claims priority to U.S. Provisional Patent Application No. 62/570,559 entitled AUTOMATED INTELLIGENCE GATHERING filed Oct. 10, 2017 which is incorporated herein by reference for all purposes.

This application is a continuation-in-part of co-pending U.S. patent application Ser. No. 15/980,566 entitled USING MESSAGE CONTEXT TO EVALUATE SECURITY OF REQUESTED DATA filed May 15, 2018, which claims priority to U.S. Provisional Patent Application No. 62/508,840 entitled USING MESSAGE CONTEXT TO EVALUATE WEBSITE VISIT REQUESTS filed May 19, 2017, both of which are incorporated herein by reference for all purposes.

This application is also a continuation-in-part of co-pending U.S. patent application Ser. No. 15/786,126 entitled MULTI-LEVEL SECURITY ANALYSIS AND INTERMEDIATE DELIVERY OF AN ELECTRONIC MESSAGE filed Oct. 17, 2017, which claims priority to U.S. Provisional Patent Application No. 62/412,196 entitled ADDRESSING SOPHISTICATED COMMUNICATION ATTACKS filed Oct. 24, 2016. U.S. patent application Ser. No. 15/786,126 is also a continuation-in-part of U.S. patent application Ser. No. 15/453,737, now U.S. Pat. No. 9,847,973, entitled MITIGATING COMMUNICATION RISK BY DETECTING SIMILARITY TO A TRUSTED MESSAGE CONTACT filed Mar. 8, 2017, which claims priority to U.S. Provisional Patent Application No. 62/399,821 entitled MITIGATING COMMUNICATION RISK filed Sep. 26, 2016. All of the aforementioned applications are incorporated herein by reference for all purposes.

BACKGROUND OF THE INVENTION

Email is one of the most common attack vectors used by criminals to compromise consumers and organizations alike. Many emails contain URLs (Uniform Resource Locators), some of which refer to malicious content. Often traditional methods fail to detect that many URLs are dangerous because these methods are based either on blacklisting known dangerous URLs or other heuristics. Blacklisting only works if the dangerous URL has been already detected as dangerous and reported in a blacklist update. The detection of the dangerous URLs can be often slow and inefficient due to the amount of time it takes to gather and analyze a sufficient amount of information to determine a security categorization. Meanwhile, the email message with the dangerous URL could quickly spread within an organization as the email is forwarded and distributed to other users within an organization.

BRIEF DESCRIPTION OF THE DRAWINGS

Various embodiments of the invention are disclosed in the following detailed description and the accompanying drawings.

FIG. 13B shows an example of a modified message requesting manual classification of the sender of the message.

FIG. 14B shows an example of an automatic reply message requesting verification of an identity of the sender of the message.

DETAILED DESCRIPTION

Figure 1:
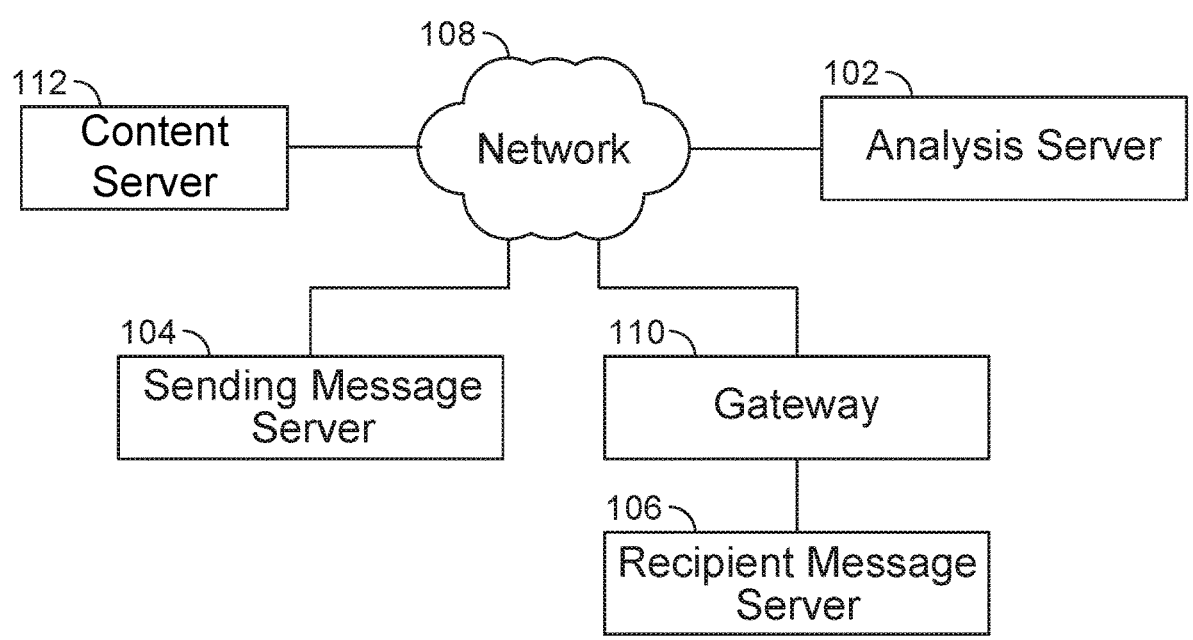
FIG. 1 is a diagram illustrating an embodiment of a system environment for analyzing a message.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Targeted phishing emails are often used by criminals to compromise personal accounts, enterprise accounts, and accounts of government organizations, and used to steal funds, steal sensitive data, and to create launchpads against other targets. These other targets are commonly in the contact network of the compromised accounts, and therefore, as they receive malicious emails from the compromised accounts, they trust these emails. It is a current trend in online crime for criminals to use targeted phishing (also referred to as spear phishing) to compromise accounts used as launchpads, and then to use these accounts to perform targeted phishing, or other types of attacks, against users with a trust relationship with the launchpad account and its owner. An example of such an attack is the automated phishing attack that spread over the Internet in May 2017, and in which a corrupted account was used by the criminal to send messages to all contacts of the corrupted account, asking the recipient to give access, using OAUTH, to his or her email mailbox. As a new recipient fell for the attack, an automated script associated with a Google app identified the new victim's contacts and generated emails to them. The automated script would also have the capability of performing additional actions, such as identifying and exfiltrating sensitive information from the email accounts of victims. Thus, using compromised message accounts, an attacker can send messages with links to malicious content to cause recipients to visit the links to malicious content.

It is desirable to be able to track the spread of malicious messages and identify those users that have been affected by the malicious content included or linked by the malicious messages. A sender of a message is able to configure a URL or an attachment of the message to be tracked when a user visits the URL or opens the attachment. For example, advertisers, as a sender of a marketing email, are able to track when a user visits a URL link in the marketing email by using a special URL link that references its trackers. However, this only allows a sender of the message to track visits to the URL. However, rather than the sender of the message, a recipient organization that desires to protect its members may desire access to information about recipient interactions with linked or attached content.

In some embodiments, at a recipient system (e.g., mail server of a recipient), information of an electronic message to be delivered to an intended recipient is received. For example, the electronic message has been sent via a network by a message sender prior to being received at the mail server of an organization of the intended recipient. For an original resource identifier included in the electronic message, a corresponding alternative resource identifier that can be at least in part used to obtain the original resource identifier is generated. The alternative resource identifier is generated specifically for the intended recipient of the electronic message. The original resource identifier included in the electronic message is replaced with the alternative resource identifier to generate a modified electronic message. The modified electronic message with the alternative resource identifier is allowed to be delivered to the intended recipient instead of the electronic message with the original resource identifier. An interaction associated with the original resource identifier is tracked using the alternative resource identifier.

Additionally, when a user browses webpages on the Internet, the user typically browses from one webpage to another webpage using hyperlinks on the webpages. When requesting a website using a hyperlink, there is a portion of data passed in the request, called the REFERER, which conveys from where the user came, e.g., what site referring a user to the site he or she visits. The REFERER information is commonly helpful to make security decisions. When a user enters a URL by typing input, there is no REFERER information in the request for the URL. However, when a user clicks on a hyperlink in an email, there is also no REFERER in the request from content of the link. If there were, then this could be used to aid in performing a security assessment. For example, a hyperlink contained in a message from a known malicious sender likely points to malicious content. A security assessment can then also distinguish between website visits that resulted from a user typing a URL and from a user clicking on a link of a message.

For these and related reasons, it is critical to develop security technologies that address the problem of phishing, and other related types of attacks in which an email, an SMS, or another type of message contains a malicious resource identifier that traditional security technologies may fail to identify as malicious, and to address the shortcoming that there is no contextual information for website visits resulting from users clicking on hyperlinks in messages.

In some embodiments, information of a message to be delivered to an intended recipient is received. For example, message context information such as information about the sender, the recipient, message metadata, message content, and/or any other relevant information associated with the message is received at a message gateway to perform an initial security analysis prior to allowing the message to be delivered. For an original resource identifier (e.g., URL) included in the message, an alternative resource identifier (e.g., alternative URL) is generated. The original resource identifier included in the message is replaced with the alternative resource identifier to generate a modified message. The alternative resource identifier can be used to obtain the original resource identifier included in the message and context information associated with the message. The modified message with the alternative resource identifier is allowed to be delivered to the intended recipient instead of the message with the original resource identifier. When a recipient of the message makes a request using the alternative resource identifier in the modified message, the request may trigger a security action associated with the original resource identifier and based on the context information. In effect, the alternative resource identifier may serve as a proxy identifier of the original resource identifier that allows effective requests for the content referenced by the original resource identifier (made using the alternative resource identifier) to be intercepted for security analysis prior to allowing or not allowing access to the referenced content.

For example, an alternative resource identifier points to a secure proxy webpage that can use at least a portion of the alternative resource identifier to obtain the original resource identifier and the context information associated with the message. A security risk assessment can be then made dynamically based on the content referenced by the original resource identifier and the context information to make a security assessment. If it is determined that there is a low security risk, the proxy website can provide content referenced by the original resource identifier and/or redirect the request to the original resource identifier. If it is determined that there is a high security risk, the user may be provided a warning, prevented from obtaining the content referenced by the original resource identifier, and/or provided a modified version of the content referenced by the original resource identifier. A result of the security risk assessment may also be logged to allow an administrator to review risks and/or for use in future security analysis.

In an example, a URL hyperlink in an email is identified, and the URL hyperlink in the email is modified to reference an alternative URL prior to delivery. The alternative URL can be used to obtain the original URL hyperlink as well as contextual information associated with the email. When the alternative URL is visited by a message recipient, a determination is made on the security associated with the original URL and/or the associated email and/or the associated sender, utilizing the contextual information and the URL assessment. Here, the assessment of the URL can be done by performing one of rendering, partially rendering, automatically interacting with the associated site, making an assessment of the associated site behavior, including spawning of processes or other webpage rendering requests, and making an assessment of the domain and subdomain of the URL, including reputation, age, and contextual use. This decision can be done as soon as possible after the URL is identified, in batch mode, as a result of the user clicking on the modified URL in the delivered email, or as a result of an external event, such as notification of a risk or attack potentially affecting the recipient. Context relating to the email is used, including text in the email, logos and other graphics in the email, the recipient of the email and whether this user normally receives emails with URLs of a similar type according to a security classification, and based on the sender, whether the sender is a trusted party, and if the sender is not considered a trusted part, whether there is any potential likeness between the identity (e.g., including display name, email address, domain, and identity conveyed by or associated with content of the email) and that of entities that are trusted by the recipients, or trusted by many users like the recipient.

In addition to rendering the website, actions commonly associated with undesirable behavior can be identified, including but not limited to anomalous use of forwarding or redirection, such as using HTTP 301 or HTTP 401 requests; anomalous use of obfuscation including JavaScript that unpacks itself; and anomalous attempts to engage tracking beacons. Furthermore, the system identifies when websites use common commercial templates that are associated with service providers other than those associated with a scrutinized website. This is commonly indicative of the scrutinized website having been constructed by cloning or partially cloning a legitimate website, which is a common tactic employed by phishers.

There are several example benefits associated with the disclosed technology. These may include but are not limited to: (1) enable as context-aware analysis of documents, including webpages; (2) permits immediate delivery of emails while maximizing security by performing delayed scrutiny across applications; (3) identifies the origin of URL clicks for URLs without a REFERER; (4) permits internal tracking of messages, documents, and resources; (5) avoids duplicating the effort of scrutinizing messages and their contents; (6) secures email and other messaging methods against advanced threats; (7) optimizes storage of contextual information useful for managing analysis of risks, leveraging models on sender and recipient behavior and associated trust relationships; and (8) improves anti-virus filtering based on contextual information and threat information relating to the threat vector used for message delivery.

In some embodiments, a mail gateway, a cloud service unit with access to the inboxes of email recipients, or another entity in the email flow or with access to it automatically reviews an email and determines at least one piece of contextual information of the email; then modifies at least one artifact associated with the email to incorporate either the contextual information or a reference to a database record comprising the contextual information, and then causes the modified email to be delivered to the user mailbox. In some embodiments, the disclosed technology demonstrates how contextual information can be used both to draw positive and negative inferences. For example, assume that an email is sent by a trusted party, and that the system has verified that the email was not spoofed. The system has further verified that the email is not likely to be sent by a person who has corrupted the sending account; this can be detected by comparing the message user agent (MUA) of the email with previous emails from the same sender, and determining whether there is an MUA discrepancy. In this example, there is not. However, the email in this example contains a URL that leads to a site that requests credentials. It is not known to be a phishing site, and the site does not have any text or logos indicative of deception. For the particular recipient, the system configuration may be to not allow a site with this type of password entry, since this could be a high-risk site such as a phishing site. However, given that the contextual information indicates that the email was from a trusted party, that the party was not spoofed, and that the party is unlikely to have been compromised, the system makes the determination, after having scrutinized the site corresponding to the URL, that it is permissive for the recipient to visit this site.

In a second example, the same email message, with the same URL, is sent by a trusted party, but it cannot be verified whether the user was spoofed or not. The system, in this example, after having scrutinized the site, determines that the email recipient is allowed to visit the site, but that the site needs to be marked up with a warning. One way to do that is to display a warning instead of the website, as the user clicks on the link, requiring the user to perform an action (such as clicking on a link, solving a captcha, answering a quiz, etc.) before the user is redirected to the real website. It is understood by a person skilled in the art how a mail server or gateway can act as a proxy between a user and the Internet, thereby performing such replacements of content. In a third example, an email with a similar content is sent by a sender with whom the recipient does not have a trusted relationship; this may correspond to the two not having exchanged a sufficient number of emails, such as five emails from each to the other; or the two not having exchanged emails for a duration of time exceeding a threshold amount of time, such as two weeks. The system examines the website and, based on the lack of established trust between recipient and sender, makes a determination not to allow the user access to the website. Using an alternative configuration, the recipient is allowed to access the website, but only after it has been scrutinized by an admin. A request for an admin to review the site is requested by the recipient, on the warning website, after the recipient has been shown a screenshot of the site or seen a rendering of the site which has been made inactive, e.g., in which user input has been disabled. If the admin gives permission to access the site, the recipient will be notified, e.g., in an email or SMS message, after which the recipient, clicking on the hyperlink, will be taken directly to the actual and fully functional site without first being sent to the warning site.

A further benefit of some embodiments is a method to automatically identify account take-overs, also referred to as corrupted accounts, with a high probability. This works by building a profile for each sender, where this profile comprises the mail user agent (MUA) of the sender; the IP ranges and originating servers used by the sender; the signature file(s) used by the sender; the length distribution of message texts associated with the sender; the logo and image use associated with the sender; the type of attachments associated with the sender, including the headers associated with these attachments; the URLs and classifications of the associated websites included in messages sent by the sender; and the semantic classification of texts sent by the sender. For example, the MUA identifies with a high degree of accuracy what type of computer or other device was used to send the message, including aspects such as the charset, the mail client version, the operating system, and more. The IP ranges and originating servers depend on what network the sender uses, and will, for example, be different for a user who is on the AT&T network from one who is on the Comcast network, and yet different from a user relying on a corporate network to send messages. The signature files are often different for different devices of the same user, but can be directly associated with the corresponding MUA, and as such can act as an "extension" of the MUA in terms of identification. Different users have different communication and message design patterns, including the typical use of logos and images, the semantic style, including the length of words, the extent to which spelling is correct, and the type of greetings the user uses. The disclosed security system builds profiles of sender characteristics by observing a series of messages from the sender. The system associates a certainty with a prediction of what constitutes "correct" characteristics based on the variance observed, the extent to which there is entropy for the characteristics, the commonality of change, along with external considerations such as the role of the sender, if known. When a new message is received, its characteristics are compared to previously recorded characteristics and any discrepancy scored by performing a prediction of the likelihood of this prediction being correct, given the past observations of the characteristics of the user in question, and based on the likelihood of potential change of characteristics based on similar changes observed for other users. A conditional probability is thereby computed, where this corresponds to the probability of the observation, given past observations for the sender, and given the general likelihood of changes observed over a larger population of senders. When this conditional probability is lower than a first threshold, which can be a parameter set by the message recipient or a representative thereof, then a first security action is taken; an example security action is to block the message. The threshold can also be a system parameter or depend on past communications and threats associated with the recipient. When the conditional probability is lower than a second threshold, then a conditional action is taken based on the context of the message, the content of the message, URLs and attachments associated with the message, and a policy associated with at least one of the sender, the recipient, or the system. Example methods to perform this conditional action, including the determination of whether to take the action are described in this disclosure, but will be understood by a person skilled in the art to also comprise similar methods and approaches.

Some examples of contextual information include: a trust value associated with the sender, where the trust value can be specific to the recipient; a deception risk value associated with the sender, recipient, and the email; a sender risk value that could be indicative of risk of spoofing, risk of account take-over, or risk of other malicious behavior; an indicator of the type of sender, such as a contact of the recipient, an internal colleague of the recipient, a first marketing team or a second marketing team, and a classification of the sender or email content in terms of its value to the enterprise, such as 'likely malicious,' 'likely wasteful of employee time,' 'likely personal use of computer resources,' 'likely rude language,' 'likely high-priority email,' 'contains mobile-friendly content,' 'sent by an apparent stranger,' and more; or a combination of such types of contextual information. The goal of obtaining metrics may be to evaluate and identify potential threats; evaluate and compare efficacy of benevolent actions such as actions by two competing marketing teams; and to measure and pinpoint sources of time wasting and other resources. Similarly, the contextual information stored or incorporated in the artifact may indicate the type of originating source, such as "a message transmitted by or associated with Facebook, with LinkedIn, with Slack" and more. The contextual information may also indicate when the message was received; or simply index a database of emails that are processed by the system, thereby simplifying a simple lookup of the entire context associated with the email and its associated artifacts. Example artifacts are URLs, attachments, hyperlinks causing phone calls to be placed, and more. To modify a URL, the system can either replace the domain in the URL with a domain or IP address associated with a proxy, which may be either internal or external to the user organization, and which can either be managed by the organization operating or providing the security system, or an organization collaborating with the organization operating or providing the security system. The disclosed technology enhances such technologies by not just introducing an intermediary (e.g., the proxy) but by also providing contextual information to this proxy. To modify an attachment, a security system may perform 'wrapping' of the attachment, where the wrapper is an executable or a reference to an executable, such that when this executable is engaged as a result of the recipient clicking or otherwise interacting on the modified attachment, then the executable receives as input the contextual information associated with the message, and the attachment; and processes the attachment in accordance with a set of rules and the contextual information. This could mean performing a security scan of the attachment and conditionally opening it, giving the user access to the contents; logging the access to the attachment; and using it to augment the user-facing functionality associated with the attachment, such as enabling or disabling features or functionality based on the contextual information. Similarly, phone numbers can be proxied, allowing security scanning of calls and SMS interactions; auditing of turn-around time from the reading of the message to the end-user action; auditing of what messages different users are most likely to interact with; auditing of what senders or content types are most likely to engage users; and more. The actions described herein may apply to all the communication media in various embodiments, and many more actions of similar types are possible.

In various embodiments, a message is scanned by a gateway, a cloud service with access to an email account, an app on a device such as a phone, or by another entity in the message flow or with access to it. This entity is referred to as the "security service" for simplicity of denotation, but should be understood that the functionality it enables extends beyond security functionality, as will be evident from the disclosed functionality. The security device identifies artifacts such as URLs, attachments, and hyperlinks with associated actions such as placing phone calls, sending SMS, making payments; and modifies the information associated with the artifact to incorporate contextual information or a reference to contextual information. As a user interacts with the modified artifact at a later time, a second system associated with the security service determines the context, whether from the artifact or by looking it up from a database associated with the security service. We refer to this second system as the reactive system, as it reacts to the modified artifact based on the user interaction and the contextual information associated with the artifact.

In some embodiments, the reactive system performs an action that is a security action; example actions are to scan the artifact and associated information, and based on the data observed in the scan and the contextual information, determine what portions are considered suitable and which ones are not suitable, after which suitable portions are presented to the user and unsuitable portions are suppressed. For example, if the contextual information indicates that the artifact was sent to a user from a party the user does not know or have any relationship with, and the data observed in the scan comprises some executable elements and some non-executable elements, then the reactive system determines that the executable elements are not suitable whereas the non-executable elements are suitable. The reactive system then allows the user to see, interact with, open, or otherwise engage with the suitable elements, but makes elements considered unsuitable at least one of not visible, not possible to open, not possible to execute, or only possible to execute in a secured environment such as a sandbox. The artifact in this example may be a URL, and the data on the associated website, where an executable element may be a JavaScript component, and a non-executable element may be a CCS-formatted HTML document. The artifact in this example may also be an attachment of the format of a zip file, the executable element of a zipped word document with a macro, and the non-executable element of a PDF file that does not have any macro or active component associated with it. Instead of limiting access, the reactive system may also modify elements classified as non-suitable, e.g., change a word file to disable the macro; rewrite a pdf with a potential active component so that it is in a standard form that is known not to pose a security risk; and similar. Following the same example, if the contextual information associated with the message indicates that the sender is a trusted party, and there is not an observed indication that the trusted party has been compromised, such as in a phishing attack or by malware, then the reactive component may determine that all elements associated with the modified artifact are suitable, or that all elements associated with the modified artifact are suitable except for those that are identified as being on a blacklist or associated with a known negative situation. An example of such an element would be a file that does not pass an anti-virus scan.

In some embodiments, the disclosed technology has benefits beyond enabling blocking of risk. Whereas one of the primary benefits is associated with identifying risk associated with an email, and use that identified risk to limit access to web resources and other actionable material, such as attachments, macros, and phone links, another example type of benefit is that the technology can be used to audit risk. There is great need for organizations to identify the level of risk they are exposed to, and to determine changes over time. It is also important for organizations to determine what users—internal and external, associated with the organization or not—pose a risk by sending dangerous emails, receiving dangerous emails, visiting dangerous sites, performing dangerous actions, and more. To enable tracking and auditing of such behavior, it may be necessary to determine what events on one layer (such as the receiving of an email from a stranger) lead to actions on another layer (such as placing a phone call or clicking on a link.) A person skilled in the art will recognize that these are benefits that are enabled by the disclosed technology. One way to implement an auditing mechanism uses the stored records, including information of the context, sender and recipient, along with the actions (or lack thereof) identified as taken by the end user, which is detected as the recipient interacts with the modified resource identifier, and to store this information. This is later used to compile statistics of risky behavior.

In another embodiment, the reactive system performs an auditing operation that is not necessarily a security action. For example, the auditing action may be to associate the modified artifact, its sender, and its receiver with the time it took from the delivery of the message until the user engagement with the modified artifact. This way, the reactive system can determine, whether per sender, per receiver, or per message type (all of which would be part of the contextual information) what the user reaction time is, where one aspect of the reaction time is the time from delivery of the message to the time of the user engagement with the modified artifact, and another aspect of the reaction time is the time from the recipient user opening the message to the time of the user engagement with the modified artifact. The system can also track the percentage of the time that a particular user engages with the modified artifact, whether based on the sender identity or group membership, the content of the message, the content type, or based on previous actions of the recipient user. This is a very powerful productivity tool for organizations as it allows the automated identification of effective communicators, messages that are convincing, workflows that lead to high productivity, senders that derail the focus of recipients by sending recreational content that stops productivity, and similar. An example use is to determine what services generate the most click-through, where the compared service may comprise: a commercial service or come from colleagues or other contacts referencing documents associated with such services.

The disclosed technology is not limited to identifying and evaluating URLs based on their context in an email or other messaging form, but can also be used for other marked-up data, such as mailto links, click-to-call links, instant messages, SMS messages, notification messages, transcribed voicemail, messages processed by proprietary applications, and other material that a recipient can interact with. For example, a mailto link can be temporarily modified to convey the context in which it was embedded; this context can later be used by an automated method that screens the content of an outgoing email and looks for sensitive data that should not be leaked outside the trusted perimeter. Thus, if the mailto link was contained in an email that came from a non-trusted party, this contextual information would be used to censor the message, block the message from being transmitted, cause an alert to the sender, cause an alert to an IT admin, cause the message to be temporarily quarantined before it is delivered, or another action. For example, a regular mailto link may specify an email address on the format "name@organization.com," which can be marked up by changing the email to "name@organization.alert. 37662772," where "alert" is a tag to indicate that the email should not be delivered as-is, and 37662772 is a code that either indicates the context or is a pointer into a database with contextual information. Thus, when a mail server, gateway, cloud service provider, or other entity processes this information, the email is scrutinized in the context associated with the contextual information indicated in the augmented email address. This entity could be configured to scrutinize all email transmissions to non-trusted entities if they do not have a contextual extension, to avoid that a malicious sender tricks a recipient to remove the context information. All incoming emails from non-trusted entities could also be augmented by adding a reply-to address that corresponds to the address to which a reply would otherwise go to, with an added extension providing contextual information. The contextual information can contain information about the identity of the sender; the trust level of the sender; and/or the extent to which the sender identity is similar to that of a trusted entity. As the mail server or other entity concludes the scrutiny, a security action may be taken or the email simply delivered with the content unchanged, but with the email address first modified to make the email deliverable with respect to the intended recipient. This means to remove any mark-up of the address. It is beneficial to add x-headers indicating to the recipient system how the message was processed, including if any part of it was redacted, modified or blocked, and potentially a description of the reasons, which may include the contextual information used for the decision. Parts or all of this added information may be encrypted in a manner that only trusted received systems can access the information.

Similarly to how URLs, mailto, and reply-to can be augmented to convey contextual information, call-to-numbers can also be augmented, thereby passing contextual information to an app that is used to place a phone call, initiate an SMS, or similar. This permits a screening of content; or an application of a policy (e.g., such as who pays for the call, or whether the call is allowed during office hours, whether the call is made from a particular geographic location, and similar).

Furthermore, attachments, such as spreadsheets and word documents, can be replaced by icons or texts identifying their existence, where these icons or texts are clickable, wherein a hyperlink is activated as a user clicks on an icon or text. The hyperlink can be associated with a record created in a database, where this record is populated with information relating to the context of the message, the context relating to the sender and receiver, and additional information useful to assess the risk level of the document. As a user requests access to a document, a determination can be made whether this is safe, unsafe, or has a risk in between; and whether a security action should be taken. Such security actions include removing or disabling macros, rewriting the content on a normalized form, requiring a user action, and more. Therefore, it should be understood that this disclosure is relative to resource identifiers in general, as opposed to limited to particular types of resource identifiers such as URLs, mail-to, and other identifiers that a user can interact with.

It should also be understood that the disclosed technology of some embodiments enables functionality not necessarily related to identifying or reducing risk. It is, for example, possible to use the modification of resource identifiers to change the user experience. For example, if an organization wishes for all internally placed phone calls to use a proprietary calling application and not the regular phone application, then the modification of the phone link is used to modify the action taken by the system when the user clicks on the modified resource identifier. This can also be used to augment the functionality. For example, an organization that requires that certain phone calls be recorded automatically may signal the selection of what phone calls should be recorded in an identifier included in the modified resource identifier, causing recording to take place automatically by passing a parameter to the associated application or otherwise starting a recording functionality.

A beneficial aspect of the above embodiment is a visualization component that identifies using a GUI, outliers, senders, receivers, or message classifications. One such message classification is associated with a first important project and a second message classification is associated with a second and less important project; alternatively, the first classification is associated with a direct messaging style in which clear requests are made whereas a second classification is associated with a less direct communication style. The classification can be performed at the time the artifact is modified by the security system, at the time the reactive system is evaluating the modified artifact as a result of the recipient user engaging the modified artifact, or at a later time, such as when an outlier is identified. The classification can also be performed a priori, e.g., internal senders are associated with one classification, external webmail accounts are associated with a second classification, strangers with a third classification, and external colleagues with a fourth. An artifact can be classified as belonging to or not belonging to each one of one or more classes. These alternatives are only illustrative, and other times are also possible for the classification.

In some embodiments, it is automatically determined that an internal user in an organization is sending a number of messages containing URLs or attachments of a type that is automatically classified as not being relevant to work, where this number exceeds a threshold, whether since the beginning of the measurements or during a time interval. It is also determined that the recipients of these messages click on the URLs or attachments, based on the tracking information associated with the disclosed technology. As a result, the sender behavior is compared to a policy, where this policy in one example specifies that the sender should receive a first notification in response to the threshold being exceeded; and after a time period such as one week, if a second threshold is also exceeded, then a second notification is sent to the sender; and after another time period such as another three days, if a third threshold is also exceeded, then a manager or admin associated with the sender is sent a notification. All these notifications may be automated and generated in response to measurements and policies, where the policies can be stated for an entire organization, a group, or an individual, and each policy is associated with a priority and if multiple policies match a user then the policy with the highest priority gets precedence. In another example embodiment, a similar tracking is performed of recipients instead of senders of material matching a classification. If a recipient is interacting with undesirable material, whether risky material such as a phishing webpage, a simulated phishing webpage, or a potentially dangerous attachment sent by an untrusted sender, or material that is not considered risky but also not desirable for the enterprise, then the recipient receives one or more automated alerts, as well as an admin or manager of the recipient, where the transmission of such an alert is triggered by a policy and a measurement related to the interaction or interaction attempt by the recipient user, and wherein multiple policies preferably are used, with different policies corresponding to different types of unwanted material. Furthermore, in a third example embodiment, an external sender of emails sends messages with undesirable URLs or attachments to one or more internal users, where the determination that these artifacts are undesirable may take place at the time of transmission, as a result of in-depth scrutiny of the message taking place after delivery, as a result of a user action such as a complaint, as a result of detonating the artifact, as a result of decrypting or unzipping the artifact, and similar. This is based on the sender being identified as undesirable based on the classification of one or more artifacts such as URLs, attachments, call-hyperlinks, and more, and where a rule is created for senders that are considered undesirable. An example rule may cause emails not to be delivered, to be stripped of any artifacts, to be given extra scrutiny, to be quarantined, to be modified to include a warning, and more, as described in this disclosure.

In some embodiments, a wrapping technology is utilized in the context of encrypted zip files. These constitute a risk to systems as risks associated with these are poorly detected, and commonly both attackers and benevolent users send encrypted zip files. As the files are opened and decrypted by the user, the mail security software is no longer in control. To address this, encrypted zip files are detected when they are sent as attachments to emails and other messaging systems, such as Skype, and then replaced with what is referred to as "wrapped" versions. A wrapped version of an encrypted zip file is a file that, when opened, causes execution, whether of the file wrapper itself or of an associated application that the message recipient needs to download, and as the file wrapper is executed, it performs three tasks: (1) it requests a PIN or password from the user, and receives this; (2) it uses the PIN or password to decrypt the wrapped zip file (this is done by executing the unzip program associated with the zip file, or a compatible version to this, providing the unzip program with the PIN or password provided by the user); and (3) automatically accessing the contents of the unzipped file, and determining for its contents whether any of these files are risky. This can be done in a multiplicity of well-known ways, including detonating each file, determining whether any of the files match an AV signature, determining whether any of the files has executable code segments in it, and more. The detonation of a file is a technique that involves interacting with the file by executing or opening it, performing this in an environment that is secured, such as a sandbox or a virtual machine, and to observe the actions initiated or requested as a result of this. Detonation could involve emulating a user interacting with a file, emulating a network of machines or another regular execution environment, and exposing the file to data that is commonly wanted by attackers to determine whether a malicious-looking action is taken in response to this. Such actions involve unexpected connection attempts to external resources, requests to modify system resources, and more. The same approach also works for messages with attachments that are encrypted pdfs, or any other encrypted file type; in such cases, the execution of the wrapper file causes the decryption of the encrypted file, which is then scanned for risky elements, including executable code. If a file, independently of type, passes the verification, then the decrypted file is made available to the recipient, whether this corresponds to the decrypted zip file or its contents, a decrypted pdf, or other file. After the verification passes, the wrapped file would preferably be opened for the user to see. Thus, the user experience associated with the opening of wrapped files would be the same as that of unwrapped files, except for a delay that in most cases would be too short to detect, and but for the effects of opening a malicious file, which of course is the goal of the novel approach to address. If an encrypted file is found to be malicious after having been decrypted, then a signature is preferably created for the encrypted file and the emails it was associated with. Such a signature may, for example, identify the file type (e.g., "encrypted zip file"), the size (e.g., 18007 bytes), and the creation date (e.g., "Jan. 6, 2017"). Based on this signature, other malicious messages containing a payload matching the signature can be detected. This may be done not only for emails to be received by the system after the signature is created, but also retroactively, by accessing the inboxes of users, or by accessing a database proactively built as the messages arrived, describing the features of emails that are high-risk according to some measure, such as having an encrypted zip attachment and being from a non-trusted party. Such records would indicate what users received these attachments, and identify the emails. As soon as the system has identified candidate messages to be compared with the new signature, a match is made, and if the new signature triggers, then a retroactively applied filtering action is taken.

In some embodiments, the security system includes contextual information in the wrapper. This can be done by adding parameters to the headers of the modified attachment, for example, where these parameters convey the contextual information or provide an index into a database that contains at least one of the contextual information or a repository of messages. In one use case, the security system identifies a potentially executable file, or a file that potentially has executable components such as a macro, and determines that the sender of the message containing the file is at least one of a stranger relative to the recipient; a party that the recipient has not had substantial interaction with; a party that has interacted with the recipient in the past but uses a substantially different display name or other identity marker than the current message does; or a party that is identified as trusted relative to the recipient, e.g., based on having communicated more than a threshold number of messages with the recipient in the past, having never been reported as a spammer by the recipient, or having been part of an LDAP database associated with the recipient. This trusted party is normally associated with a substantially different mail user agent (MUA) and is therefore determined to be at a heightened risk of having been corrupted. This information is part of the context, and is associated with the modified attachment, where the modified attachment may comprise a wrapper, as described above. Later on, the recipient user clicks on the attachment and thereby causes the code associated with the wrapper to execute on the associated content, which comprises the original attachment and the context associated with the message. This is performed, enabled, or initiated by the reactive component. In one example, the reactive system, executing the wrapper or interacting with the wrapper using an interface, determines that the risk associated with the context and the associated attachment is high, and therefore performs a detailed analysis of the associated attachment using for example sandboxing methods, code detection methods that identify executable components in files, or traditional anti-virus methods, or some combination of these tools, and obtains a response indicative of a very high risk of malware. The reactive component preferably reports this information to the security system, and one of the two units determines what the security action should be. In one example, the email was sent by a trusted party, and this trusted party is then determined to be corrupted with malware with a very high probability. This determination causes a notification to an admin associated with this user and/or a notification to the user in question, whether to the sending account or another address or channel associated with contact information belonging to the sender whose computer is believed to be corrupted. In addition, the security system may isolate any other emails or messages sent from this sender that are determined to be corrupted until an indication is received that the user is no longer affected by the likely corruption, or never was. This indication could be the result of a scan performed on the suspected system by the user or an admin, or a notification that such a scan or other remedy has been performed. Alternatively, any email or other message from the user suspected of being compromised can be automatically modified to eliminate or contain any component associated with high risk. In the case where the sender is not a trusted party, this party may be isolated from the system, meaning that emails or other messages this user has or will send will be quarantined, blocked, or automatically modified to make them secure.

In another embodiment, the system detects and blocks an attempt to perform a so-called pharming attack on a victim, which can be carried out by surreptitiously setting an HTTP 301 redirect from a trusted site to a non-trusted site, causing the victim's browser or mail reader to cache the redirect and therefore resolve a URL in the wrong way. Other redirects can also be initiated by an attacker; this includes 302 redirects, use of intermediaries such as domain name shorteners, or sites that perform REFER-based redirects to guide victim traffic and spidering traffic to different sires. For example, say that an attacker poisons the victim's cache by placing an HTTP 301 redirect from www.goodbank.com/login to www.evil.com/goodbank.com/login. The attacker then waits for GoodBank to send an email to the victim, in which there is a URL such as www.goodbank.com/login. If the victim clicks on this hyperlink, then it will cause for him or her to visit www.evil.com/goodbank.com/login. In another version of this attack, the attacker replaces the URI or URL associated with a GET or PUT request that he expects a victim user clicking on a good webpage to make, thereby having information fetched to the browser or mail reader to be fetched from the wrong location, or information (such as a password) submitted from the browser or mail reader to be submitted to the wrong location. The disclosed system addresses this by scanning all emails going to its subscribers and performing a security action that blocks the attack. In some embodiments, the system replaces every http address with the corresponding https address, which stops the attack on such URLs. However, this does not address URLs for which there is no https version, and does not allow the system to track abuse attempts. In another embodiment, the system replaces a URL such as www.goodbank.com/login with a proxy address such as https://www.agari.com/www.goodbank.com/login, where Agari.com is a security service with a proxy, and where any click by the intended victim causes the modified URL to be called, where the proxy does not have a 301 redirect cache or where it only allows selective use of a 301 redirect cache, and where it initiates a request for the page www.goodbank.com/login after receiving the request https://www.agari.com/www.goodbank.com/login. The security service, represented by the proxy associated with agari.com, logs any requests to web material as above and blocks any attempts to performing 301 redirects by the attacker on the proxy. This can be done by not allowing any 301 redirects to be stored by the proxy, or by only selectively allowing them, where one example rule for allowing a redirect is to allow it only to a domain that is the same as the domain from which the redirect is performed, or which is registered to the same owner. The proxy can identify where the requests come from by determining the IP range from which they come. It can also optionally determine when a user is under attack by monitoring when a redirect is placed. This can be determined by collaboration with a gateway server associated with the potential victim by redirecting the requested resource https:/.www.agari.com/www.goodbank.com/login to the original resource www.goodbank.com/login and notifying the gateway. The notification preferably includes IP information associated with the potential victim and machine descriptors such as user agents. If the gateway observes a request to the original resource www.goodbank.com/login from the identified user, then this is a benevolent request, whereas if the gateway observes another request from the identified user, then this is very likely to be an attack, and is preferably evaluated by a separate system that determines what is hosted on the webpage requested by the identified user. Alternatively, the security system replaces URLs in incoming emails to the user, replacing www.goodbank.com/login with http:/.www.agari.com/www.goodbank.com/login?253gd63, wherein 253gd63 is an identifier associated with at least one of the user receiving the email, the email, the trust score associated with the email, information about the sender of the email, and more. As the proxy receives a request for http:/www.agari.com/www.goodbank.com/login?253gd63 it makes a request for www.goodbank.com/login and forwards the result to the requesting user. In this context, the proxy needs to make sure that it is not attacked by an attacker that places a redirection in its cache. An alternative is therefore for the server processing the email not to replace the original URL with http:/www.agari.com/www.goodbank.com/login?253gd63 but with https:/www.agari.com/www.goodbank.com/login?253gd63. This avoids the risk of the redirect attack being performed on the server, but still allows the proxy server represented by agari.com to determine, based on the "extension" 253gd63, whether the resource www.goodbank.com/login is trustworthy or not. For example, if the URL www.goodbank.com/login was sent by a stranger to the recipient deceptive display name, then the proxy may not permit the access, and may instead redirect the user requesting the material to a webpage with a warning. Other variations on these techniques are possible.

The disclosed technology enables multiple security determinations. As a message is first processed by the security system, a first determination is made, and based on this determination, a security action is taken. Some messages may be modified, where one such modification is described above, and includes the modification of an artifact associated with the message. Another modification involves modifying display names, as described in a co-pending application. The security system also modifies the content portion of the message conditional on the first security determination. Other actions comprise blocking the message, quarantining the message, automatically sending a message to one of an account associated with the apparent sender or the recipient, notifying an admin, or escalating the security review by performing a computational in-depth analysis, or having a human reviewer scrutinize and classify the message. Additional actions are taken based on the response from human users, or the absence of such responses.

The message is then delivered to the recipient, conditional on the first determination, potentially having been modified as described above. The system then determines whether the user action, or lack of action, is indicative of a security posture associated with the message. For example, consider a message sent to multiple users, where some place the message in the spam folder, others open the message but do not engage with it, and yet others do not open it. This message is considered unwanted, and the lack of supporting actions from recipients may trigger a second security determination, such as having the message sent for review to one or more human reviewers.

Consider a second message containing an encrypted file, such as an encrypted pdf or an encrypted zip file. Encrypted files are commonly used by attackers as a way of hiding threats, such as malware. One possible operation applied to this type of artifact as a result of the first security determination is to wrap the attachment, as described above. When a user selects to engage with the wrapped attachment, he or she will provide a PIN or a password to the reactive unit, which will then decrypt the associated file and scrutinize the contents. Assume that the file is considered to be malicious, based on having malware or other high-risk contents. This causes the security system to classify the sender of the message as dangerous. A resulting security action is for the system to scan all recipients it monitors whether any of these have received messages from the same message sender. If any of them did, then those associated messages are sent for a security scrutiny, which could be a manual review, automated analysis by a sandbox, or other types of scrutiny. Alternatively, no additional scrutiny is performed. Then, a security action is performed, which may be to remove one or more of the messages associated with the dangerous sender. Multiple rounds of security review and associated conditional filtering actions can be performed, such as redacting, removing, modifying, or otherwise securing messages. This involves retroactively accessing, reading, writing, modifying and deleting messages, or any portion of such operations. Messages can also be moved between the inbox and the spam folder as a result of such scrutiny, or from the spam filter to the inbox, if considered safe after a more careful scrutiny of a message initially considered more risky. One benefit of the disclosed technology is that the retroactive security actions enable an important change of the economy of attacks. In the past, an attacker would send n different attack messages to one or more organizations, for some integer value n such as n=100, hoping that one organization would fall victim. By increasing n, say to n=200, the attacker would typically increase his probability of success, and typically approximately double this probability. However, the retroactive security actions mean that as long as at least one of the messages is found to be malicious, the system will retroactively perform a filtering action to all the other n–1 associated messages. Therefore, as n grows, the probabilities increase that at least one of the messages will be correctly identified as malicious, and therefore, a security action taken on all the n messages. This is made possible by the retroactive filtering and is also benefiting from an anomaly-based risk system wherein high-risk and therefore anomalous messages are identified. One such high-risk situation is the use of deceptive display names, which are display names matching the name of a trusted sender in the context of a recipient.

In some embodiments, an estimate of the age of accounts is determined (e.g., such as the email accounts of email senders that are not recognized as secure by the system). An account may be recognized as secure if it has interacted with protected users for at least a threshold amount of time without any security concerns, where one such concern corresponds to a message that triggers one or more high-risk filters. Protected accounts and their contacts are also preferably considered as secure. Other accounts are higher risk. Attackers commonly register accounts and then use them for a short time, until the accounts are either blocked or taken down due to complaints or abuse detection. To get an estimate of the age of an email address, the security system consults public or proprietary breach databases, such as haveibeenpwned.com and similar, preferably using an API or by purchasing or maintaining such databases. Normally, it is seen as a security risk to be in such a database; however, in the absence of a recent corruption of an account, it is considered a security benefit to be in this database in the context of this evaluation. This is because if there is a breach record that is a year old, that means that the account that is associated with the breach record is at least one year old. Whereas it is possible that the account has been used by an attacker, which is a risk, the security benefit with knowing that the account is not very young is typically greater. Thus, for an account that is the sender of an email, and where this account is not known to be trusted by the recipient or the system, knowledge that the account has been breached in the not-so-recent past means that the account is not very young is a definitive security benefit. Thus, knowledge of a breach—as well as any other knowledge of an old account activity—is an indication that it is not a fly-by-night account. The converse is also true: the absence of such information for an untrusted or unknown account is seen as a further risk indicator, and can be used to trigger filtering or additional security scrutiny.

In one example scenario, Alice has a history of interaction with Bob Boss <bob@bosscompany.com>, but has never interacted with Bob Boss <impostorbob@gmail.com>, and receives an email from the latter. The email has a subject line "Urgent! Respond by EOD" and contains a brief message "Hi Alice. Please review and respond by EOD. Bob" and an attachment with name data.pdf. The security system receives the message and determines whether the sender domain has a DMARC policy, which in this example case it does. The security system then verifies that the email has a legitimate DKIM signature and a valid SPF record, which in this example case, it does. Thus, the message does not fail DMARC. The security system then determines whether the sender is known by the system. It does that by accessing a system-wide blacklist to determine whether it is a known bad sender; in this case it is not. It also does this by accessing a recipient-specific whitelist to determine if the sender is trusted by the recipient. Since Alice has never interacted with this sender and the sender is not in an LDAP database associated with Alice, it is determined by the security system that the sender is not known to be trusted by the recipient. The system also determines whether this is a known-old email address; it does this by consulting a service or a database for breach data to determine whether the sender is associated with a past event of sufficient age, such as at least two months ago. In this case, there is no such indication, which is commonly the case for approximately half of all senders. This is not an indication that the sender is malicious, but is correlated with possible risk. It is then determined whether the sender is potentially deceptive. Some of these tests are conditional on others These tests can be performed in other order in various different embodiments. Other tests can be performed in other embodiments. The above described tests are simply illustrative of one possible embodiment and situation.

The security system computes a risk score based on the tests performed. The risk score is represented by a value R that is initially set to 0; then decreased by 10 due to the fact that the sender is associated with a DMARC record and the DMARC verification passes. A sender domain not associated with a DMARC record would have caused the score to not be modified, and a sender domain with a DMARC record and an invalid SPF record but valid DKIM signature would have caused the score to be increased by 10. A sender domain with a DMARC record and a valid SPF record but invalid DKIM signature would have caused the score to be increased by 25; and a sender domain with a DMARC record and an invalid SPF record and an invalid DKIM signature would have caused the score to be increased by 100. The score R is then reduced by 5 since the email sender is not on a blacklist, whereas if it had been on the blacklist, the score would have been increased by a value associated with the entry in the blacklist, where a time-distant spam report would have a value 10 associated with the entry; a recent spam report would have a value 20; a time-distant fraud report would have a value 25 associated with it and a recent fraud report would have a value 50 associated with it, wherein "time-distant" in this example is anything older than three months and "recent" is anything that is three months or younger. It is determined that the sender is not on a recipient-specific whitelist, and therefore the score R is increased by 10. If the sender had been on such a whitelist, it would have been determined whether there are indications of account compromise of the sender account, such as a new MUA. If so, 50 would have been added to the score R, otherwise 100 would be deducted from the score R. This verification only would be performed for messages passing the DMARC verification, and messages associated with sender domains that do not have a DMARC policy. The system then determines, conditional on the sender not being a trusted sender that has no signs of being corrupted, whether the sender identity is deceptive. This corresponds to comparing the display name of the sender to the display names of parties that are trusted to the recipient, and comparing the display name of the sender to a list of common brand names, such as well-known financial institutions. This comparison is preferably performed using a string-comparison method such as Jaro-Winkler. In this example situation, the comparison results in a match since the display name of the sender is the same as that of the trusted contact Bob Boss <bob@bosscompany.com>. Thus, this sender identity is potentially deceptive to the recipient, Alice. The security system modifies the display name to "Warning" and adds the value 65 to the risk score R. As a result, the risk score now is −10−5+10+65=60, which is compared to a threshold T1=50. As a result of the score R exceeding T1, the already-modified message is sent to a unit that "scrubs" it. If the score R had exceeded a second threshold T2=72, then the email would not have been delivered, and if the score were below T3=−15, then the email would be delivered verbatim but with a smiley emoji added to the subject line, whereas if the score was greater than or equal to T3, any emoji in the subject line is removed before the message is delivered. This example message has no emoji in its subject line. The scrubbing action involves determining that the email has an attachment, and that attachment is of a type that potentially could be executable. As a result of this determination, the attachment is replaced with a wrapped version of the same attachment, where the wrapper contains a reference to the email and its context, and the context specifies that the email had a correct DMARC signature, was not on a system-wide blacklist, was not on a recipient-specific whitelist, was not found to be older than the threshold time, had a deceptive display name, and did not have an emoji in the subject line. Having a smiley emoji would be of importance for a message with a high risk score R, since this is indicative of an adversarial attempt to convey security to the recipient.

Since the score R was greater than another threshold T5=15, the email is recorded in a list of potentially risky emails, and a post-deliver analysis is performed. In this example case, the security system performing this analysis is determining whether the same sender has been observed to send multiple emails to users protected by the system. If more than three such emails are identified in the list of potentially risky emails, which is preferably sorted by or indexed by the sender email address, the email is sent for manual review, and if the expert reviewer determines that it is risky, then he or she indicates a remedial action to be taken for all the emails from the sender; where example remedial actions are to place the risky email messages in quarantine, remove them from the inbox and not place them in any other mailbox of the recipient, replace the messages with messages that include warnings, and more. In this example case, the sender had not sent any additional emails, so this is not performed. A second security action taken by the system is to send it to a sandbox for detonation. This is done since the risk score is greater than T5 and the email has an attachment that could potentially be executed. Examples of such files are pdfs, excel spreadsheets with macros, and files whose types indicate that they are intended to be executed. If the sandbox determines malware risk, then the email is removed from Alice's inbox, or if the sender is trusted to Alice, then the attachment is replaced with a notification of the attachment having been removed. In the latter case, a notification is also sent to an admin associated with the sender. That is not performed in this case since the sender is not trusted to the recipient. In this example, the expert reviewer did not have time to review the message before Alice reads it, and the sandbox did not identify a threat.

If Alice clicks on the wrapped attachment, the reactive system associated with the security system is engaged and it is determined, based on the context associated with the wrapper and the content of the wrapped attachment, whether to take a remedial action to the wrapped attachment, where example remedial actions include removing some files in zipped directories, rewriting files in a normal form that avoids high-risk obfuscated executables, and adding alerts to contents. Conditional on the contents, additional security actions are also to be taken. For example, the example attachment is a pdf document containing the word "invoice," which makes it a high-risk document. As a result, the document is partially redacted to remove or white out any apparent account information, and a warning is added. The unmodified pdf document is also sent to an admin along with context information. The admin then preferably evaluates the risk based on the contents of the document and causes a notification to be sent to the recipient, Alice.

A further benefit of the disclosed technology is a method to address invitations from social networks, where these invitations potentially pose a risk. In "real life," Alice knows Bob Boss, but they are not connected to each other on LinkedIn. One day, Alice is sent a LinkedIn invitation from a user with the name Bob Boss. Whereas it is likely to be her colleague, the system cannot tell, since the email is not sent from Bob Boss' email account, but from an account with the address invitations@linkedin.com, and with an associated display name of "Bob Boss." This poses risk since this account may have been created by Eve Evildoer, using the username "Bob Boss." Eve might even have copied portions of Bob's actual LinkedIn profile and populated her newly created profile with this information. This problem is not limited to LinkedIn, but is also associated with other social networks and other services that allow user-generated accounts. The security system detects a risk associated with this email, based on detecting a potentially deceptive display name, as previously described. The system then performs a security action that causes two actions: (1) the email is not delivered to Alice, or a modified version of the email is delivered, wherein hyperlinks are removed and an explanation is inserted, such as "This email is currently going through a security check. If it passes, the hyperlinks will be activated. In the meantime, we recommend that you do not accept this invitation. The security check will soon conclude," and (2) an email is automatically generated by the security system and sent to an email account associated with the apparent initiator of the email, which is Bob Boss. The system has one email address associated with this display name and also associated with Alice, and that address is <bob@bosscompany.com>. The system sends a message to <bob@bosscompany.com> with the content "Did you just send a LinkedIn invitation to 'Alice <alice@bosscompany.com>?' Please click yes or no." Here, the "yes" and "no" are hyperlinked and are associated with two distinct web addresses, which are both unique to this email instance and which have sufficient entropy that the addresses cannot be anticipated by a third party. For example, the yes-link may be www.agari.com/Dgdg36g8j36.html and the no-link may be www.agari.com/Dgdg33773yy6. Here, <alice@bosscompany.com> is Alice's email address, and is associated with past communications with <bob@bosscompany.com>, which was the basis for the security system's determination that "Bob Boss <bob@bosscompany.com>" is a trusted contact of <alice@bosscompany.com>. Further, agari.com is the security service. If the security system received a GET request for www.agari.com/Dgdg36g8j36.html, then it determines that the user of <bob@bosscompany.com> initiated the LinkedIn request with Alice, and in response to this delivers the original LinkedIn invite from Bob to Alice, or replaces the previously delivered invitation with the warning with the original LinkedIn invite or with a version of this in which a clarifying statement is made that this has passed the security check. The inclusion of this clarifying statement is preferably made if the system determines that Alice has read the previously modified LinkedIn message, which is possible since it has access to Alice's inbox and can determine the read-status. If a GET request associated with www.agari.com/Dgdg33773yy6 is observed by the system, this is indicative that the initial LinkedIn invite to Alice was malicious. The modified message previously delivered to Alice is now preferably removed or replaced with a message that informs Alice of the attack. In addition, a notification is sent to an admin, and security statistics are updated to include the malicious email. If no response is received, i.e., neither www.agari.com/Dgdg36g8j36.html nor www.agari.com/Dgdg33773yy6 is clicked, then the system optionally performs an action after a time-out period has passed, where this time-out period may be one week. The action may remove the message from Alice's inbox, modify the delivered message to suggest to Alice that she can ask Bob to find the automated notification message and click on one of the links, or send an automated reminder request to <bob@bosscompany.com>. Other examples of where this approach is beneficial relate to document sharing systems (e.g., Google Docs™, Dropbox™, Box™, eSignature systems (e.g., Docusign™), scheduling/coordination systems (e.g., OpenTable™), and other workflow systems (e.g., JIRA™).

A further aspect of the disclosed technology is a practical architecture for detecting display name deception, wherein the novel aspects comprise the data structure used to minimize the time and storage requirements. The embodiment makes use of a probabilistic data storage method such as a Bloom filter. The system generates a collection of pairs of Bloom filters. In each pair, a first Bloom filter is used to store information relating to display names and the second to store the associated email addresses. The Bloom filters are trained by obtaining pairs of (display name, email address) to be stored and normalizing these before storing them. One way of normalizing the display name is to replace any character that is not a letter with a space, e.g., processing an example display name "John F. Johansen-Garcia" to obtain "John F Johansen Garcia"; then to optionally remove any letter substring shorter than 3 letters, e.g., processing "John F Johansen Garcia" to produce "John Johansen Garcia"; then alphabetically, sort these component words, generating "Garcia Johansen John"; then for each apparent reference to a user, generate all subsets of words of size two, where for an apparent reference to a company such as "PayPal Customer Service" to generate all subsets of size one and two, where a display name is determined to be a person name if any word matches a known name from a list of names. Each subset such as "Garcia Johansen John," "Garcia Johansen," "Garcia John," and "Johansen John" is stored in the Bloom filter. In some embodiments, all letters are changed to lower case before storing the subsets, and in another, any confusable letter such as a Cyrillic letter looking like a Latin A is replaced with a Latin letter A, conditional on the other letters in the name being Latin letters, or some threshold number of them being Latin letters. These are example methods for normalization of the input strings, and are just for illustrative purposes. In addition to storing the display name and its subsets, after being normalized, in the first Bloom filter or similar probabilistic structure, the email address of the sender is also normalized and stored in the second Bloom filter or similar structure. The normalization for email addresses is preferably different than that of display names. One step is for all the letters to be turned into a consistent case, such as either all lower case or all upper case. Additionally, for email addresses for which there is a user-specified variable component, as for gmail addresses, this component is preferably removed before storing the address in the second Bloom filter. This also applies to other variable-component senders, such as some enterprises that use the variable-sender method to track the efficacy of advertising campaigns. The system preferably stores and maintains a list of such domains, and uses a detection method to determine if an email is sent from a sender address that matches the format of a variable-component sender for the associated domain. Examples of such heuristic methods include the length of the sender address exceeding a threshold, containing a character such as a '+', and more. The above describes the training phase of the Bloom filters. As described, there is preferably a collection of pairs of Bloom filters, where a first pair corresponds to commonly recognized brand names, where such a list can either be manually identified or determined based on databases or services such as Alexa, and would preferably also comprise senders associated with the law firm of a protected enterprise, senders associated with a PR agency used by the protected enterprise, senders associated with the CPA of a protected enterprise, etc. Such senders can also be part of a second category. The second category preferably comprises names and email addresses of highly visible users within an organization, such as members of the C-suite. Whereas not all employees communicate with these members, it is likely that they are familiar with their names, and therefore, these names have a name recognition aspect to potential recipients who are employees of the organization. This second category corresponding to a second pair of Bloom filters preferably also comprises names and email addresses of well-recognized external users. The configuration of this second category is preferably done by manual selection of users by an admin, or using automated methods relying on public records or LDAP databases for employees with C-suite employees automatically selected. The first and second categories correspond to brands and users that are likely recognized by typical employees of the protected enterprise. A third category corresponds to senders that individual employees are familiar with, but not necessarily all employees. This preferably corresponds to the display names and email addresses of users with whom these individual users correspond with; and the selection of the names and addresses is preferably automatic using the contact or address list associated with individual employees of the organization or based on emails observed to have been sent by these users or received by these users. The latter corresponds to the notion of a "trusted" sender, as described in co-pending applications. The Bloom filter's associated with this third category are specific to the individual recipients of emails, i.e., to individual employees within the protected organization, whereas the Bloom filters corresponding to the two first categories are shared for all employees. This description is only for illustrative purposes, and additional categories with associated Bloom filters can be created and maintained. For example, one division or group within a company can be associated with one category, where the associated Bloom filters are configured to store information relating to parties that members of this division or group are likely to associate with. This can be determined manually and be configured by uploading information associated with a database or list, or it can rely on traffic analysis. Categories can also be created for roles within an organization. For example, the CISO would have a category associated with him or her as an individual, and also one associated with his or her role as a CISO. When a new CISO is hired, this person preferably would inherit the role-dependent category and associated Bloom filters from the previous CISO. The determination of whether a party should be associated with the person or the role of an employee is preferably based on determining in an automated manner whether the email contents are personal or role-based, whether the sending organization is primarily associated with personal use or role-based use, and more. One benefit with the use of role-based categories is that this enables swift configuration of a system as people move from one role to another. Preferably, as a user makes such a move within an organization, the personal category would be preserved from before the move whereas the role-based would be inherited by one or more predecessors in that or related roles.

After the Bloom filters have been configured, the system scans incoming emails to determine whether they match a display name stored in at least one of the Bloom filters associated with the organization, group, role, or personal profile of a recipient, but not an email address stored in the corresponding email-storing Bloom filters. These determinations are made after the display name and email address of the sender are normalized in a manner corresponding to the normalization in the training phase. Since the system will not know a priori what category a display name corresponds to, if any, it will perform normalization on it as if it were a name of a brand and then test the corresponding subset(s), and also perform normalization on it as if it were an individual user and test the corresponding subset(s). The testing also is performed on the sender email address. If the display name of the sender of an incoming email matches the display name associated with one of the common-category display name Bloom filters or one of the display names associated with the Bloom filter of one of the selected-user (e.g., personal, role, division, group, etc) categories, but the email address does not match an email address associated with the Bloom filter of the corresponding category, then this is a potentially deceptive display name. In some embodiments, the accuracy of this assessment is very high, based on using large Bloom filters, whereas in another embodiment, the accuracy is much lower based on using short Bloom filters. In the latter case, a secondary verification can be performed by accessing a second set of Bloom filters that are larger, or by accessing a database that stores the same information as stored in the Bloom filters, but in a non-probabilistic manner. This allows a practical tradeoff between storage and computation.

The disclosed technology is also helpful to store information relating to Mail User Agent (MUA) signatures associated with messages. This is preferably done by encoding a set of MUA elements, such as the content descriptor; the S/MIME version; the time zone; and additional components of the headers. A known sender is observed and its associated MUA elements are recorded. This is preferably done by storing, in a Bloom filter or a similar structure, an identifier associated with the user and one or more of the MUA headers. For example, the system takes the email address of the user, which is an identifier, and combines this with at least one MUA element such as the S/MIME version, where the concatenation can simply be a concatenation of the two data elements. The resulting value is then stored in the Bloom filter. Then, the system takes the same identifier and another MUA element, combines these, and stores them in the Bloom filter. One or more such combinations are stored. The more MUA elements that are recorded in combination with the identifier, the more accurate the later security assessment will be. Some of the MUA elements will be used verbatim, such as "Content-Transfer-Encoding: quoted-printable." Other MUA elements can be broken down in components, where each component is stored after combining it with the identifier; for example, the header "Content-Type: text/plain; charset='Windows-1252'" is preferably broken down into two components, namely "Content-Type: text/plain" and "charset='Windows-1252'." Yet another option is to partially extract data from MUA elements, for example, the MUA string "—Apple-Mail=_0E26CDE1-A5B8-4EEC-A671-AA585684B354" contains one component "Apple-Mail" of identifying capabilities, and one component ("_0E26CDE1-A5B8-4EEC-A671-AA585684B354") that is unlikely to be useful in identifying the device used by this user later on, as it is not likely to repeat. Various elements belong to these various types.

At a later time, an email from an account is observed. The system extracts the identifier, such as the email address, and one or more MUA header elements, and combines these in the same manner as described above, after which the system determines whether that MUA element was previously associated with the identifier. Depending on the number of matches found, a score is generated. For legitimate traffic that truly comes from the user associated with the email account, this number is likely to be high, such as 7 matches, whereas for illegitimate traffic associated with a malicious user having access to the account, the number is likely to be low, such as 2 matches. In some embodiments, it is determined what the typical number of matches for the account is, such as "at least 5," and this information is stored. This can either be stored in a database keyed by the identifiers of the user accounts, or it can be stored in the same Bloom filter storage structure used to store the MLA information. In the latter case, the count is combined with the associated identifier and the resulting string stored in the Bloom filter. This stored count acts as a threshold, or is used to select a threshold, where any count of matches exceeding the threshold results in one security assessment and any count of matches below the threshold results in another security assessment. The first security assessment would be that it is the legitimate user, whereas the second security assessment is that there is a high risk that the account associated with the observed email has been compromised. If it is determined that there is a high risk of compromise, a security action is taken, where this action may be to insert a warning in the email, block the email, quarantine the email, perform additional scrutiny of the email, temporarily quarantine the email while verifying out of band in a different communication channel with the supposed sender whether the email was sent, followed by an additional action depending on the response or absence of response, or more potential security actions, some of which may involve a human reviewer such as an admin, who is given at least a portion of the email and who is asked to make a security determination about the email. In addition, techniques relating to open quarantine can be applied. The system can let some of the potential actions be performed only if the match count is below a first threshold, such as "block the email if the match count is zero" while another action is taken for another threshold, such as "perform open quarantine if the match count is below the stored normal match count, which for this user is 4."

In another embodiment, emails that are considered safe, i.e., have a trust, value exceeding a threshold, are displayed as usual in the mail reader, whereas emails whose trust values fall below this threshold (e.g., due to being high risk of being sent from a corrupted account or being high risk of being deceptive) are displayed in another way, to indicate the risk to recipients. One such way is to remove display names. Another is to show the display name, email address, and email content, or some portion of this, in a color that is not otherwise used, e.g., light grey instead of black, making the material hardly readable unless the recipient takes an action such as clicking on a button stating "display high-risk material," where this button can be placed in the chrome of the email reader, in or associated with the high-risk email, or in a menu that the recipient has to navigate to.

In another embodiment, clickable buttons are integrated into some or all messages by the security service. Examples of buttons are:

"Unsubscribe." This button would cause an automated attempt to unsubscribe the user from emails, without the need for the user to find an unsubscribe link, which is commonly hard to find, and without having to answer lots of questions. In addition to attempting to automatically unsubscribe the user, the system may also automatically block any email that still comes from the sender to the user.

"Report phishing." This button automates the reporting of the email to an admin, and may be used to automatically initiate a blocking of content of the same type, training of filters, and more.

"Remind me later." Clicking this button will add a calendar notification for the user, at a time selected by the user or pre-configured by the user, and containing information from the email and a clickable link to the email.

FIG. 1 is a diagram illustrating an embodiment of a system environment for analyzing a message. Examples of the message include an electronic mail (i.e., email), an instant message, a text message, a Short Message Service (SMS) message, a text message, a Multimedia Messaging Service (MMS) message, and any other forms of electronic messages. Analysis server 102 is connected to recipient message server 106 via network 108. In some embodiments, analysis server 102 is directly embedded or implemented in recipient message server 106. Sending message server 104 sends a message to recipient message server 106 for delivery to a recipient associated with recipient message server 106. In some embodiments, recipient message server 106 is a local message server. Gateway 110 receives the message prior to delivery to recipient message server 106. Gateway 110 may process incoming email messages for one or more recipient users of an organization (e.g., for users with a common domain email address). In various embodiments, recipient message server 106 may be any type of server that receives a message for delivery to a recipient user. Sending message server 104 is the last server that handled a message prior to delivery to recipient message server 106 via network 108. For example, sending message server 104 is an outgoing email server of a sender of the message. In various embodiments, sending message server 104 may be any type of server able to send a message to recipient message server 106.

Analysis server 102 processes a received message and filters it for potentially harmful or undesired messages. For example, incoming messages are filtered and analyzed for spam, viruses, spoofing, impersonation, ATOed sender, and any other harmful or undesired content to detect, prevent, or minimize such messages from reaching a message recipient served by the recipient message server. In some embodiments, analysis server 102 determines and/or maintains a list of trusted contacts for one or more users (e.g., user accounts) of recipient message server 106. For example, by obtaining an address book from a user and/or observing message traffic to and from server 106 of the user, server 102 determines and/or maintains a list for each user. In some embodiments, analysis server 102 analyzes information associated with a received message to identify one or more resource identifiers included in the message (e.g., URL referencing a webpage of content server 112) and determine corresponding alternate resource identifiers to the original identifier resource identifiers. Then the identified resource identifiers can be replaced with the corresponding alternate resource identifiers.

The original resource identifiers reference external content (e.g., provided by content server 112) that a recipient can obtain using the resource identifier (e.g., resource identifier address content of content server 112). Because a resource identifier can potentially reference malicious content, the resource identifier can be replaced with a corresponding alternate resource identifier. The alternate resource identifier may refer to a security service (e.g., provided by analysis server 102 or another server connected to the network). The alternate resource identifier also may include a portion that identifies the corresponding original resource identifier as well as context information of the message that included the original resource identifier. For example, when a user attempts to obtain referenced content using the alternate resource identifier, the security service (e.g., via a proxy webpage of the security service referenced by the alternate resource identifier) performs a security risk analysis associated with the original reference identifier using the context information (e.g., obtained using the portion of the alternative resource identifier). By analyzing the context information of the original message that included the original resource identifier (e.g., in addition to content referenced by the original resource identifier), a more accurate and efficient security analysis can be performed. For example, if the message was received from a sender that is known to send malicious content, resource identifiers included in the message of the sender are likely malicious as well. Based on the security analysis result triggered by the user making a content request using the alternate resource identifier, the user may be proxied/redirected to the content of the original resource identifier (e.g., content of content server 112), blocked from obtaining content of the original resource identifier (e.g., blocked from accessing content of content server 112), and/or provided content modified based on a security risk. The security analysis result may be logged for review by an administrator or for use in a future security analysis associated with the same message sender, message recipient and/or original resource identifier. By delaying the security analysis until a user requests content using the alternate resource identifier, not only are unnecessary security analyses avoided, most current information learned after the message was received can be leveraged to make better security risk assessments.

In some embodiments, the alternate resource identifier is used to collect information about interaction with content referenced by the corresponding original resource identifier. For example, when a message recipient interacts with the alternate resource identifier to visit or obtain content referenced by the alternate resource identifier, a request for the content of the alternate resource identifier causes information associated with the request attempt to be logged (e.g., in a database). Information about when, who, and any other context information associated with interaction with the alternate resource identifier may be logged and tracked. Tracked interaction information for accesses to the same content/resource identifier can be aggregated across various different message recipients and interaction instances to determine statistics and/or perform analysis (e.g., security analysis). In addition to URLs, other types of content referenced or included in a message can be wrapped with a shell/redirection (e.g., wrapping program, link, reference, phone number, etc.) to track its use/interaction by message recipients.

In some embodiments, a message sent from sending message server 104 is first received at analysis server 102 prior to being received at gateway 110 and recipient message server 106. In some embodiments, a message sent from sending message server 104 is first received at gateway 110 that sends the message to analysis server 102. In some embodiments, a message sent from sending message server 104 is received at gateway 110 that sends the message to recipient message server 106 and recipient message server 106 send the message to analysis server 102. In an alternative embodiment, analysis server 102 is included in gateway 110. In an alternative embodiment, analysis server 102 is included in message server 106.

In addition to analyzing the message, analysis server 102 may block and/or modify the message or instruct another server (e.g., instruct server 106) to block and/or modify the message (e.g., in the event a potential threat is detected). In some embodiments, analysis server 102 initiates a user inquiry regarding a sender of the message in the event a potential threat is detected. In some embodiments, analysis server 102 receives information about one or more messages sent by a user of message server 106 (e.g., receives the message or a portion of the message, a recipient identifier included in the message, etc.). This information may be utilized by analysis server 102 to identify message behavior and/or message contacts of the user.

In some embodiments, recipient message server 106 performs a risk analysis for an incoming message at least in part by performing an authenticity and/or reputation analysis to determine an overall measure of risk (e.g., risk score). Performing authenticity analysis may include determining a measure of confidence that a sender identified in the message (e.g., domain of sender) is the actual sender of the message. Performing reputation analysis may include determining a measure that an identified sender of the email (e.g., domain of sender) is likely to send a message that is of value to a recipient (e.g., likelihood of sending message that a recipient would want/desire to receive).

In some embodiments, a risk analysis performed by recipient message server 106 results in a risk value of a message. The risk value may be utilized at least in part to flag/label the message, modify the message (e.g., add warning), and/or to determine whether to allow the message to be delivered to an intended recipient of the message.

Examples of network 108 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. Although single instances of many of the components shown in FIG. 1 have been shown to simplify the diagram, additional instances of any of the components shown in FIG. 1 may exist. For example, a plurality of recipient message servers are connected and/or managed by analysis server 102. Multiple analysis servers may exist. Multiple recipient message servers may serve the same recipient entity/domain. Components not shown in FIG. 1 may also exist. Any of the components shown in FIG. 1 may be a logical, physical, or virtual component.

Figure 2:
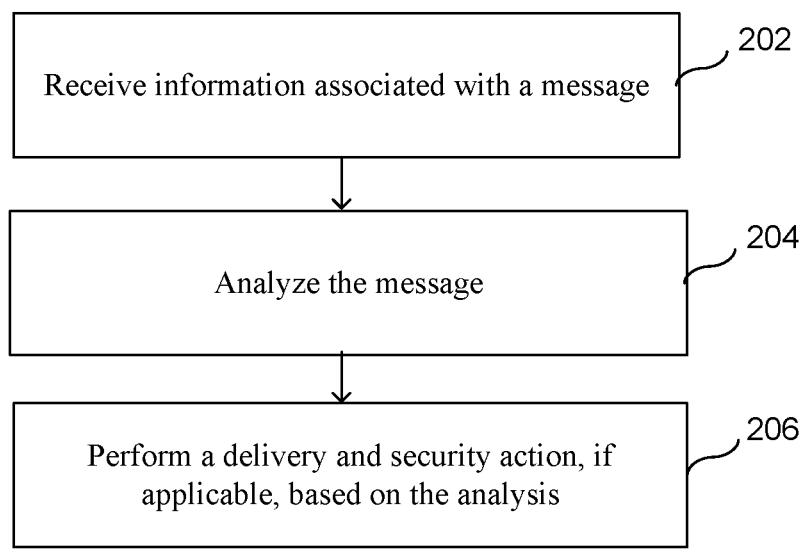
FIG. 2 is a flowchart illustrating an embodiment of a process for analyzing a security risk of a message.

FIG. 2 is a flowchart illustrating an embodiment of a process for analyzing a security risk of a message. The process of FIG. 2 may be at least in part implemented on analysis server 102, gateway 110, and/or message server 106 of FIG. 1. The process of FIG. 2 may be at least in part implemented on an end user device.

At 202, information associated with a message (e.g., message to be delivered to an intended recipient) is received. In some embodiments, the information is received at analysis server 102 of FIG. 1. The information may include information included in or related to the message. For example, the information includes email header information including information related to email accounts (e.g., email address, display name, etc.) of the sender, recipient(s) information, devices used to compose/send the message (e.g., mail user agent, operating system, location, device time zone, etc.), networks utilized (e.g., server, IP address, cellular network/carrier, etc.), automation, if any, utilized to send the message (e.g., whether a script/API was utilized to send the message), etc.

In some embodiments, the information about the message includes contents of the message (e.g., a copy of the message). Examples of the message include an electronic mail (i.e., email), an instant message, a chat message, and any other forms of electronic messages. The information may be received as a part of a computer security analysis and filtering to identify and neutralize security threats prior to delivering the message and allowing an intended recipient of the message to access the message. In some embodiments, each message received for delivery to its intended recipient associated with the system performing analysis of the message is to be analyzed and information about each of the messages is received for analysis.

At 204, the message is analyzed. Analyzing the message includes performing a security assessment using metadata and/or contents of the message. For example, the message is profiled. Profiling the message may include storing information about and/or included in the message in a database to track historical observations about the sender of the message, the recipient of the message, and/or the content portion of the message. In various embodiments, a total risk score associated with the message is determined based on one or more component analyses performed (e.g., for different security risk types).

At 206, a delivery and security action is performed, if applicable, based on the analysis. In some embodiments, one or more security risk scores are determined in 204 and based on these score(s), a delivery and security action is selected among different action options. The selected security action is performed. For example, a security risk score may indicate that the message is of very low risk (e.g., risk score is below a first threshold) and the message is fully allowed to be accessed by the intended recipient (e.g., allow the message to a message inbox of the intended recipient). If not, the security risk score may indicate that the message is of medium risk (e.g., risk score is above the first threshold but below a second threshold) and the message is modified to include a warning prior to being allowed to be accessed by the intended recipient (e.g., allow the modified message to a message inbox of the intended recipient). Otherwise, the security risk score may indicate that the message is of high risk (e.g., risk score is above the second threshold) and the message not allowed to be accessed by the intended recipient (e.g., send the message to an administrator for further analysis). If there exists a different security risk score for different types of security risks, each different type of score may be analyzed separately and/or analyzed in combination to determine which level, if any, of security action is to be performed.

Examples of the delivery and security action include the following: modifying/replacing one or more resource identifiers included in the message; allowing a recipient to access the received message; updating an identity profile associated with the sender of the received message based on the received message; sending a message to the sender to determine whether it automatically forwards responses; generating a security challenge sent to the sender (e.g., if this is not responded to, it is indicative of higher risk and if it is responded to in an anomalous manner, that is also indicative of higher risk); generating a challenge sent to an alternative account of the sender (e.g., another email address associated with the sender); sending an SMS message to a phone number associated with the sender; placing an automated call to a phone number associated with the sender (e.g., requesting a confirmation or a response from the user associated with the account the security challenge is sent to); modifying content of the message; removing an attachment from the message; not allowing an executable of the message to be executed and/or be included in the message; performing additional automated scrutiny of the message (e.g., including its content portion); performing additional manual scrutiny of the message (e.g., including its content portion); quarantining the message; blocking the message; delivering the message; augmenting the message to reduce the risk associated with it (e.g., modifying its attachments); modifying a display name of the sender; removing a display name of the sender; adding a warning to a display name of the message; adding a warning to a content of the message; analyzing attachments of the message by attempting to execute them in a sandbox or virtual machine; adding a warning to the message prior to allowing the message to be accessed by the intended recipient; and moving the message to a special folder identifying its higher risk.

Figure 3A:
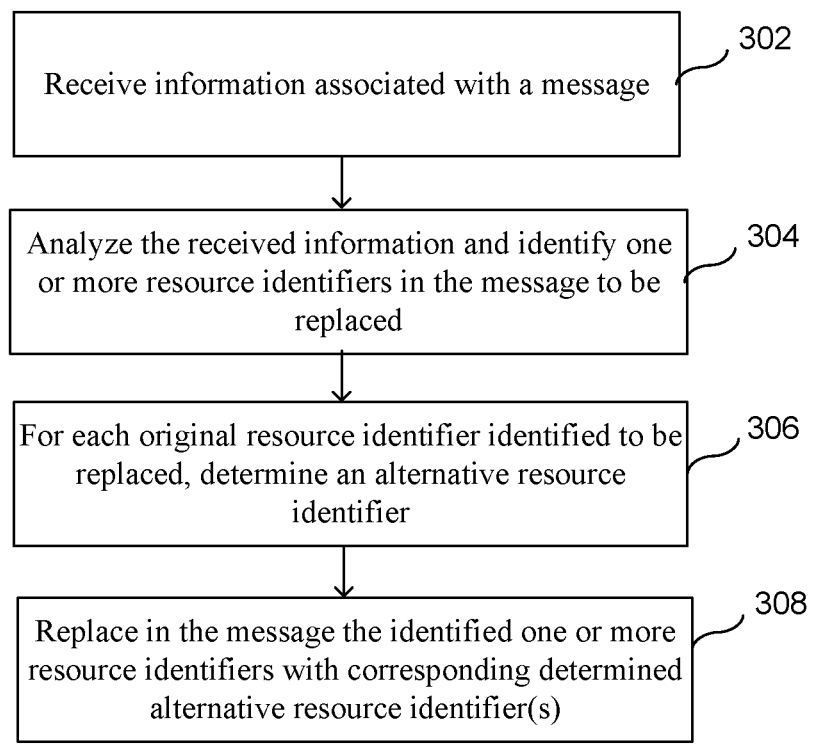
FIG. 3A is a flowchart illustrating an embodiment of a process for replacing resource identifiers included in a message.

FIG. 3A is a flowchart illustrating an embodiment of a process for replacing resource identifiers included in a message. In some embodiments, at least a portion of the process of FIG. 3A is included in one or more steps of the process of FIG. 2. The process of FIG. 3A may be at least in part implemented on analysis server 102, gateway 110, and/or message server 106 of FIG. 1. In various embodiments, the process of FIG. 3A may be at least in part implemented on a mail transfer agent, a mail relay, a gateway, a cloud security device, an on-premise security appliance, and/or an end-user computer device.

At 302, information associated with a message (e.g., message to be delivered to an intended recipient) is received. In some embodiments, the information is received at analysis server 102 of FIG. 1. The information may include information included in or related to the message. For example, the information includes email header information including information related to email accounts (e.g., email address, display name, etc.) of the sender, recipient(s) information, devices used to compose/send the message (e.g., mail user agent, operating system, location, device time zone, etc.), networks utilized (e.g., server, IP address, cellular network/carrier, etc.), automation, if any, utilized to send the message (e.g., whether a script/API was utilized to send the message), etc. In some embodiments, the information associated with the message includes contents of the message (e.g., a copy of the message) and/or attachments of the message. Examples of the message include an electronic mail (i.e., email), an instant message, a chat message, and any other forms of electronic messages.

At 304, the received message information is analyzed and one or more resource identifiers in the received message to be replaced are identified. Examples of the resource identifiers include URLs, URIs, hyperlinks, mailto/reply-to links, call-to-numbers, click-to-call links, File Transfer Protocol links, linked files, attachments, and references to any other materials that a message recipient may interact with. In some embodiments, all resource identifiers (e.g., URLs) included in the message are to be replaced with corresponding alternative resource identifiers. In some embodiments, only those resource identifiers identified to pose a threshold security risk are to be replaced with corresponding alternative resource identifiers. There are benefits associated with replacing all resources identifiers, as opposed to only resource identifiers that are considered high risk. Namely, this approach produces a uniform view from the user's perspective; it permits retroactive classification of threats;

and it creates insight into user behavior, including actions taken by users on personal devices. Such devices commonly do not have the same degree of protection as enterprise-issued computers, and introducing URL proxies is helpful to monitor and audit risk.

The security risk assessment of one or more resource identifiers included in the message may be performed prior to delivery of the message to an intended recipient and/or after delivery of the message to an intended recipient (e.g., when a user requests content using the alternative resource identifier). For example, an initial assessment is made on whether the sender of the message is a known malicious sender, a trusted sender for the recipient (e.g., is sender in an address book of the recipient, is the sender a stranger, amount of previous communication between the sender and recipient, etc.), and/or a verified sender (e.g., whether the sender is from a domain with a Domain-based Message Authentication, Reporting and Conformance (DMARC) policy passes Sender Policy Framework (SPF) and Domain-Keys Identified Mail (DKIM) validations). In another example, an assessment is made on whether the resource identifier refers to known malicious content by comparing at least a portion of the resource identifier to a known list and/or obtaining and analyzing content referenced by the resource identifier. In some embodiments, a classification of the message is determined based at least in part on the received information associated with the message. For example, a classification of the message is determined based on information about whether the sender and the intended recipient of the message has an established relationship. The classification may indicate one or more of the following: whether the sender is trusted, whether the sender is unknown, whether the sender has a potentially deceptive identity, whether the sender is associated with the recipient, whether a display name of the sender is similar to a trusted contact of the intendent recipient (e.g., display name matches but a message address of the sender does not match the trusted contact), a role associated with the sender, etc.

In some embodiments, the sender of the message has an established relationship with the intended recipient of the message if the sender (e.g., from email address of the sender) has sent a message to the intended recipient of the message (e.g., recipient email address of the message) a threshold number of times, if the intended recipient has previously sent a message to the sender a threshold number of times and/or if the sender has been sending messages to the intended recipient of the message for a threshold length of time. For example, the sender of the message is the established relationship contact of the intended recipient of the message if a threshold number of messages have been exchanged between the sender and the recipient. In some embodiments, a sender model developed for the sender of the message is utilized to determine whether the sender is an established relationship contact of an intended recipient of the message.

In some embodiments, determining whether the message was received from an established relationship contact of an intended recipient of the message includes determining a trust score associated with the sender of the message for the intended recipient of the message. If the trust score is above a threshold, the sender is identified as having an established relationship with the recipient and otherwise, the sender is identified as not having an established relationship with the recipient. The trust score indicates the closeness of the relationship between the sender and the intended recipient. This can either be a binary predicate or a real number. In a simplified example, the trust score can be set to 1 (e.g., indicating established relationship) if each of the two parties has sent the other at least three messages over a course of no shorter than one month, and otherwise to 0 (e.g., indicating not an established relationship). In another example, the trust score can be a function of the number of messages received by the recipient organization sent by the sender's organization and the number of messages that have been identified as undesirable, whether by the classifier or by a recipient.

In some embodiments, the trust score of the message identifies the extent to which the system recognizes the sender based on its historical message traffic; as such, it may not be limited to the history of the recipient or her organization. For example, a message from a sender with a very brief history would receive a low trust score, especially if the communication pattern is similar to that of previously identified malicious senders. A sender with a longer history and low traffic volume (but very few or no complaints of past abuse) would have a higher trust score, and a sender with a long history, high volume, and few or no complaints would correspond to an even higher trust score.

In some embodiments, determining whether the sender of the message has an established relationship with the intended recipient includes determining whether the sender of the message is included in a contact list (e.g., address) of the intended recipient. For example, if the sender of message is included in the contact list of the intended recipient and a sufficient number of the message was previously exchanged between the sender and the recipient, it is determined that the sender has an established relationship with the recipient.

In some embodiments, determining whether the sender of the message has an established relationship with the intended recipient includes obtaining a social, organizational, communication, collaboration, business and/or other relationship information of the sender and/or the intended recipient. Information about the sender and/or other users connected/related to the intended recipient may be obtained by requesting the desired information from a service (e.g., an external third-party service accessed via an Application Programming Interface such as Microsoft Graph API). For example, an identifier of the intended recipient of the message is provided to the service, and the service provides a list of other users connected to the intended recipient (e.g., connected via a social network, organizational relationship, business contact, etc.) that is ordered by the various other user's relevance to the intended recipient (e.g., order based on previous communication, collaboration, business relationships, etc.). It is determined that the sender of the message has an established relationship with the intended recipient if the sender is included in this list as having a sufficient relationship with the intended recipient (e.g., included in the list). Otherwise it is determined that the sender of the message does not have an established relationship with the intended recipient. In another example, an identifier (e.g., email address) of the sender of the message is provided to the service and the service provides information about the sender (e.g., information about the sender gathered across various different message repositories, contact lists and social networks). This information about the sender is used to assess a strength of a relationship between the sender and the intended recipient of the message (e.g., along with message history between them), and if the strength value of the relationship is greater than a threshold value, it is determined that the sender of the message has an established relationship with the intended recipient. Otherwise it is determined that the sender of the message does not have an established relationship with the intended recipient.

In some embodiments, the initial security risk assessment is performed based on a security policy. The security policy may distinguish the sender from other senders, distinguish the recipient from other users and/or be based on information associated with a threat, a configuration and/or a logged event. In some embodiments, a result of the initial security risk assessment of the original resource identifier is specific to the associated message, a recipient of the associated message, and/or a sender of the associated message, and thus may not valid for other messages, recipients and/or senders of the same resource identifier.

A result of any initial security risk assessment and/or classification may be identified as context information of the message (e.g., to be associated with alternative resource identifiers generated in 306). The security assessment may also be performed when a user actually requests content associated with the resource identifier.

At 306, for each original resource identifier identified to be replaced, an alternative resource identifier is determined. At least a portion of the alternative resource identifier (e.g., handle included in the alternative resource identifier) can be used to obtain the corresponding original resource identifier and context information associated with the message. In various embodiments, at least a portion of the alternative resource identifier is associated with the message, a record in a database, a message storage unit, a campaign, a key used to compute an authentication value, a security process, and/or a security action.

In some embodiments, the original resource identifier is mapped to a handle value (e.g., any alphanumeric value that may be the same or different from the original resource identifier) and included in an alternative resource identifier generated for the original resource identifier. The network domain of the alternative resource identifier may be the selected network domain of a security service and the handle value is included in the alternative resource identifier as at least a part of a URL argument (e.g., after "?" character), subdomain, path, and/or filename. This handle value can be later extracted from the alternative resource identifier and used as a lookup into a database (e.g., including a message storage) that associates the handle value to the corresponding original resource identifier and associated context information. For example, when the alternative resource identifier is determined for the original resource identifier, a corresponding database entry is stored in the database.

In some embodiments, the alternative resource identifier is based at least in part on the original resource identifier and an intended recipient of the received message. This allows the generated alternative resource identifier to be specific to a particular intended recipient and a particular original resource identifier. For example, if the received message is sent to a plurality of recipients, a different alternative resource identifier is generated for each intended recipient (e.g., different one for each recipient email address specified in the message) for the same original resource identifier. By using a different alternative resource identifier for different recipients, actions of each different recipient can be individually tracked based on the corresponding different alternative resource identifier. At least a portion of the alternative resource identifier may identify an encrypted/encoded identifier of a corresponding intended recipient of the received message.

In some embodiments, generating the alternative resource identifier includes searching and identifying an entry in the database corresponding to the original resource identifier and using data from this entry, if any. For example, if at least a portion of the alternative resource identifier has been already generated for the original resource identifier and/or an intended recipient of the received message and saved in the entry, the saved alternative resource identifier is obtained for use as the generated alternative resource identifier. The entire alternative resource identifier or one or more portions of the alternative resource identifier may be obtained from the entry in various embodiments.

In some embodiments, at least the original resource identifier is encoded/encrypted as an encoded/encrypted value (e.g., the original resource identifier may be encrypted along with context information), and the encoded/encrypted value is included in the alternative resource identifier generated for the original resource identifier. The network domain of the alternative resource identifier may be the selected network domain of a security service and the encrypted value is included in the alternative resource identifier as at least a part of a URL argument (e.g., after "?" character), subdomain, path, and/or filename. This encrypted value can be later extracted from the alternative resource identifier and used to obtain the corresponding original resource identifier and context information by decrypting the encrypted value. In an embodiment where the context information is not included in the encrypted value, the encrypted value and/or the original resource identifier may be used to look up in a database the associated context information.

For example, say that the original resource identifier is a URL that references "www.somesite.com/somepath." This resource identifier is mapped to a value 7623655, and the alternative URL can be determined as www.somesite.com.7623655.alert.com/somepath. This value can serve as a handle, which can be used as an index into a database or the handle can encode information directly. There are many alternative encodings of state information. For example, a URL such as the example URL www.somesite.com/somepath can be replaced with a URL such as www.somesite.com/somepath?7623655 where the added portion is identified by a plugin, a modified browser, a gateway or other perimeter device, or by middleware on a computer such as the recipient's computer or phone. This modified URL may look less confusing to a typical end user, and is typically rendered the same way as the original URL if forwarded to a third party who does not have the security system described herein. It is possible to leave the extension there even if the second recipient does not have functionality to evaluate the site and the context and perform a security decision. Similarly, a URL can be replaced with a URL that bears no resemblance to the original URL, but which encodes the value identifying the context or an entry in a database that describes the context. For example, a URL such as www.somesite.com/somepath can be replaced with a URL such as www.securelink.com/7623655 or even a URL that is of a format that is not normally clickable, such as http://www.7623655; whereas this is not a legitimate URL, the proxy will identify it as a modified URL and perform a lookup or other determination before taking a security action.

For resource identifiers that are determined to be safe, these resource identifiers may either be the original resource identifiers or a resource identifier that is modified by attaching a "secure confirmation value" instead of the previous context-conveying value. For resource identifiers that are determined to be unsafe, these resource identifiers may be modified resource identifiers that replace the context-conveying value with an "insecure confirmation value." At any time when the unit identifies a request corresponding to a secure or insecure confirmation value, it can take an immediate action that does not require any lookup of contextual determination. Several resource identifiers may share the same confirmation values, or the confirmation values may be at least in part message-specific, resource identifier-specific, campaign-specific, origin-specific, or similar. A campaign may correspond to a positive series of messages (such as desired marketing messages from one vendor) or a negative series of messages (such as attack emails related to one particular threat). A portion of a resource identifiers-dependent confirmation value may comprise a resource identifiers-specific message authentication code, or portions thereof, thereby detecting potential attempts to modify marked-up resource identifiers by a recipient. Such resource identifiers can be treated separately, and may cause blocking as well as feedback to an admin or the user. Message authentication codes, also known as MACs, may be calculated using inputs that comprise a key unique to an entity such as one or more units used for security screening Examples of the associated context information (e.g., stored in a database entry associated with at least a portion of the alternative resource identifier or encrypted and included in the alternative resource identifier) include: a display name, an address, an associated security risk, and any other information associated with a sender of the original message; a display name, an address, an associated security risk, and any other information associated with one or more intended recipients of the original message; a classification/security risk analysis result associated with the original message; a classification/security risk analysis result associated with the original resource identifier; at least a portion of a metadata of the original message; at least a portion of a message content of the original message; a sent time, receipt time, and any other time associated with the original message; and any other information associated with the original message or the original resource identifier.

The database storing the context information may be used to track and store interaction information associated with the corresponding resource identifiers. For example, the database is updated when a message recipient interacts with an alternative resource identifier (e.g., time/date and which message recipient accesses content of the alternative resource identifier). The database can be used to associate together and track interaction statistics for the same original resource identifier across various different message recipients. For example, the database links together the various different alternative resource identifiers associated with different message recipients for the same original resource identifier and the database is updated every time one of the alternative resource identifiers for this original resource identifier is accessed.

The database storing the context information may store information indefinitely; until it has been accessed and a determination made; for a fixed amount of time, such as one week; until a positive (safe) decision has been made; until a negative decision (high risk) has been made, in which case the original URL may be placed on a block list; and/or until a user action has been performed, such as placing the message in the trash folder, or according to a policy that is associated with the recipient or his or her organization. In one embodiment, only the first determined context of a message is stored, where this corresponds to when the message is sent from outside the security perimeter to inside the security perimeter, and the security perimeter may correspond to an organization that is protected. In other embodiments, the last context is stored, corresponding to the context between the last observed sender and the last observed receiver; or all context accumulated over the course of the transmission of the message in to and within the security perimeter. As an alternative, different contexts are used for the evaluation of the resource identifier, depending on the context relative to the clicking recipient of the message, which is the party who clicked on the resource identifier, and the sender that sent the email to that person. In one embodiment, it is part of the context whether the message was sent to multiple users or just one, and in the case of multiple, what users, and whether there is a known group that these correspond to. Such a group being matched could either be a positive indication of good security, or a negative indication of high risk, depending on the group and the policy. In one embodiment, the value used in the alternative resource identifier or otherwise identifies its context can be a value that indexes not a database of contextual information, but which identifies one or more emails in the mail archive maintained by the organization, thereby allowing a retrieval of the email and its context at the time of the security evaluation, which may be performed in response to a request from a user/recipients to access the website associated with the alternative resource identifier.

Security analysis may take several minutes, and sometimes even longer. Therefore, it is also advantageous to create a record in a database, and modify the original resource identifier of the received email by adding or incorporating a reference to this database entry at the time of the initial processing of the incoming message. Then, in some embodiments, a process is spawned to perform the scrutiny, where this process has as input, the message, and contextual information relating to the sender, the recipient(s), and any type of related policies, along with the identifier of the database record. As the process is making inferences relating to risk and context, these are added to the database entry. Alternatively, the processing can be performed in response to the recipient requesting content of the alternative resource identifier. In some situations, a policy is used to determine whether to proactively evaluate a resource identifier and the context of the message, or to perform these tasks in response to a system event, such as a request content of the resource identifier. Other triggering system events include the forwarding of the message, the response to the message, or the opening of the message; these are all events that can be identified in many message systems. If multiple users are receiving messages from the same sender, with the same content, or otherwise matching the same classification rule, it may be sufficient that the context of the resource identifier and the content of the website be evaluated once. To take advantage of this, it may be beneficial to associate such related records to each other. This can be done by linking the records to each other, e.g., by flagging that they all triggered the same rule, and adding cross-record links in the database. If one resource identifier is considered highly risky, then it may not be necessary to evaluate the same resource identifier sent to others in the system. Similarly, if a resource identifier is determined to be very low risk, then it is also not necessary to re-evaluate the resource identifier when sent to other users.

However, some resource identifiers and their security assessments depend directly on information relating to the recipient (e.g., such as whether this person is a developer who commonly received executable code by email) and relating to the pair of sender and recipient (e.g., such as whether the file types of files with related contents are commonly sent between these two parties). In such cases, at least a portion of the security assessment can be performed on an individual basis, whether for all recipients or for all recipients who request content of the resource identifier in question. However, it still may be beneficial for portions of the processing, such as the evaluation of the website, to be performed only once. The same argument applies to similar but non-identical resource identifiers assessed to belong to the same cluster, e.g., due to having the same sender or very similar email text content. Another benefit with associating records with each other is that if a large-scale campaign hits one or more enterprises that are all managed by the security service, then the information relating to the volume of the message can be used to score the risk; this score may be automatically adjusted over time as more information is learned about a particular campaign.

At 308, the identified one or more resource identifiers are replaced in the message with corresponding determined alternative resource identifier(s). The modified message with the alternative resource identifier(s) may then be allowed to be delivered to the intended recipient(s) of the message instead of the original message. Because the alternative resource identifier(s) can point a proxy that can dynamically track when the recipient requests content of the alternative resource identifier, further security analysis can be performed dynamically when the request is made. For example, using the alternative resource identifier, the corresponding original resource identifier and associated context information are obtained and used in analyzing a security risk of content referenced by the original resource identifier. If it is determined that content referenced by the original resource identifier is safe, the content is obtained and provided and/or the requester is redirected to the original resource identifier. Otherwise, the request for the content is blocked or a modified content is provided.

If an email with an alternative resource identifier is forwarded, then in one embodiment, the replacement of the original resource identifier is undone. In another embodiment, the replacement of the original resource identifier is kept conditional on who the new recipient is, and his or her relationship to the original recipient. This allows for a tracking of the transmission in the system, wherein the receiving system of the new recipient may add to the database of contextual information to describe the context as seen by the second and new recipient. It is also possible to add a second alternative resource identifier associated with this second-recipient context.

In some embodiments, the original resource identifier identified to be replaced is of an attachment to the message, and the alternative resource identifier is a content location address referencing an online location where the content attachment content can be obtained. For example, the attachment is to be removed from the message and stored at a location where it is accessible online, if allowed. The alternative resource identifier may serve as a link providing access to this location where the attachment can be downloaded, in addition to triggering other actions such as providing interaction information for tracking/logging and/or performing a security assessment and/or security action.

In some embodiments, the alternative resource identifier is associated with a wrapper of a message attachment. For example to modify an attachment, the attachment may be 'wrapped', where the wrapper is an executable or a reference to an executable, such that when this executable is engaged as a result of the recipient clicking or otherwise interacting on the modified attachment, the executable provides interaction information for tracking/logging and/or performs a security assessment and/or security action. This modified attachment may be included in the message instead of the original attachment.

Figure 3B:
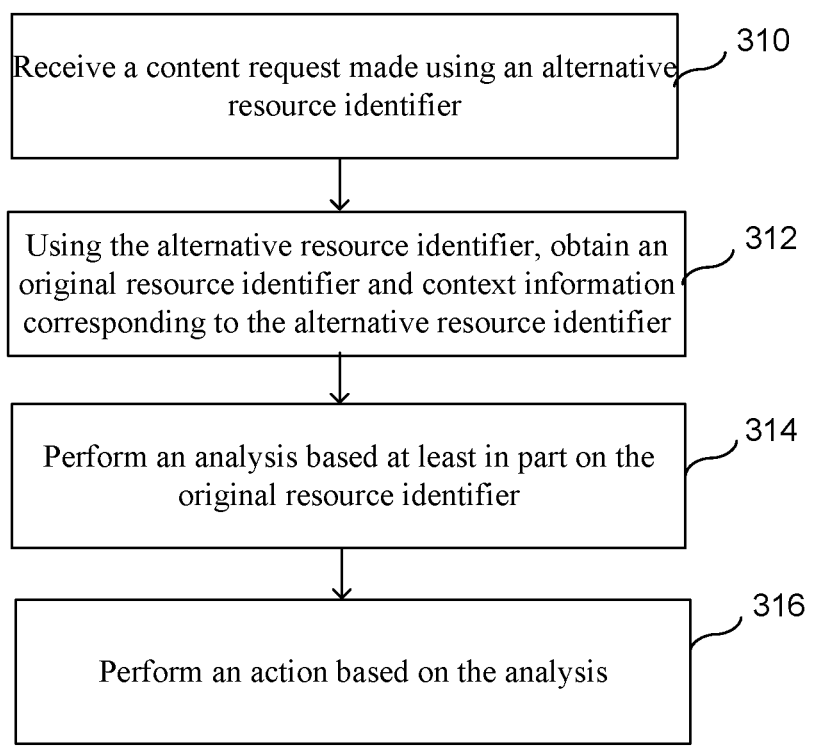
FIG. 3B is a flowchart illustrating an embodiment of a process for handling a content request made using an alternative resource identifier.

FIG. 3B is a flowchart illustrating an embodiment of a process for handling a content request made using an alternative resource identifier. The process of FIG. 3B may be at least in part implemented on analysis server 102, gateway 110, and/or message server 106 of FIG. 1. In various embodiments, the process of FIG. 3B may be at least in part implemented on a mail transfer agent, a mail relay, a gateway, a cloud security device, an on-premise security appliance, and/or an end-user computer device.

At 310, a content request made using an alternative resource identifier is received. In some embodiments, the alternative resource identifier was determined using the process of FIG. 3A. For example, the content request is made by a message recipient selecting a hyperlink of the alternative resource identifier included in a received email message. An example of the content request is an HTTP request using an alternative resource identifier URL. The alternative resource identifier refers to content of a security service (e.g., proxy webpage) that when detected by a security service, triggers an analysis to determine a security risk associated with an original resource identifier corresponding to the alternative resource identifier. In some embodiments, the alternative resource identifier can be used to identify the message recipient that requested the content of the alternative resource identifier. For example, at least a portion of the alternative resource identifier includes or is mapped to an identifier of the message recipient.

At 312, an original resource identifier is obtained using the alternative resource identifier, and interaction information associated with the content request is stored. For example, the original resource identifier is obtained to allow the request to be forwarded to the content of the original resource identifier, if allowed, and the interaction information is stored in a database for subsequent use/analysis. Storing the interaction information may include storing/logging information about a time/date, the message recipient, and any other context information associated with the request in a database or other data structure in an entry associated with the original resource identifier in response to receiving the content request (e.g., the content request refers to a proxy webpage that causes the interaction information to be stored prior to forwarding the request to the original resource identifier, if allowed).

In some embodiments, context information corresponding to the alternative resource identifier is also obtained. In some embodiments, at least a portion of the alternative resource identifier is used to look up an entry in a remote database that corresponds to the alternative resource identifier. This entry may include the corresponding original resource identifier and/or associated context information. Alternatively, instead of database lookup, an application programming interface (API) may be used to convert the lookup value to context information, whether by decoding it, accessing a database, or a combination of these. In some embodiments, at least a portion of the alternative resource identifier is decrypted to obtain the original resource identifier and/or the context information. For example, the alternative resource identifier may directly include an encrypted version of the original resource identifier and/or the context information.

In some embodiments, at least a portion of the process of FIG. 3B may be performed by a web browser, whether by having support from the browser manufacturer or because the end user or an admin had installed a browser plugin performing the functionality of the unit. Alternatively, a gateway scans outgoing network traffic for the user and performs at least a portion of the process of FIG. 3B. It can also be performed remotely, e.g., on a website of the domain of the alternative resource identifier.

Examples of the associated context information (e.g., stored in a database entry associated with at least a portion of the alternative resource identifier or encrypted and included in the alternative resource identifier) include: a display name, an address, an associated security risk, and any other information associated with a sender of the original message; a display name, an address, an associated security risk, and any other information associated with one or more intended recipients of the original message; a classification/security risk analysis result associated with the original message; a classification/security risk analysis result associated with the original resource identifier; at least a portion of a metadata of the original message; at least a portion of a message content of the original message; a sent time, receipt time, and any other time associated with the original message; and any other information associated with the original message or the original resource identifier.

At 314, an analysis is performed based at least in part on the original resource identifier.

In some embodiments, performing the analysis includes analyzing interaction information associated with the original resource identifier. For example, in order to identify who has been exposed to malicious content associated with the original resource identifier, a list of message recipients that requested content using one or more alternative resource identifiers of the original resource identifier is generated. This list may be generated by identifying one or more entries in a database that are updated (e.g., updated in 312 in various executions of the process of FIG. 3B) when content of the original resource identifier is requested using the one or more alternative resource identifiers. In another example, one or more engagement statistics (e.g., number/rate of message recipients that interacted with/requested content of the original resource identifier, average amount of time between receiving the associated message and engaging/requesting content of the original resource identifier, score associated with likelihood of a message recipient engaging/interacting with the content of the original resource identifier, etc.) are determined.

This allows an auditing operation that is not necessarily a security action to be performed. For example, the auditing action may be to associate the modified artifact, its sender, and its receiver with the time it took from the delivery of the message until the user engagement with the modified artifact. This way, it can be determined, whether per sender, per receiver, or per message type (e.g., all of which would be part of the contextual information) what the user reaction time is, where one aspect of the reaction time is the time from delivery of the message to the time of the user engagement with the alternative resource identifier, and another aspect of the reaction time is the time from the recipient user opening the message to the time of the user engagement with the alternative resource identifier. The percentage of the time that a user engages with the alternative resource identifier can be also determined, whether based on the sender identity or group membership, the content of the message, or the content type, or based on previous actions of the recipient user. This is a very powerful productivity tool for organizations as it allows the automated identification of: effective messages; messages that are convincing, workflows that lead to high productivity, senders that derail the focus of recipients by sending recreational content that stops productivity, etc. An example use is to determine what services generate the most click-through, where the compared service may comprise commercial services or come from colleagues or other contacts referencing content associated with such services.

In some embodiments, performing the analysis includes performing a security risk assessment using the obtained information. For example, the content referenced by the original resource identifier is obtained and analyzed along with the obtained context information. One or more various components of security risk assessment may be performed to determine a security risk score. For example, the obtained information is evaluated, in light of a policy that is associated with at least one of the sender, the recipient, groups or organizations that either of these belong to, or a combination of these matters, along with additional information such as temporary policy override information, domain-specific information, recipient preferences, data related to the time of the day, and more. A more careful scrutiny may be preferred during early am hours, compared to during business hours, since the latter may impose an inconvenience on users by potentially causing delays. Performing security risk assessment may include rendering or emulating the rendering of the site referenced by the original resource identifier, and identifying functionality that is associated with high risk, such as JavaScript that initiates a download of a file, or two fields appearing to be for username and password, or logos that are commonly used on phishing sites, and which are not associated with the domain of the site. Here, it should be understood that rendering the site does not require displaying any portion of it on a screen; the rendering can be performed in a virtual machine that examines the result of said rendering by analyzing what a user would have seen if the website were rendered on a screen. These are indicators of risk. Based on the information of the sender, whether the sender is trusted, whether the sender or other aspects of the message are potentially deceptive or have a high associated risk score, based on the recipient and his or her risk preferences, information about the site, and one or more policies, which may be hardcoded in or provided separately, a risk determination is made. A result of the security risk assessment may also be logged to allow an administrator to review risks and/or for use in future security analysis.

In some embodiments, performing the analysis includes performing a security risk assessment based on a security policy. The security policy may distinguish the sender from other senders, distinguish the recipient from other users and/or be based on information associated with a threat, a configuration and/or a logged event. In some embodiments, a result of the security risk assessment of the original resource identifier is specific to the associated message, a recipient of the associated message, and/or a sender of the associated message, and thus may not valid for other messages, recipients and/or senders of the same resource identifier.

In one embodiment, a user risk score is computed. This is a score that depends on the sender and his or her historical risk behavior (such as distributing dangerous messages, links, and attachments); the sender's role (such as being an influential person); the role of any party whose identifying information resembles the sender, where this party is known by and/or trusted by the recipient; the recipient and his or her historical risk behavior (such as opening dangerous messages, clicking on dangerous links, and opening dangerous attachments, where an item is considered dangerous if it or its format is correlated with risk); and the recipient's role (such as being a person who is desirable for an attacker to attack). Further, the risk may vary not only with the sender and recipient but with the pairing: a recipient with access to financial data or controls in combination with a financerelated attack may present a much higher risk than a recipient in IT; but the same recipient may be the most dangerous target for an attack relating to cloud credentials. The example benefit of this approach is that it allows specification not only of the putative destination for a resource identifier (which proxies and crawlers already do), or the internal user (which security agents and internal controls do), but of the pairing.

The scores can be derived from past interaction with emails; past results in training sessions; past browsing history; and configurations made by the sender/recipient or admins associated with either of these. Context here is also historical—given the benefit of hindsight. Very often attacks are much clearer after they have passed. This is useless information in many security approaches, since the danger has moved on. But with historical data, notably unavailable to the web crawler or proxy, actions by the given user taken months ago may be evaluated in light of everything learned since the actions. And if this can color the assessment of the risk of the user's actions today, it can greatly ameliorate the dangers posed by their actions tomorrow on threats not yet understand. This can be a general measurement of the "gullibility" and "value" of the target, but can be even more specific to a behavior or attack type—over the past year, it may be noted that a user will blindly click on anything that looks related to their social media presence. This can then be used to tune the risk of a specific link in a message to that user. Lastly, this historical data can be used to project increased exposure proactively. If historical data shows a user has engaged with a previous threat or it has been observed in previous campaigns, it is known that their email address and/or identity is known to bad actors, and this may be utilized to evaluate new threats. For example, if a resource identifier shows up for multiple receivers, and it is known that the same set of recipients were victims of previous attacks, a higher risk can be ascribed to the resource identifiers even before evaluating it because of the correlation. There are many circumstances where an email address that has been exposed this way may be known and thus any resource identifiers sent to that user can be given a more aggressive check.

Another aspect of the "metadata" this markup can provide to a web analysis is "epidemiological." One aspect involves understanding how a given attack played out and whether there are further risks. For example, if a resource identifier turns out to be malicious and was sent to a given user—but then emails to other users including the resource identifier are observed in a pattern which does not match that user's normal email behavior, it may indicate some lasting infection on the user's computer. Another aspect is more preventative—if indications of an attack on the user have been recently detected, or on other related addresses, the resource identifier analysis can be more aggressive. Similarly, if a sender has been associated with previous attacks, the resource identifier analysis can be more suspicious of novel resource identifiers—and this metadata is only available as historical (and cross-customer) email context.

In some embodiments, at least one portion of the risk score is automatically derived and based on behavioral observations made by the system or entities related to the system. For example, consider a first value, corresponding to the score between 1-100 that assessed the extent with which the sender identity information matches the identity information of a party that is trusted by the recipient, and which is not equal to the sender itself, and where a sender is trusted if there has been historic communication between the sender and the recipient exceeding a threshold amount. The score is 100 if the identity information that a user can select aligns perfectly with that of a trusted party, and it is 1 if there is no alignment at all with any trusted party, and 50 if there is an average alignment with at least one trusted party, where alignment is measured using string distance or a similar measure. Consider further a second value that is a score between 1-100 that corresponds to the degree of trust the recipient has for the sender. This is a value that can be computed as the 100 times the percentage of the messages sent by the sender that the recipient opened, divided by the percentage of messages sent by the sender that are considered insecure using some security measure, such as having a macro, being associated with phishing, triggering a security risk assessor unit, etc. This second value, therefore measures how trustworthy the sender is, both in terms of his and her objective behavior and in terms of the recipient's reactions to this behavior. The risk score is computed, in this example, as the pair of the two scores (score1, score2), where score1 indicates the match with a trusted party and score2 indicates the extent to which the recipient trusts the sender combined with how trustworthy the sender is. This risk score, being a pair of scores, is valuable when assessing a resource identifier. Therefore, the context in which resource identifiers associated with the email are evaluated comprises this risk score. The score may comprise a score obtained from evaluating DMARC predicates associated with the received email, e.g., indicate whether DKIM policies were satisfied, whether SPF policies were identified, and the type of and age of DMARC policy that is associated with the sender. The score may comprise a score obtained from evaluating the authenticity and trustworthiness of the sending domain of the email which included the URL. The score may also include information about the sender useful to assessing and analyzing risk. Such information could include (a) whether the email was sent from a personal webmail account, (b) whether the email was sent from a well-known and trusted business partner, and (c) whether the email was sent from an account with a well-known and trusted sending history.

In some embodiments, the context information contains personally identifying information associated with the sender, and the message content and/or the relationship between the sender and the recipient, whereas in other embodiments, the context is redacted to only comprise non-identifying information. This latter embodiment is beneficial when the context is communicated outside the system or stored on insecure servers, as well as when data privacy laws require it.

In some embodiments, a user exhibiting good security hygiene would cause the logging of information indicating that this user can have a more permissive policy associated with access to resources. For some users, whether identified by their past actions, by an admin based on a security decision, or by an automated system based on the users' roles, a policy can include information that forces escalated scrutiny of some resources prior to permitting full user access to these resources. This escalated scrutiny may comprise at least one of manual review by a trusted party, such as an admin; automated interaction with the apparent sender; generation of a request for information sent to a system associated with the sender; and use of additional security measures that may be demanding of processor power, requiring substantial storage resources, or causing user friction.

In some embodiments, a stateful browsing session is enabled based on contextual information. For example, consider a user who receives an email that contains a URL that corresponds to a landing page that is not determined to be insecure. However, as a result of the user's selections and actions, the user navigates from the landing page to a page that is risky, given the context of the URL of the message the user received. For example, a user may receive an email from a relative stranger or a stranger, the email containing a URL and the URL pointing to a webpage with a survey. However, at the end of the survey, the user is asked to log in to an account, e.g., using Oauth or a password, in order to be given a benefit, such as a reward for taking the survey. This is a risk that might not be possible to identify by merely automatically scanning the landing page; and the risky page may not be automatically reachable by an automated tool. One reason for this is that pages between the landing page and the risky page may require actions that implicitly involve a human, and potentially, actions that require knowledge held by the receiver but not necessarily by others. This problem is addressed by the disclosed technology, as the proxy making the security determination before issuing a GET request to the resource will preferably modify any URLs in the obtained webpage data in a manner that is consistent with how the URL in the email was modified. This way, as the user clicks on links in the webpage, the proxy will identify these webpage requests as belonging to the same initial message and message context, and therefore, will determine that that consecutive pages should also be examined, as they are being requested, using the same context and policy as the first page. To the extent that end-to-end encryption is used by the accessed websites, this can be addressed by letting the proxy also act as an encryption proxy, very much like what a man-in-the-middle proxy does. As an alternative, the proxy can carry out an independent session with the website, generating web content requests matching those of the users as closely as possible. In embodiments where the proxy resides at least in part on the end user machine, as is the case when a browser plugin is used, the issue of end-to-end encryption goes away, since the proxy then is attached right at the user-end of the encrypted channel. In one embodiment, a policing unit identifies and blacklists websites that have a behavior that depends on whether the requester is identified by the website as an end user or as a proxy. This blacklist can be fed to a security system used to limit traffic to blacklisted sites, and to take other actions, such as the automated filing of complaints and the initiation of take-down efforts, as needed.

In some embodiments, the analysis of executable elements—including macros, webpage JavaScript elements, documents that use display software vulnerabilities to execute code, trojans, and other types of malware and malware risks—can be improved using contextual information. For example, two developers may exchange executable elements by email, and this should not be blocked. Similarly, IT admins may send out messages with hyperlinks associated with webpages where executable elements can be downloaded. This should also not be blocked. When one colleague sends another colleague a suggestion of what software to use, that is almost always benevolent. However, when a stranger sends messages with URLs or attachments associated with executables, this is a much higher risk. The risk is particularly high if the display name or email address of the sender is reminiscent of the display name or email address of a party the recipient trusts. Therefore, such emails should typically be blocked. On the other hand, an email from a stranger that does not contain any high-risk URLs or attachments should typically be delivered. Therefore, it is beneficial to include context in the evaluation of URLs, associated websites, and attachments. In some embodiments, component risk scores are determined for URLs, webpages, and attachments to generate one or more risk scores, and these risk scores are evaluated using a policy that takes context into consideration. The policy may encode organizational preferences that have been collected using an interface in addition to user-specific configurations that depend on historical behavior of recipients, senders, and pairs of these. As a special case is encountered, such as a user receiving an executable attachment from a colleague who has never sent such an attachment, an escalated security review is performed. This may involve senders confirming that they intended to send the message; recipients confirming that they understand that the attachment is executable; and admins confirming that the attachment is acceptable in this context; or some subset of these actions. Additional computational actions may also be performed, e.g., performing a detailed scrutiny of the sender's system, to determine that it has not been compromised, and the functionality of the attachment. Similarly, URLs and messages with URLs can be treated in an analogous manner. After such review and scrutiny, a policy can be augmented to simplify the process the next time a similar event takes place.

At 316, an action is performed based on the analysis, if applicable. Examples of the action includes allowing access to the content referenced by the original resource identifier (e.g., either as proxy or by redirection to the original resource identifier), blocking access to the content referenced by the original resource identifier, providing a modified version (e.g., modifying the functionality) of the content referenced by the original resource identifier, providing a warning, notifying an administrator, requiring an additional user action, logging an event/action associated with the resource identifier, providing a report, and/or storing information related to the resource identifier.

In some embodiments, if a determined security risk score is below a threshold and/or certain security risks are not detected, the original content referenced by the original resource identifier is provided in response to the request made using the alternative resource identifier (e.g., in acting as a proxy, the original content referenced by the original resource identifier is obtained and provided). In another example, if a determined security risk score is below a threshold and/or certain security risks are not detected, the request made using the alternative resource identifier is redirected to the original resource identifier (e.g., via HTTP 301 or HTTP 401 response). In some embodiments, if a determined security risk score is above a threshold and/or certain security risks are detected, the request made using the alternative resource identifier is rejected or a modified content of the original resource identifier provided (e.g., modified to provide a security warning message or disable/remove risky content portions).

Events that are associated with a resource, a resource identifier, a sender, a recipient, or a threat may be logged. For example, if one particular user is found to commonly attempt to access high-risk resources, these attempts can be logged. A user-specific policy then takes these logged attempts into consideration as context information, potentially resulting in a more restrictive permission to access resources associated with high risk, such as any resource whose risk score exceeds a threshold. Seen from another perspective, the threshold associated with a recipient can be part of a policy specific to this user, and be a function of the logged attempts to access resources.

In some embodiments, a security system allows access to a website referenced by the original resource identifier but with additional security measures such as utilizing browser isolation technology, allowing access only to known good sites or allowing access but without JavaScript or other active content enabled. The determination of what functionality to enable/disable may be made based on the obtained context information, the policy associated with the sender, recipient or system, and the threat level, where the threat level is determined based on recent historic events, such as emails and threats received or observed by the system. The "policing" of this determination may be done on the client device, e.g., using middleware, a browser plugin, or the browser itself. Alternatively, it is made on a proxy or a gateway that filters web elements by observing web traffic, and which blocks some types of elements, or which selectively blocks elements with certain capabilities or functionalities, or elements that are not on a whitelist of approved elements. An example element is a JavaScript snippet. In one embodiment, the filtering is made on a proxy that acts as a man-in-the-middle, and which selectively evaluates all traffic or some traffic initiated as a result of a user clicking on a link that originated with a high-risk email, where the risk is assessed relative to a policy, and where the risk is assessed based on the identity of the sender; the identity of the recipient; the roles of the sender and receiver, to the extent that this is known; the historical interaction between the sender and the recipient; the trust determined by the system of the sender and its organization; the assessed likely trust as experienced by the recipient, which is estimated by comparing the sender identity information such as the display name of the sender to the sender identity information of parties that are trusted by the recipient and the recipient organization. This proxy acts as a web browser in a sandbox, and evaluates the risk and functionality of associated web elements requested as part of rendering the website corresponding to the original resource identifier that the recipient user clicked on, determining which ones can be transmitted to the recipient browser and which ones should be blocked. In some embodiments, this is preferably done in real time, but could also be done in anticipation of the user requesting content referenced by an alternative resource identifier, and determine risk of the site and its associated elements in a proactive manner, storing determinations in a database that is later queried if the user requests to render the webpage. In some embodiments, information of this type is stored for about a week, and if there are no requests, then the information can be overwritten. Should the user request after this takes place, then the determination has to be performed again.

In some embodiments, based on a determination that the original resource identifier is associated with a security risk above a threshold (e.g., references malicious content), a security action is performed with respect to users in a list of message recipients that are identified as having interacted with content of the original resource identifier (e.g., logged as having requested content using an alternative resource identifier for the original resource identifier). For example, each message recipient in the list is notified of the security risk, quarantined (e.g., data/storage of users in the list quarantined), and/or restricted (e.g., restricted in network access, computer access, data access, message access, and/or other type of privileges).

Figure 4:
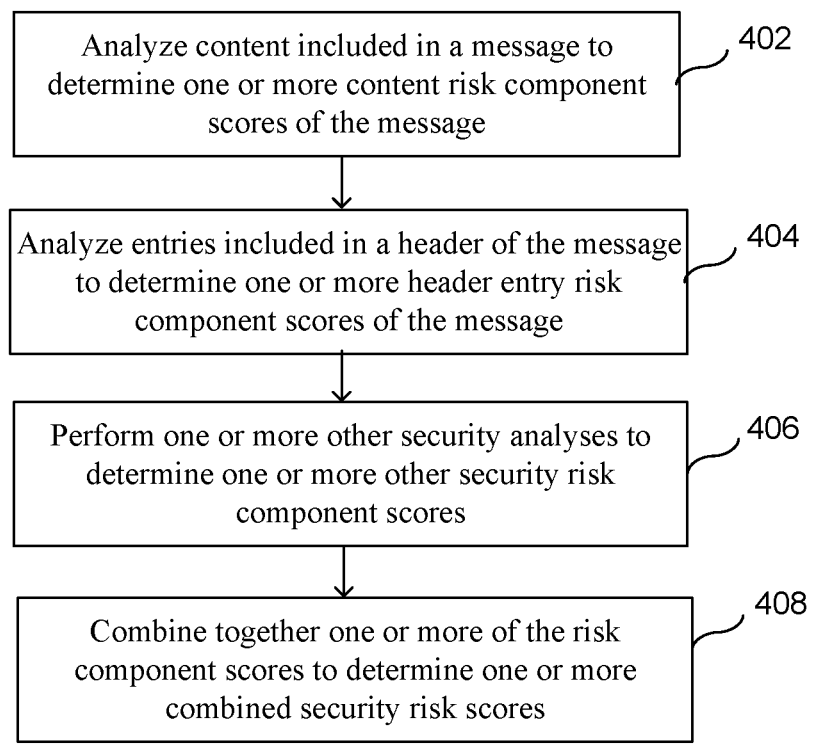
FIG. 4 is a flowchart illustrating an embodiment of a process for analyzing individual aspects of message information for security threats.

FIG. 4 is a flowchart illustrating an embodiment of a process for analyzing individual aspects of message information for security threats. The process of FIG. 4 may be at least in part implemented on analysis server 102, gateway 110, and/or message server 106 of FIG. 1. In some embodiments, at least a portion of the process of FIG. 4 is performed in 204, 304, and/or 314 of the processes of FIGS. 2-3B. For example, the analysis of the process of FIG. 4 is performed to determine a security risk score associated with a message that includes a reference identifier.

At 402, content included in a message is analyzed to determine one or more content risk component scores of the message. For example, a message body of the message is analyzed to identify whether it includes one or more text/keywords from a list of keywords associated with a security risk. A keyword may be included in the list because the keyword identifies conversations about sensitive content that could cause harm to the recipient if the recipient replies or takes action related to the keyword. For example, keywords "social security number," "password," "login," "wire instructions," "confidential," "payment," "ID," obfuscated text, etc. may be included in the list of keywords associated with a security risk. A content risk component score is determined based on whether the message includes a text/keywords from the list of keywords (or associated synonyms or related words) associated with a security risk. For example, an increase in the number (e.g., of different types) and degree of risk of security risk keywords included in the message increases the associated content risk component score.

If the sender of the message has been determined to have an established relationship with the recipient of the message, past observations about messages sent by the sender are utilized in determining the content risk component score based on whether the message includes a text/keywords from the list of keywords (or associated synonyms or related words) associated with a security risk. For example, if it is common for a sender to communicate with the recipient about invoices and payment, an inclusion of a keyword related to invoices and payment would not cause the content risk component score to go up as much as compared to a situation in which it is not common for sender to communicate with the recipient about invoices and payment. Thus a contribution of a security risk keyword included in the message to the content risk component score is reduced if the same or similar keyword in scope and topic (e.g., keyword that is a synonym or topically related word) has been previously observed in previous messages from/to the sender to/from the recipient. The magnitude of this reduction may depend on the number and length of time the same or similar keyword in scope and topic has been previously observed in previous messages from/to the sender to/from the recipient.

In some embodiments, analyzing content included in the message to determine one or more content risk component scores of the message includes determining a content risk component score based on a message signature included in the message. For example based on past observations about types of email signatures typically included in email messages from the sender of the message, the associated content risk component score is increased if an expected signature is not included in the message (e.g., given other detected attributes of the message and the expected signature for the given other detected attributes) or if an unexpected signature is detected (e.g., never observed signature or included signature is an out of context signature that does not match an expected signature for the given detected attributes of the message).

At 404, entries included in a header of the message are analyzed to determine one or more header entry risk component scores of the message. Examples of the entries included in the analyzed header include one or more of the following: a mail user agent (i.e., MUA) identification, time zone identification, IP address, X-header, supported foreign language character sets of the sender, identification of automation or script that generated the message, or any other data included in the header (e.g., email header) of the message. For each header entry to be analyzed, a header entry risk component score is calculated based on a risk factor associated with the entry. For example, certain sender IP addresses and/or header entries, given what is known about the intended recipient (e.g., mismatch between sender and recipient) may increase the associated header entry risk component score. If the sender of the message has been determined to have an established relationship with the recipient of the message, past observations about headers of messages sent by the sender are utilized in determining the header entry risk component scores. For example, the header entry risk component score for a header entry is reduced if the same or similar entry (e.g., change in entry from a previously observed entry conforms to known change pattern) has been previously observed in previous message headers of messages from the sender of the message. The magnitude of this reduction may depend on degree of similarity and/or conformance to a typical pattern of change from previous observations.

In some embodiments, the header entry risk component score for a header entry is associated with whether the message is an automatically generated message. For example, one or more x-header entries identify whether the message was automatically generated. These entries may be identified based on keywords that identify that the message was generated using a script (e.g., generated using a PHP mailer/script). If the sender of the message has been determined to have an established relationship with the recipient of the message, past observations about headers of messages sent by the sender are utilized in determining the header entry risk component scores. For example, the header entry risk component score for a header entry identifying an automatically generated message is reduced if the sender typically sends automatically generated messages (e.g., including the same or similar header entry) to the recipient of the message. The magnitude of this reduction may depend on degree of similarity and/or conformance to a typical pattern of change from previous observations. The following are examples of header entries identifying an automatically generated message and these entries are identified by matching one or more search terms with at least a portion of the text of these entries:"X-Mailer: PHPMailer 5.2.23 (https://github.com/PHPMailer/PHPMailer)"; "X-Php-Originating-Script: 1002:srjvdopc.php(1189): runtime-created function (1): eval( )'d code(1): eval( )'d code."

At 406, one or more other security analyses are performed to determine one or more other security risk component scores. This step may be optional in various embodiments. Examples of other types of analysis performed include one or more of the following: a virus threat detection, a malware threat detection, identification of risky content type (e.g., executable, file attachment, link to a website that requests login information, content that requests OAuth authentication, etc.) included in the message, analysis of a number and type of recipients of the same message, and determining whether the sender from a domain with a Domain-based Message Authentication, Reporting and Conformance (DMARC) policy passes Sender Policy Framework (SPF) and DomainKeys Identified Mail (DKIM) validations.

In some embodiments, performing a security analysis includes identifying which domains and subdomains are used to send legitimate traffic, e.g., by recording what subdomains/domains are used to originate large volumes of emails, and which are not known to be spam or fraud email. For example, "large amounts" may mean greater than a threshold value, such as 100 emails per week, or at least 0.1% of the traffic associated with a particular domain, or any traffic that is not known to be good, e.g., by being associated with correct SPF and/or DKIM data in the headers. Next, any traffic associated with a subdomain and domain that is not on the list of subdomains/domains that are known to send legitimate traffic is flagged, and, depending on a policy and/or contents, quarantined, blocked, marked up, or escalated for additional scrutiny.

In some embodiments, a security analysis involves web bugs, which are also referred to as web trackers. Some users set their browser preferences not to permit web bugs, whereas others do not. Therefore, the acceptance or rejection of a web bug is a trait that can be tracked. When it changes, that is indicative of risk. A web bug can be set to send a signal to the security service when the email or webpage in which it is integrated is rendered. The security service can send a message to a user considered at risk for having been corrupted, and then determine whether the web bug is operating in a manner that is consistent with past uses. The email can also demand that the user allows web bugs, after which user-specific information can be collected. If this is found to be inconsistent with past observations, the associated risk component score is increased.

At 408, one or more of the risk component scores are combined together to determine one or more combined security risk scores. Determining a combined security risk score includes statistically combining (e.g., adding together, weighting then adding together, averaging, weighted averaging, etc.) together the various risk component scores to determine a single combined risk score. In some embodiments, each of the risk component score(s) is associated with one or more specific types of risk. For example, risk component scores of each risk type are to be combined together by type to determine a total risk score for each specific risk type. For example, a security risk component score may be identified as being associated with a malware risk type and/or a phishing risk type and a combined security risk score for the malware risk type and a separate combined security risk score for the phishing risk type are calculated. In some embodiments, the combined security risk scores are utilized in determination of which security action to perform.

Figure 5:
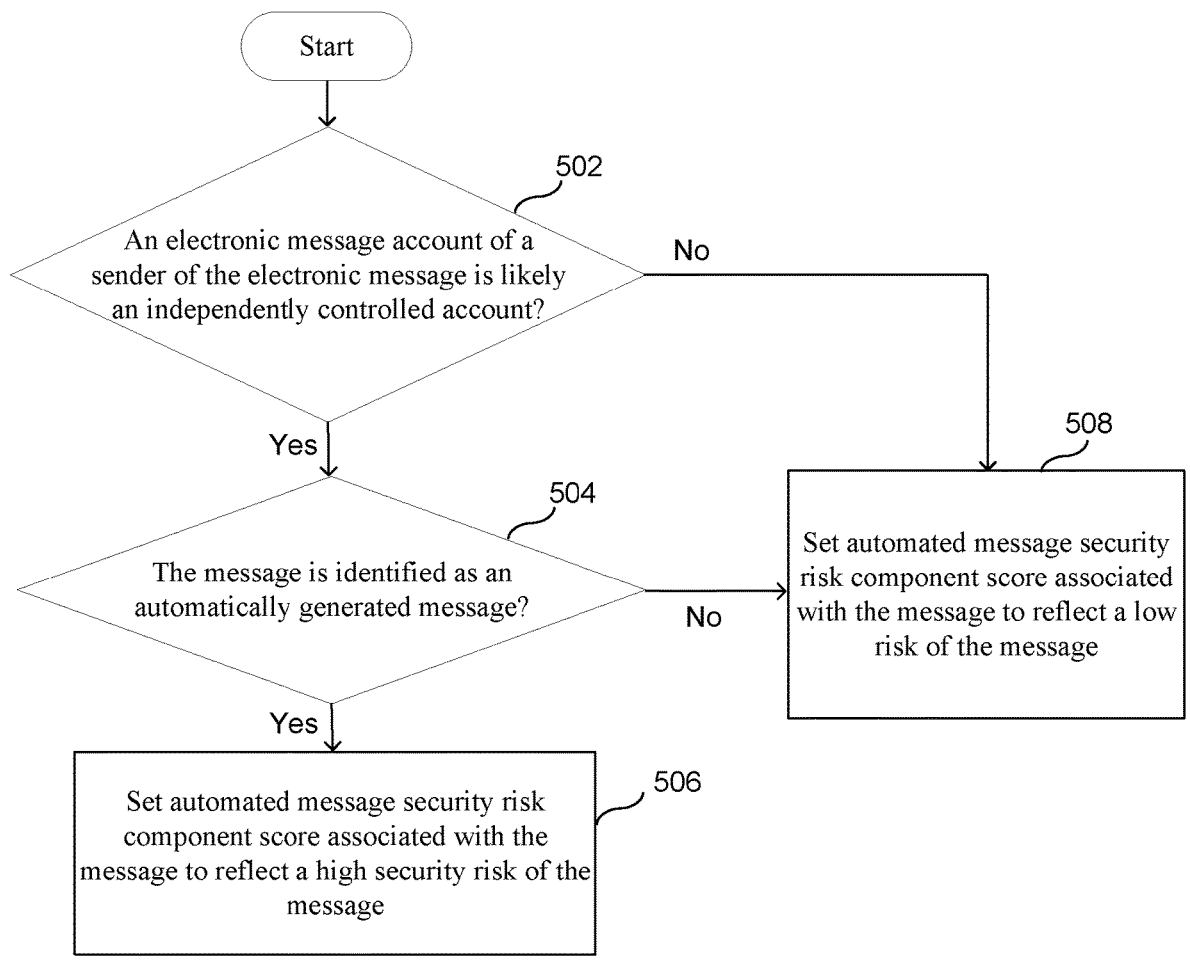
FIG. 5 is a flowchart illustrating an embodiment of a process for analyzing aspects of a received message based on whether the message is from an independently controlled account of a sender.

FIG. 5 is a flowchart illustrating an embodiment of a process for analyzing aspects of a received message based on whether the message is from an independently controlled account of a sender. The process of FIG. 5 may be at least in part implemented on analysis server 102, gateway 110, and/or message server 106 of FIG. 1. In some embodiments, at least a portion of the process of FIG. 5 is performed in 204, 304, and/or 314 of the processes of FIGS. 2-3B. For example, the analysis of the process of FIG. 5 is performed to determine a security risk associated with a message that includes a reference identifier. In some embodiments, the process of FIG. 5 is performed in response to a determination that the sender of the electronic message is not an established communication contact of the intended recipient of the message.

At 502, it is determined whether an electronic message account of a sender of the electronic message is likely an independently controlled account. For example, a message that was sent from an account that belongs to a large organization that closely controls who can send a message via its domain (e.g., web domain) is not an independently controlled account whereas a personal email message account is an independently controlled account.

In some embodiments, determining whether the electronic message account of a sender of the electronic message is likely an independently controlled account includes identifying a domain of an address (e.g., email address) of the sender of the message using the domain to identify using preconfigured data, whether the domain corresponds to independently controlled accounts. For example, certain domains are known to only allow not independently controlled accounts and any email address using these domains is identified as not an independently controlled account, while other domains are known to allow independently controlled accounts and any email address using these domains are identified as an independently controlled account. If the domain is unknown, the electronic message account of the sender is identified as an independently controlled account.

In some embodiments, the electronic message account of the sender of the electronic message is determined to be likely an independently controlled account based on a message traffic pattern associated with the electronic message account of the sender. For example, based on the volume of messages (e.g., large volume of message traffic above a threshold to/from the sender indicates that it is not an independently controlled account) and/or number/ratio of sent messages vs. received messages (e.g., a ratio of sent messages by the sender as compared to messages to the sender that is above a threshold indicates that it is not an independently controlled account where as a generally even ratio of sent vs. received indicates an independently controlled account), it is determined whether the electronic message account of the sender of the electronic message is likely an independently controlled account.

The notion of autonomy (e.g., independently controlled) of an account is important with respect to trust of the account. For example, a "gmail" account is autonomous (e.g., independently controlled). Even though many members share the same domain, there is no coherency in their actions. On the other hand, an official work organization email address of one employee is not autonomous from another employee of the same organization.

In a first example, consider Alice with an email address with the domain "Aliceco.com" that sends an email to Bob at an email address with the domain "Bobco.com." Assume that the recipient Bob has a trust relationship with Alice (i.e., the recipient email address for Bob has sufficient interaction with the Alice email account). Then there is "personal trust" by the recipient directed to the sender. Assume that the recipient does not have a trust relationship with Alice, but somebody else at "Bobco.com" does. Then there is "organizational trust" by the recipient directed to the sender. Assume now that the recipient Cindy at "Bobco.com" has no trust relationship with Alice, but Cindy does have one with Dave at Aliceco.com. Then there is "personal transitive trust" by the recipient directed to the sender. This is because Alice and Dave both belong to "Aliceco.com," and "Aliceco.com" is one autonomous entity—Alice and Dave are not two independent autonomous entities. Finally, assume that the recipient has no trust relationship with either Alice or Dave—or anybody else at "AliceCo.com"—but that somebody else at "Bobco.com" does. This shows "organizational transitive trust."

In another example, consider Bob using his "gmail" personal account, sends an email to somebody at "Bobco.com." Assume that the recipient has a trust relationship with Bob (e.g., the recipient email address has sufficient interaction with the Bob "gmail" email account). Then there is "personal trust" by the recipient directed to the sender. Assume that the recipient does not have a trust relationship with Bob's "gmail" account, but somebody else at "Bobco.com" does. Then there is "organizational trust" by the recipient directed to the sender. Assume now that the recipient has no trust relationship with Bob, but they do have one with Cindy's personal "hotmail" account. There is no trust—Bob and Cindy are not two independent autonomous entities when represented by their personal email addresses.

Thus, if an email comes from a stranger whose email address is similar to a party the recipient trusts, then this is a high-risk scenario. Trust is different from more general reputation: one is not more likely to act on an email from a trustworthy but unknown organization than one of an email from a non-trustworthy and unknown organization. However, whether one has a good relationship with a sender matters more in terms of trust than whether others have a good relationship with the sender. Different kinds of trusts may be computed in different ways but also have different strengths. For example: strength("personal trust")>strength("organizational trust"); strength("personal trust")>strength("personal transitive trust"); strength("personal transitive trust")>strength("organizational transitive trust"); strength("organizational trust")>strength("organizational transitive trust"). In some embodiments, different weights can be assigned to these different types of trust to determine a risk of a message.

If at 502 it is determined that the electronic message account of the sender of the electronic message is likely an independently controlled account, at 504, the message is analyzed to determine whether the message is an automatically generated message. For example, a header of the message is analyzed to determine whether one or more x-header entries identify whether the message was automatically generated. These entries may be identified based on keywords that identify that the message was generated using a script (e.g., generated using a PHP mailer/script). The following are examples of header entries identifying an automatically generated message and these entries are identified by matching one or more search terms/keywords with at least a portion of the text of these entries: "X-Mailer: PHPMailer 5.2.23 (https://github.com/PHPMailer/PHPMailer)"; "X-Php-Originating-Script: 1002:srjvdopc.php (1189): runtime-created function(1): eval( )'d code(1): eval( )'d code."

In some embodiments, determining whether the message is an automatically generated message includes identifying a likely scripted behavior associated with a protected account. For example, attackers typically configure accounts they have compromised to forward emails to another account, either selectively (such as based on the subject line, the sender, the thread, etc.) or for all emails. In addition, attackers sometimes configure compromised accounts so that selective emails are hidden, as will be described in more detail below. When attackers make such a configuration, then this affects the traffic patterns in a way that will be measured and detected by the security service. By monitoring the different mail folders, including the inbox, the sent box, the archive, the trash folder and other folders, the security service provider will detect forwarding behavior that is anomalous in that it has not been performed by the account owner before; that is selective; that is rapid; or that is to recipients that are considered high risk, or any combination of these. It also detects signs of scripted forwarding, which is indicated by a very short time period between receipt of an email and the forwarding of the email. In addition, the security service also looks for other indications of scripted behavior, such as an anomalous addition of an account in the bcc, which is considered anomalous by not having been performed previously, and/or which is considered scripted due to the time periods being very short. Another related detection method is to observe if the MUA of emails to some recipients of emails sent from the protected account are different than those of others, and considered high risk, e.g., due to information that is anomalous for the account owner.

If at 504 it is determined that the message is an automatically generated message, at 506, an automated message security risk component score associated with the message is set (e.g., set to a high value) to reflect a high security risk of the message (e.g., higher than otherwise). This security risk component score may be utilized in 212 of FIG. 2 and/or 308 of FIG. 3A.

If at 502 it is determined that the electronic message account of the sender of the electronic message is likely not an independently controlled account or if at 504, it is determined that the message is not an automatically generated message, at 508, the automated message security risk component score associated with the message is set to reflect a low risk of the message (e.g., lower than otherwise).

Figure 6:
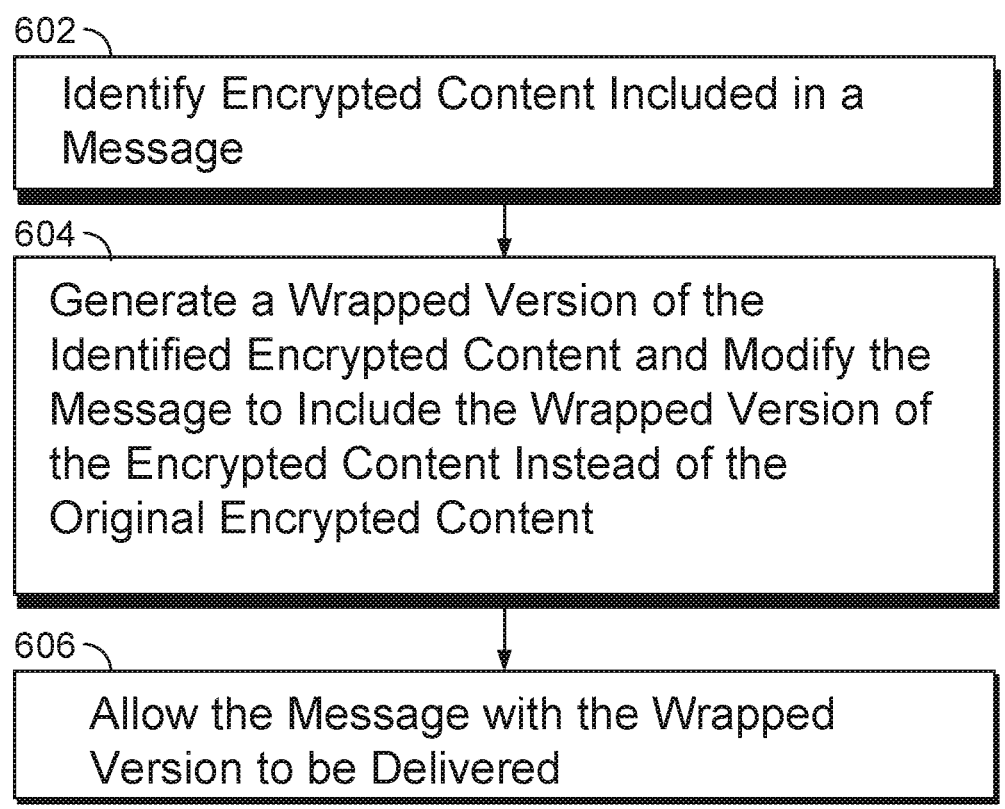
FIG. 6 is a flowchart illustrating an embodiment of a process for wrapping encrypted content of the message.

FIG. 6 is a flowchart illustrating an embodiment of a process for wrapping encrypted content of the message. The process of FIG. 6 may be at least in part implemented on analysis server 102, gateway 110, and/or message server 106 of FIG. 1. In various embodiments, at least a portion of the process of FIG. 6 is performed in 206 of FIG. 2. For example, the process of FIG. 6 describes one of the security actions that is selected to be performed.

If a message includes encrypted content such as an encrypted email attachment, that encrypted content is often unable to be properly analyzed for security threats because analysis tools are unable to access the encrypted content. Hackers may take advantage of this by sending an encrypted malware attachment along with a password to be utilized by the recipient to open the attachment.

At 602, encrypted content included in a message is identified. Examples of the message include an email, instant message, a chat message, and any other forms of electronic messages. The message may be analyzed as a part of a computer security analysis and filtered to identify and neutralize security threats prior to allowing an intended recipient of the message to access the message. In some embodiments, each message received for delivery to its intended recipient associated with the system performing analysis of the message is to be analyzed. Examples of the encrypted content include: an encrypted executable file, an encrypted zip file, an encrypted text, an encrypted script, an encrypted image, and any other encrypted content. The encrypted content may have been identified by identifying content that requires a password to access it.

At 604, a wrapped version of the identified encrypted content is generated and the message is modified to include the wrapped version of the encrypted content instead of the original encrypted content. In some embodiments, wrapping the encrypted content includes embedding the encrypted content in an executable program. When the executable program is executed, the executable program requests a decryption password from the user and the encrypted content of the message is encrypted using the decryption password and the decrypted content is analyzed for security threats prior to allowing the user access to the decrypted content once the analysis has completed without identifying a security threat. If the security analysis identifies a threat, a user may not be allowed to access the decrypted content and the security threat may be logged or reported to an administrator.

For example, the wrapped version of an encrypted zip file is a file that, when opened, causes execution, whether of the file wrapper itself or of an associated application that the message recipient needs to download, and as the file wrapper is executed, it requests and receives a decryption key, PIN, or password from the user and uses the PIN or password to decrypt the wrapped zip file. This is done by executing the unzip program associated with the zip file, or a compatible version to this, providing the unzip program with the PIN or password provided by the user. It then automatically accesses the contents of the unzipped file and analyzes it for security risks. This can be done in a multiplicity of ways, including detonating each file, determining whether any of the files match an anti-virus signature, determining whether any of the files has executable code segments in it, etc. The same approach also works for messages with attachments that are encrypted pdfs, or any other encrypted file. In such cases, the execution of the wrapper file causes the decryption of the encrypted file, which is then analyzed for security risks, including executable code. If a file, independent of type, passes the verification, then the decrypted content is made available to the recipient. Thus, the user experience associated with the opening of wrapped encrypted content would be the same as that of unwrapped encrypted content, except for a delay during security analysis (e.g., in most cases this would be too short to detect).

At 606, the message with the wrapped version of the encrypted content is allowed to be delivered. For example, the modified message is allowed to be delivered to an email inbox (or other email categorization folder to be actively accessed by a user to obtain new messages, e.g., not a spam or trash folder) of an end recipient. Allowing the modified message to be delivered includes allowing an intended user recipient of the message to be able to access the wrapped encrypted content. When the recipient opens the wrapped encrypted content, the wrapper program requests a decryption key, decrypts the encrypted content using the decryption key, and initiates the security analysis of the decrypted content prior to allowing the recipient access to the decrypted content of the encrypted content. Any security analysis technique or method described in this specification may be performed on the decrypted content to analyze it for security threats. If a security threat is detected, the user may not be allowed access to the decrypted content and a security may be performed. The security action may include revoking access to the message, deleting the message, forwarding the message, reporting the message, further modifying the message, moving the message (e.g., to a different folder), preventing access to a portion of the message, providing an additional warning, and/or performing further analysis.

Figure 7:
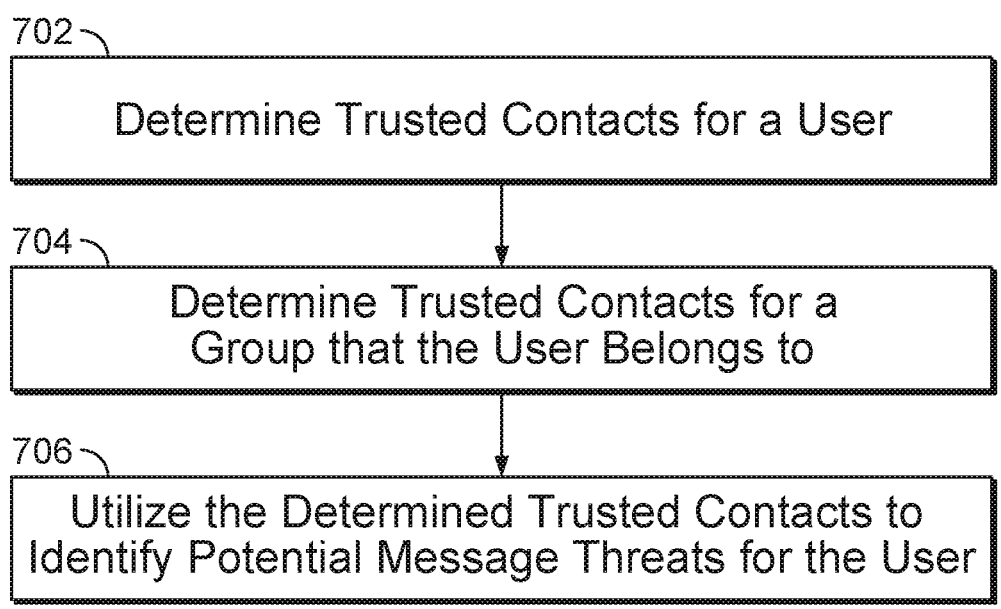
FIG. 7 is a flowchart illustrating an embodiment of a process for tracking trusted contacts.

FIG. 7 is a flowchart illustrating an embodiment of a process for tracking trusted contacts. The process of FIG. 7 may be at least in part performed by analysis server 102, gateway 110 and/or message server 106 of FIG. 1. Examples of the contacts include email addresses, usernames, display names, user identifiers, an identification photo, and any other identifier that may be utilized to identify a sender or recipient of a message. In some embodiments, at least a portion of the process of FIG. 7 is performed in 204, 304, and/or 314 of the processes of FIGS. 2-3B. For example, the analysis of the process of FIG. 7 is performed to determine a security risk associated with a message that includes a reference identifier.

At 702, trusted contacts for a user (e.g., message recipient) are determined. The trusted contacts are to be utilized to identify potential message threats of the user. The trusted contacts identify one or more contacts (e.g., senders or recipients of messages) that are familiar to the user because the user has previously interacted with the contact and/or is aware of the contact. In some embodiments, determining the trusted contacts includes receiving a list of contacts for the user. For example, the user provides access to an address book of the user and information about contacts in the address book is received. In some embodiments, the trusted contacts include contacts that have been specifically identified by the user. In some embodiments, information about the trusted contacts is stored. For example, the trusted contacts for the user are stored in a database of trusted contacts. This database may track trusted contacts for a plurality of different users and allows trusted contacts to be retrieved for a specific identified user. The stored information of each contact may include one or more of the following: email address, associated name (e.g., display name), relationship identifier, identifying image (e.g., contact photo), username, instant message identifier, address, phone number, a measure of trust, a measure of message interaction, and any other identifier utilized to identify a sender or a receiver of a message.

In some embodiments, the trusted contacts for the user are at least in part determined automatically based on contacts detected in messages sent or received by the user. For example, by observing and analyzing message traffic of the user and patterns of message recipients and senders, contacts that receive messages from the user and contacts that send messages to the user can be determined and correlated to infer and determine trust, frequency, and/or importance of interaction and relationship between the user and the contact to identify one or more of these contacts as a trusted contact. In one example, if a threshold number of messages has been sent to and from a contact for a user, the contact is identified as a trusted contact and added to a stored list of trusted contacts for the user. Information about the messages of the user utilized to at least in part automatically determine the trusted contacts has been obtained for analysis by receiving at least a portion of the messages (e.g., a copy of the entire message, email addresses and names of contacts of messages, etc.) for analysis (e.g., at server 102 from server 104, gateway 110, or server 106 of FIG. 1).

At 704, trusted contacts for a group that the user belongs to are determined. For example, trusted contacts for the users included in the group are aggregated to identify patterns among the aggregated trusted contacts. Examples of the group include a network domain that the user belongs to (e.g., domain of the email address of the user), an entity/organization that the user belongs to (e.g., company that the user belongs to), a message service provider, or an authority that controls a message account of the user. In some embodiments, determining trusted contacts for the group includes aggregating information about a trusted contact and/or a network domain of one or more trusted contacts from information gathered for different users for the trusted contact and/or the network domain. In some embodiments, determining the trusted contacts for the group includes storing information about the trusted contacts in a data storage structure and associating this stored information with the group.

At 706, determined trusted contacts are utilized to identify potential message threats for the user. For example, the contacts in the trusted contacts may be utilized as a proxy for contacts that are familiar to the user and if an attacker tries to attack the user using an impersonation attack, contact being impersonated likely corresponds to one of the contacts in the list of trusted contacts of the user. By determining a measure of similarity between a sender identifier of a message received for the user with each identifier of each trusted contact, messages attempting impersonation attacks may be identified. For example, if the email address of the sender matches an email address of a trusted contact, the message is to be trusted and not filtered but if the email address of the sender does not match any trusted contacts but is similar to an email address of a trusted contact, the message is identified as potentially a part of an impersonation attack and filtered. Filtering the message may include blocking the message, quarantining the message, further analyzing the message, and/or modifying the message (e.g., insert a warning).

Figure 8:
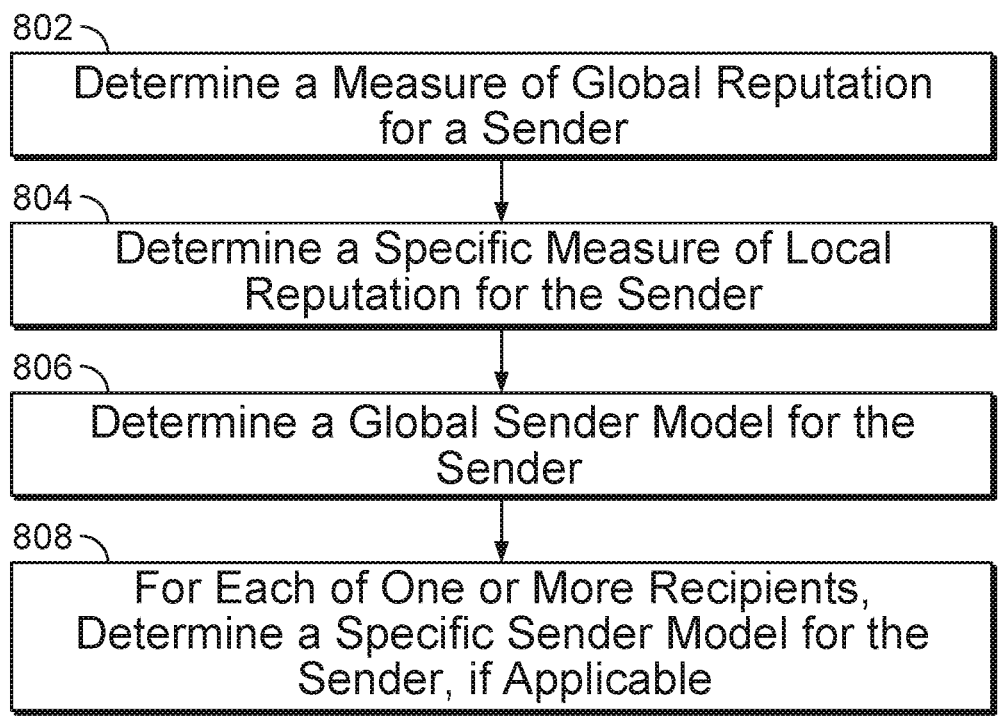
FIG. 8 is a flowchart illustrating an embodiment of a process for determining information about a message sender to be utilized to assess a risk of a message.

FIG. 8 is a flowchart illustrating an embodiment of a process for determining information about a message sender to be utilized to assess a risk of a message. The process of FIG. 8 may be at least in part implemented on analysis server 102, gateway 110, and/or message server 106 of FIG. 1. In some embodiments, at least a portion of the process of FIG. 8 is performed in 702 and/or 704 of FIG. 7. For example, the process of FIG. 8 may be repeated for each trusted contact determined for a user (e.g., for each contact in a list of trusted contacts stored in a repository) and stored in a data structure that tracks the trusted contacts. The process of FIG. 8 may be repeated periodically. In some embodiments, at least a portion of the process of FIG. 8 is performed in 204, 304, and/or 314 of the processes of FIGS. 2-3B.

At 802, a measure of global reputation for a sender is determined. The sender may correspond to a group of individual sender addresses in some embodiments or an individual sender address in other embodiments. For example, the sender corresponds to a trusted contact in a list of trusted contacts determined using the process of FIG. 7. In another example, the sender corresponds to a domain of a trusted contact identified using the process of FIG. 7. In some embodiments, the sender is a network/Internet domain and the measure of global reputation corresponds to all individual sender addresses of the domain. For example, the determined measure of global reputation of a domain is applicable to all email addresses within the domain. In some embodiments, the measure of global reputation for a sender is specific to an individual sender address. For example, the measure of global reputation for a sender is specific to an email address. In some embodiments, the sender is one of a plurality of senders in a list of senders to be analyzed to predetermine its global reputation. The list of senders may be automatically determined from one or more previously received messages (e.g., senders of previously received messages) and/or specified by a user/administrator. The measure of global reputation of the sender is applicable for a plurality of recipients of a message from the sender while a measure of local reputation of the sender is specific to a particular recipient domain or individual recipient address of a message from the sender.

In some embodiments, the measure of global reputation indicates a general measure that a sender is likely to send a message that is of value to a recipient of the message. For example, a higher measure of reputation indicates a higher likelihood that any message sent by the sender will not include malicious and/or undesired content (e.g., message will not include a virus, malware, spam, etc.). In some embodiments, determining the measure of global reputation includes determining one or more component factors to be utilized to determine a total measure of global reputation.

For example, each determined component factor may be utilized to add, subtract, or multiply a value to/from the measure of global reputation to determine the total measure of global reputation. In one example, determined component factor values are summed to determine the global reputation measure. In some embodiments, machine learning or another automated process is utilized to determine the measure of global reputation based on gathered/generated information about the sender of the global reputation.

In some embodiments, determining the measure of global reputation for the sender includes determining whether an identifier of the sender (e.g., domain name, subdomain, IP address) is included in a list of senders known to be reputable. For example, there exists a predetermined list of entities and their associated identifiers that are known to be reputable and if the identifier of the sender is included in the predetermined list, the resulting measure of global reputation would be higher than otherwise. In some embodiments, determining the measure of global reputation for the sender includes determining whether an identifier of the sender is included in a list of senders known to be not reputable. For example, there exists a list of IP addresses associated with a server that are known to be commonly utilized to send spam messages and in the event an IP address associated with the sender is included in this list, the determined measure of global reputation would be lower than otherwise. Whether the identifier of the sender is included in the list of senders known to be reputable or not reputable may be utilized to determine a component factor value utilized in determining the measure of global reputation of the sender.

In some embodiments, determining the measure of global reputation for the sender includes determining a category of business associated with an entity of the sender. For example, businesses in certain categories (e.g., banking) may be associated with a higher reputation than businesses in other categories (e.g., digital marketing). In some embodiments, using a list/database that maps an identifier of a sender to a known associated category/line of business, the category/line of business associated with the sender is determined, if applicable (e.g., the line of business for some senders may be unknown or not applicable). A reputation component factor (e.g., value to be added, multiplied, or subtracted to/from total score measure) associated with the identified category/line of business may be utilized in determining the measure of global reputation.

In some embodiments, determining the measure of global reputation for the sender includes analyzing domain registration history and Domain Name System (i.e., DNS) activity of the sender. For example, a sender that is typically reputable will register a domain name far ahead of time prior to the use of the domain while a less reputable sender will likely temporarily utilize a domain for a short period of time prior to moving on to another domain and will register a domain within a short amount of time prior to the use of the domain. In some embodiments, determining the measure of global reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of global reputation for the sender includes analyzing historical statistics and/or a history of messages sent by the sender. For example, there exists one or more repositories of previous messages sent by the sender and the repositories of messages are analyzed to determine one or more of the following: an amount/volume/rate of messages sent by the sender, a number/breadth of different recipients (e.g., number of different domains of recipients, number of different email addresses of recipients, etc.) of messages from the sender, a distribution of messages sent to different recipients, a length of time the sender has been sending messages, a regularity that the sender has been sending messages (e.g., difference in average number of messages per time period), a type of content of messages sent by the sender, a difference/regularity between content of messages sent by the sender, amount/rate of content opened/viewed by recipients of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of global reputation for the sender.

In some embodiments, determining the measure of global reputation for the sender includes determining whether an identifier of the sender is similar to an identifier of another sender. For example, it is determined whether a domain of the sender is similar to a domain of another sender. Determining whether an identifier of the sender is similar to an identifier of another sender may include determining whether an identifier of the sender is similar to an identifier of another sender with a relatively high measure of global reputation. For example, an attempt to confuse a recipient by utilizing a domain that is only slightly different from a highly reputable domain is detected. In some embodiments, based on the similarity analysis, a similarity component factor value is determined and the similarity component factor value is added, multiplied, subtracted, etc. to determine the measure of global reputation for the sender.

In some embodiments, the global reputation for the sender is determined by combining (e.g., averaging, adding, etc.) measures of local reputation (determined in 804) for the sender determined for each recipient of a group of different recipients to determine a combined measure (e.g., combined score).

At 804, a specific measure of local reputation for the sender is determined for each of one or more different recipients. For example, although the measure of global reputation determined in 802 may apply to any recipient that receives a message from the sender, the specific measure of local reputation is only applicable to a specific recipient. In one example, one recipient may have a different relationship to a sender than another recipient (e.g., existing business relationship) and interest/relevance of a message from the sender may be different for different recipients and this difference is reflected as a different measure of local reputation for each different recipient. In some embodiments, the one or more different recipients include the user in 702 of the process of FIG. 7. In some embodiments, the recipient represents a network/Internet domain and the measure of local reputation corresponds to all individual recipients of the domain. For example, the determined measure of local reputation for a recipient domain is applicable to all recipient email addresses within the domain. In some embodiments, the measure of local reputation for the sender is specific to an individual recipient address.

In some embodiments, the recipient is one of a plurality of recipients in a list of recipients to be analyzed to predetermine the local reputation of the sender for the specific recipient. The list of recipients may correspond to the recipients/email servers accessible (e.g., list of email domains being managed) by an analysis server. In some embodiments, each email server of each recipient performs its own determination of its measure of local reputation for the sender. In some embodiments, the measure of local reputation is determined dynamically. For example, when a recipient receives a message from the sender, the recipient determines the measure of local reputation for the sender.

In some embodiments, the measure of local reputation indicates a measure that the sender is likely to send a message that is of value to a specific recipient. For example, a higher measure of reputation indicates a higher likelihood that an authentic message sent by the sender will not include malicious and/or undesired content (e.g., message will not include a virus, malware, spam, etc.) for the specific recipient. In some embodiments, determining the measure of local reputation includes determining one or more factors to be utilized to determine a total measure of local reputation. For example, each determined factor may be utilized to add, subtract, or multiply a value to/from the measure of local reputation to determine the total measure of local reputation. In some embodiments, machine learning or another automated process is utilized to determine the measure of local reputation based on gathered/generated information about the sender.

In some embodiments, determining the measure of local reputation for the sender includes determining whether an identifier of the sender (e.g., domain name, subdomain, IP address) is included in a list of senders known to be reputable for the recipient. For example, there exists a predetermined list of entities and their associated identifiers that are known to be reputable for the specific recipient. If the identifier of the sender is included in the predetermined list, the resulting measure of local reputation would be higher than otherwise. In some embodiments, determining the measure of local reputation for the sender includes determining whether an identifier of the sender is included in a list of senders known to be not reputable for the specific recipient. For example, there exists a list of IP addresses associated with a server that are known to be commonly utilized to send spam messages and in the event an IP address associated with the sender is included in this list, the determined measure of local reputation would be lower than otherwise. Whether the identifier of the sender is included in the list of senders known to be reputable or not reputable may be utilized to determine a component factor value utilized to determine the measure of local reputation of the sender.

In some embodiments, determining the measure of local reputation for the sender includes determining a category of business associated with an entity of the sender with respect to a property of the specific recipient. For example, businesses in certain categories (e.g., banking) may be associated with a higher reputation than businesses in other categories (e.g., digital marketing) with respect to the category of business of the recipient (e.g., recipient is also in banking). In some embodiments, a reputation component factor (e.g., value to be added, multiplied, or subtracted to/from total score measure) associated with the identified category/line of business with respect to the recipient may be utilized in determining the measure of local reputation In some embodiments, determining the measure of local reputation for the sender includes analyzing domain registration history and Domain Name Service (i.e., DNS) activity of the sender with respect to a property of the recipient. For example, it may be typical for certain recipients to be in communication with senders that utilize a domain for a short period of time while for other recipients it is not typical. In some embodiments, determining the measure of local reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of local reputation for the sender includes analyzing historical statistics and/or a history of messages sent by the sender for the specific recipient domain or individual recipient addresses. For example, there exists a repository of previous messages sent by the sender to the recipient (e.g., messages stored at a recipient message server of the recipient) and the repository of messages is analyzed to determine one or more of the following: an amount/volume/rate of messages sent by the sender, a number/breadth of different individual users of the recipient (e.g., number of different email addresses of recipient) that received messages from the sender, a distribution of messages sent to different individual users of the recipient, a length of time the sender has been sending messages to the recipient, a regularity that the sender has been sending messages to the recipient (e.g., difference in average number of messages per time period), a type of content of messages sent by the sender to the recipient, a difference/regularity between content of messages sent by the sender to the recipient, amount/rate of content opened/viewed by the recipient of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of local reputation of the sender for the recipient.

In some embodiments, determining the measure of local reputation for the sender includes determining whether an identifier of the sender is similar to an identifier of another sender and/or an identifier of the recipient. For example, it is determined whether a domain of the sender is similar to a domain of another sender or a domain of the recipient. Determining whether an identifier of the sender is similar to an identifier of another sender or the recipient may include determining whether an identifier of the sender is similar to an identifier of another sender with a relatively high measure of local reputation for the recipient. For example, an attempt to confuse a user by utilizing a sender domain that is only slightly different from a highly reputable domain for the recipient is detected. In some embodiments, an attempt to confuse a user by utilizing a sender domain that is only slightly different from a domain of the recipient is detected (e.g., detect trying to mimic an intra-organization message). In some embodiments, based on the similarity analysis, a similarity component factor value is determined and the similarity component factor value is added, multiplied, subtracted, etc. to determine the measure of local reputation of the sender for the recipient.

At 806, a global sender model for the sender is determined. For example, the sender model may be utilized to determine whether a message that indicates a sender was actually sent by the indicated sender. In some embodiments, the sender model identifies one or more properties that are characteristic of a message that is sent by the sender. In some embodiments, the sender model associates the sender with one or more IP addresses of message servers that are known or authorized to send messages for the sender. For example, an IP address of a last server that sent a message is a reliable identifier that indicates an origin of the message and this IP address information is utilized to determine whether the last server that sent the message corresponds to the sender identified in the message. In some embodiments, the sender model includes directly provided information. For example, a list of IP addresses of servers that send messages for the sender is received from a user, the sender, or a published source of information about the sender. In some embodiments, at least a portion of the sender model is determined using message authentication/validation information about the sender. For example, IP addresses associated with a domain of the sender are obtained using standardized message authentication/validation systems (e.g., using Domain-based Message Authentication (DMARC), DomainKeys Identified Mail (DKIM), Sender Policy Framework (SPF), etc.).

In some embodiments, the sender model is automatically determined. For example, using one or more repositories storing messages received from the sender, a list of server IP addresses authorized or historically known to send messages for the sender is automatically determined. The one or more repositories may include a message store of a plurality of different recipients (e.g., different recipient message servers managed by an analysis server) and external message sources (e.g., information from third-party sources that gather message information). Machine learning may be utilized to automatically detect sources of and properties that are characteristic of authentic messages from the sender using historical information about messages previously sent by or on behalf of the sender. In some embodiments, an IP address is automatically associated with the sender in the sender model if it is detected that a message likely/verified to be sent by the sender was sent from the IP address. In some embodiments, before an IP address is associated with the sender, the sender must have sent a message from the IP address at least a threshold number of times. In some embodiments, a message is determined to have been sent by the sender if the message was validated using an email authentication/validation system and/or sent from the IP address that has been utilized to send messages identified as being sent by the sender for at least a threshold amount of time and/or a threshold number of times. Other factors may be utilized to verify whether a message in a repository was sent by the sender prior to using IP address information of the message in determining the sender model of the sender.

In some embodiments, an IP address is only added to the sender model to be associated with the sender in the event the IP address has been determined to be consistent for the sender. For example, a history of senders associated with the IP address is analyzed and the IP address is only associated with the sender if the IP address is not already associated with another sender, has not been associated with another sender for at least a threshold amount of time, and/or the number of different previous senders that have been with associated with the IP address is less than a threshold number.

In some embodiments, the sender model identifies one or more blocks of adjacent IP addresses that are authorized or historically known to send messages on behalf of the sender. These blocks of adjacent IP addresses may be owned or be under the control of a single administrative entity or domain or may be detected to exhibit similar sending behavior. The block of adjacent IP addresses may be specified by a user, a sender, an administrator, and/or a source of published information about the sender or a provider authorized by the sender. In some embodiments, one or more blocks of adjacent IP addresses to be included in the sender model are automatically determined. For example, once one or more IP addresses within a block of adjacent IP addresses have been associated with a sender model, the entire block of adjacent IP addresses may be associated with the sender model if they are determined or expected to exhibit similar message sending behavior.

In some embodiments, the sender model identifies a network/Internet domain that is common to all hostnames of servers that are authorized or historically known to send messages on behalf of the sender. The servers that share this network/Internet domain may be owned or be under the control of a single administrative entity or domain or may be detected to exhibit similar sending behavior. The network/Internet domain may be specified by a user, a sender, an administrator, and/or a source of published information about the sender or a provider authorized by the sender. In some embodiments, the network/Internet domain to include within the sender model is automatically determined. For example, once one or more IP addresses whose hostnames share an organizational network/Internet domain have been associated with a sender model, all servers whose hostnames share that network/Internet domain may be associated with the sender model if they are determined or expected to exhibit similar message sending behavior.

In some embodiments, the sender model identifies one or more autonomous system numbers (i.e., ASN) associated with servers that are authorized or historically known to send messages on behalf of the sender. For example, an ASN identifies a collection of IP routing prefixes owned by or under the control of a single administrative entity or domain and the ASN associated with the sender is specified in the sender model. The ASN associated with the sender may be specified by a user, a sender, an administrator, and/or a source of published information about the sender. In some embodiments, the ASN associated with the sender is automatically determined. For example, once one or more IP addresses associated with a sender model have been identified, the ASN(s) associated with the IP addresses may be associated with the sender if they are determined or expected to exhibit similar message sending behavior.

The determined or specified sender model associated with a sender may be stored in a data structure such as a list, a database, a table, or any other data structure that can be indexed based on an identifier of the sender.

At 808, a specific sender model for the sender is determined for each of one or more recipients, if applicable. For example, although the sender model determined in 806 may apply to any recipient, the specific sender model is only applicable to a specific recipient. In one example, one recipient may receive a message from the sender via a different set of sending message servers than another recipient due to geographical location differences between the recipients. In some embodiments, the recipient represents a network/Internet domain and the recipient specific sender model corresponds to all individual recipients of the domain. In some embodiments, the recipient specific sender model is specific to an individual recipient address. In some embodiments, the recipient specific sender model is determined in a similar manner as the sender model determined in 806 except for utilizing data specific to the recipient rather than various different recipients. For example, using a repository storing messages received from the sender to only the recipient, individual or neighborhoods of IP addresses associated with the sender model for a sender are automatically determined.

Figure 9:
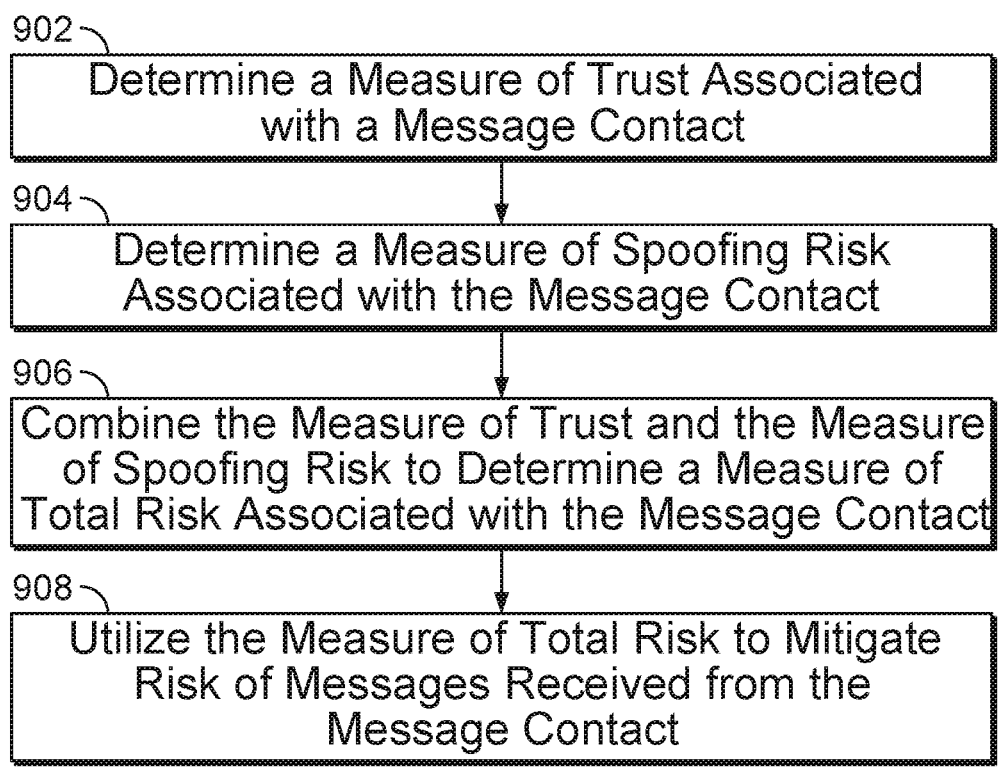
FIG. 9 is a flowchart illustrating an embodiment of a process for determining a total risk measure of a contact.

FIG. 9 is a flowchart illustrating an embodiment of a process for determining a total risk measure of a contact. The process of FIG. 9 may be at least in part implemented on analysis server 102, gateway 110, and/or message server 106 of FIG. 1. At least a portion of the process of FIG. 9 may be performed in 204, 304, and/or 314 of the processes of FIGS. 2-3B.

At 902, a measure of trust associated with a message contact (e.g., sender of a message) is determined. In some embodiments, the measure of trust (e.g., numerical value) indicates a measure that the message contact is likely to send a message that is of value to a recipient/user. For example, a higher measure of trust indicates a higher likelihood that an authentic message sent by the contact will not include malicious and/or undesired content (e.g., message will not include a virus, malware, spam, impersonation attack, etc.). The measure of trust may be for a domain of the message contact that covers all messages of the same domain, a group of domains (e.g., domains of similar category), a group of contact addresses, or a specific contact address (e.g., email address). In some embodiments, the measure of trust is for a specific recipient/user. For example, the measure of trust indicates a measure of trust between the message contact and a specific recipient/user. In this example, the measure of trust may be determined based on a history of interaction between the message contact and the specific user.

In some embodiments, the measure of trust is determined at least by a portion of the process of FIG. 8. For example, the measure of trust is the specific measure of local reputation determined in 804. In another example, the measure of trust is the measure of global reputation included in the global sender model determined in 806. In another example, the measure of trust is determined based on a combination (e.g., average, sum, product, etc.) of the measure of global reputation and the specific measure of local reputation.

At 904, a measure of spoofing risk associated with the message contact is determined. For example, a likelihood that a spoofing attack could be technically carried out to spoof the message contact is determined. The measure of spoofing risk may be for a domain of the message contact that covers all messages of the same domain, a group of domains, a group of contact addresses, or a specific contact address (e.g., email address). The measure of spoofing risk may be a numeric score corresponding to the spoofing risk associated with the message contact.

An organization with a published and complete Domain-based Message Authentication, Reporting and Conformance (i.e., DMARC) policy has a low risk of being spoofed, as does each user account associated with such an organization. An organization that has a DMARC policy but which does not reject all messages that fail corresponds to a medium risk, as do users of such an organization. An organization without a DMARC policy or one that only involves monitoring and no rejection is associated with a high risk of being spoofed, as are users of such an organization. For example, if the message contact is associated with a DMARC policy that requires every message of the domain of the message contact to be signed with a digital signature, the measure of spoofing risk is assigned a low risk value. If the message contact is associated with a DMARC policy that enables but does not require every message of the domain of the message contact to be signed with a digital signature, the measure of spoofing risk is assigned a medium risk value. If the message contact is not associated with a DMARC policy, the measure of spoofing risk is assigned a high risk value. Thus, determining the measure of spoofing risk associated with the message contact may include assigning a score based on the DMARC or other message validation system policy associated with the message contact.

At 906, the measure of trust and the measure of spoofing risk are combined to determine a measure of total risk associated with the message contact. For example, the measure of trust and the measure of spoofing risk are multiplied together to determine the measure of total risk. In another example, the measure of trust and the measure of spoofing risk are averaged together to determine the measure of total risk. In another example, the measure of trust and the measure of spoofing risk are summed together to determine the measure of total risk. Thus, the measure of total risk is able to measure the threat of the message contact being impersonated, both in terms of the likely impact to the recipient (e.g., measure of trust provides a gauge on the likelihood the message recipient is likely to confuse the spoofed message as a message from a highly trusted and important contact) and the likelihood of technical feasibility (e.g., measure of spoofing risk provides a gauge on the measure of technical feasibility). In some embodiments, the measure of trust and the measure of spoofing risk may be each weighted before being combined. In some embodiments, the determined measure of total risk is stored in a data structure and associated with the message contact.

At 908, the measure of total risk is utilized to mitigate risk of messages received from the message contact. For example, when a message from the message contact is received, its measure of total risk for the sender of the message (e.g., message contact) is obtained and the measure of total risk is utilized to determine whether to filter and/or allow the message to be delivered. In an example, if a value of the measure of total risk is above a threshold value, the message is identified as a risk and the message is filtered to reduce its risk to the recipient.

Figure 10:
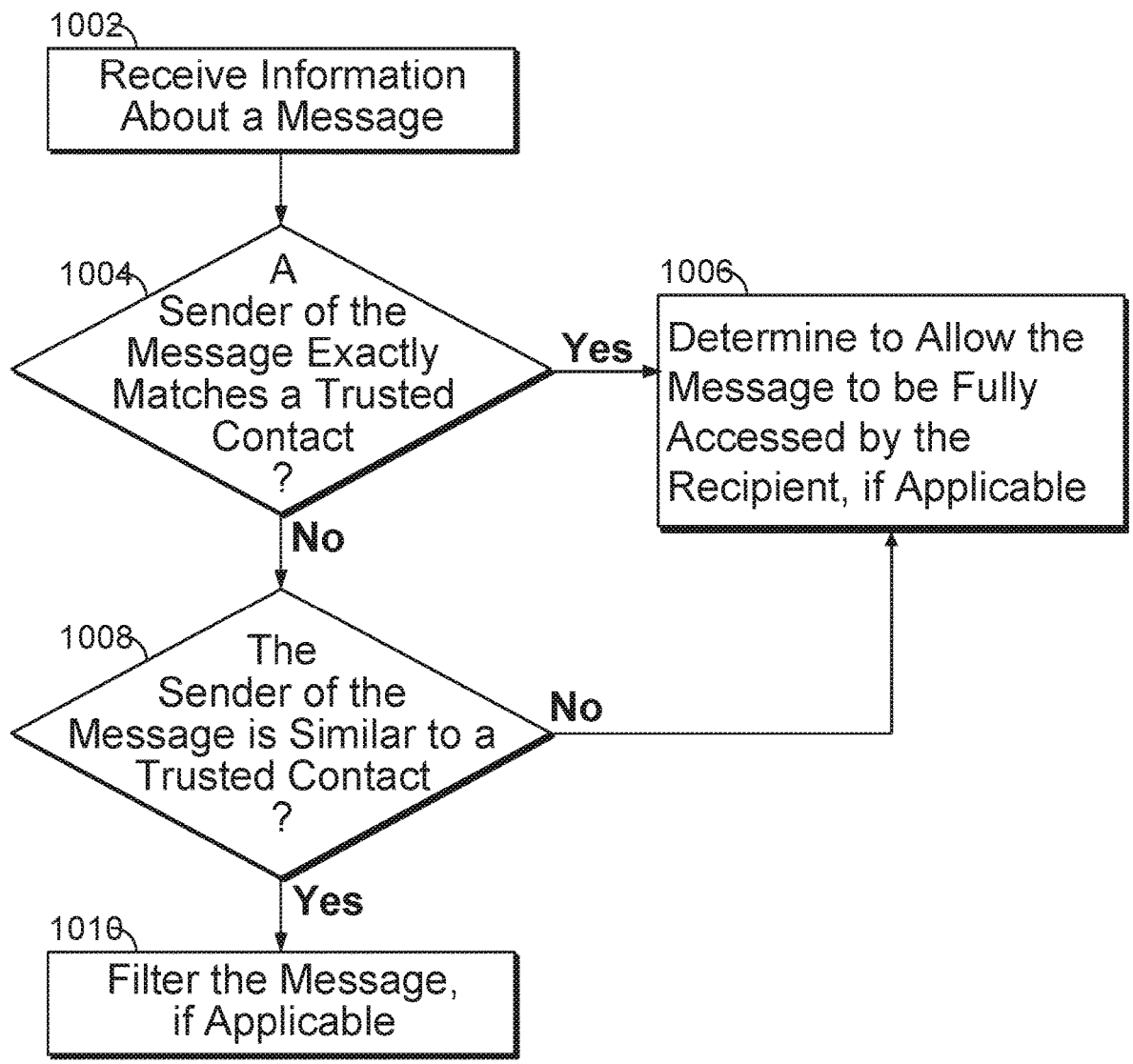
FIG. 10 is a flowchart illustrating an embodiment of a process for assessing a received message for filtering.

FIG. 10 is a flowchart illustrating an embodiment of a process for assessing a received message for filtering. The process of FIG. 10 may be at least in part implemented on analysis server 102, gateway 110, and/or message server 106 of FIG. 1. At least a portion of the process of FIG. 10 may be performed in 204, 304, and/or 314 of the processes of FIGS. 2-3B.

At 1002, information about a message is received. In some embodiments, the information is received at analysis server 102 of FIG. 1. The information may include information about a sender of the message. For example, the information includes email address header information including an email address and a display name of the sender of the message. In some embodiments, the information about the message includes contents of the message. Examples of the message include an electronic mail (i.e., email), an instant message, a chat message, and any other forms of electronic messages.

At 1004, it is determined whether a sender of the message exactly matches a trusted contact. For example, it is determined whether an address of the sender of the message (e.g., in a "From:" field of a message header) exactly matches an address of a trusted contact in a list of trusted contacts for the recipient of the message. In some embodiments, the trusted contacts include trusted contacts identified in 702 and/or 704 of FIG. 7. For example, a list of trusted contacts for the recipient of the message is obtained from storage and email addresses for each trusted contact of the list are compared with the email address of a sender of the message to identify whether there is an exact match.

If at 1004 it is determined that the sender of the message exactly matches the trusted contact, at 1006, it is determined to allow the message to be fully accessed by the recipient, if applicable. For example, because the sender of the message exactly matches the trusted contact, the message is allowed to be delivered (e.g., by sending the message to a mail delivery server and indicating that the message is allowed to be delivered) to the recipient user. In some embodiments, the message is allowed to be accessed by the recipient without message filtering that would otherwise be performed if the message was identified as potentially a part of an impersonation attack. In some embodiments, the message is further analyzed prior to allowing it to be fully accessed by the recipient. For example, the message may be analyzed to identify whether it includes a virus, a spam, or a malware. In some embodiments, the total risk score determined using 906 of FIG. 9 is utilized to determine whether to allow full access to the message. If a value of the measure of total risk of the sender is above a threshold value, the message is identified as a risk and the message is filtered as in 1010 to reduce its risk to the recipient.

If at 1004 it is determined that the sender of the message does not exactly match a trusted contact, at 1008, it is determined whether the sender of the message is similar to a trusted contact. For example, by determining whether the sender of the message is similar to a trusted contact, a likelihood of confusion by a recipient of the message that the message is from a trusted contact is determined. In some embodiments, the determining whether the sender of the message is similar to a trusted contact includes determining a measure of similarity between the sender of the message and each contact in a list of trusted contacts. In some embodiments, the list of trusted contacts includes trusted contacts identified in 702 and/or 704 of FIG. 7. For example, a list of trusted contacts for the recipient of the message (e.g., recipient identified in a "To:" field of the message) is obtained from storage.

In some embodiments, determining the measure of similarity includes determining a string similarity measure (e.g., string distance) using a string matching algorithm (e.g., Jaro-Winkler). For each trusted contact in a group of trusted contacts, string similarity measures may be determined between an address of the trusted contact and/or a display name of the trusted contact with an address of the sender of the message (e.g., string in a "From:" field of the message between "<" and ">" characters), a display name of the sender of the message (e.g., string in a "From:" field of the message prior to "<" character), and/or a subject of the message. For example, potentially six string similarity measures may be determined for each trusted contact email/ display name combination (e.g., trusted contact address compared to sender address, trusted contact address compared to sender display name, trusted contact address compared to message subject, trusted contact display name compared to sender address, trusted contact display name compared to sender display name, and trusted contact display name compared to message subject).

Comparison of the subject to the message to the trusted contact address/display name is performed to detect masquerade attempts in which the actual sender uses deceptive display names and/or subject lines to trick recipients that emails are from a trusted sender. For example, the sender joe123@gmail.com may set his display name to appear as a subject line, and use a subject line that appears as a from email address. This attacker may use the display name "Please review this material and let me know your thoughts. Fwd: slide deck, June 15 version," and the subject line "Bob Bigboss <bbigboss@bigbossventures.com>" to an email. The display name, being very long, will often hide the attacker's email address (e.g., which is displayed after the display name for a typical mail client, or not displayed at all for some mail clients). Many recipients will not realize that the subject line appears where the sender address is normally shown, and vice versa. Therefore, such recipients will believe that the email comes from Bob Bigboss <bbigboss@bigbossventures.com>, despite it being displayed in the subject field. In some embodiments, the subject of the message is only utilized to perform the determination of the measure of similarity if the display name of the sender of the email is longer than a threshold length.

In some embodiments, prior to performing the string comparison to determine the measure of similarity, element portions of the strings are sorted (e.g., alphabetically sorted) based on a predetermined order. The element portions of the string may be delimited by a space character or other special characters (e.g., comma, period, etc.). For example, strings "Bob Bigboss" and "Bigboss Bob" may be determined to be not similar in string distance despite them being a simple reversal of the order of the first/last names. Thus, the element portions "Bob" "Bigboss" in "Bob Bigboss" can be alphabetically sorted as "Bigboss Bob" prior to being used in the string comparison.

In some embodiments, determining the measure of similarity includes detecting use of substitution characters that mimic corresponding traditional alphabet/number characters in the sender address, sender display name, and/or subject of the message prior to comparison with identifiers of the trusted contact. For example, an attacker may use substitution characters to visually mimic a character in an identifier of a trusted contact (e.g., replace "o" with zero, replace with Cyrillic letter, replace with Greek letter, replace with symbol resembling a traditional letter/number, etc.). In some embodiments, if substitution characters are detected, various versions of the sender address, sender display name, and/or subject of the message that replace one or more different combinations of substitution characters with corresponding traditional characters are generated and utilized in the string comparisons with the identifiers of the trusted contacts.

In some embodiments, it is determined that the sender of the message is similar to a trusted contact if any measure of similarity (e.g., string distance measure) meets a threshold value. For example, if any string distance measure determined for a list of trusted contacts is greater than a threshold value, the message is identified as potentially an impersonation attack message and it is determined that the sender of the message is similar to the trusted contact.

In some embodiments, messages that are highly authentic (e.g., associated with a valid DMARC signature, correct SPF records, or both) but which come from domains that are associated with low control are to be subject to increased analysis. For example, a measure of control of the domain of the sender is determined. The measure of control measures how easy it is to create an account of the domain without having to pass a careful screening. For example, any user is able to create a Google Gmail account by setting the username to any available user name and setting the display name to any correctly formed display name. Thus, domains correspond to a very low degree of control by the domain owner. In contrast, the typical enterprise or government entity has high control over account creation, allowing only employees and affiliates to create accounts, where these have to satisfy some common criteria related to the real-life identity of the user. When the message is identified as having high authenticity but low domain control, then the display name is to be scrutinized (e.g., compared to trusted display names using string distance as previously discussed), whereas for domains with high control, the display name is not scrutinized (e.g., display name impersonation detection not performed).

If at 1008 it is determined that the sender of the message is similar to a trusted contact, at 1010, it is determined to filter the message, if applicable. Filtering the message may include modifying at least a portion of the message, affecting delivery of the message, providing a notification regarding the message, and/or performing additional analysis on the message. An example of filtering the message is performing a security action.

In some embodiments, modifying at least a portion of the message includes modifying (e.g., replacing, adding or removing/deleting) data included in a data field (of the message) that includes an identification of the sender of the message. For example, the data field that is identified to include the identification of the sender is selected from a plurality of data fields of a message header and contents of the selected data field is modified. Examples of the identification of the sender includes a display name, an email address (e.g., "from" email address), a reply-to address, a phone number, an image, a content link, or any other identifier/identification of the sender specified in the message. The data field of the message may be included in a header of the message. For example, the data field of the message is a "From:" field, a "Reply-To:" field or a "Return-Path:" field of an email message header. In some embodiments, the message is a SMS message or a MMS message and a phone number of the sender in the data field is modified. For example, the sender phone number is removed or changed to a different number. In some embodiments, modifying data included in the data field includes modifying a location identifier of content associated with the sender of the message. For example, a URL to an image of the sender is modified to reference a different image (e.g., replacement image includes a warning message).

One example filtering is quarantining the message and sending an automated message to the email address in the "From:" field of the message regarding the quarantine. The automated email may require the recipient to click on a hyperlink that is unique and not predictable to an attacker. If the system determines that such a link was clicked on (e.g., by receiving a corresponding GET request), then the email may be taken out of quarantine and delivered.

Another example filtering is sending an automated email in response to the received message (e.g., whether to the address in the from field or a potential address in the 'reply-to' field or both), requiring the recipient to click on a hyperlink where he or she has to enter a code obtained from an authenticator module, such as a SecurID token or Google authenticator app. If the entered code is correct, the message is taken out of quarantine and delivered.

In an alternative embodiment, the received message is not quarantined but delivered to its recipient after being modified. For example, a warning message is added to one or more header fields and/or the body of the message (e.g., add warning message to subject of message, add warning message to modify sender address, etc.). In some embodiments, the received message is modified to change, remove, and/or censure at least a portion of the message (e.g., remove attachment, remove hyperlinks, remove/modify reply to address, etc.).

If at 1008 it is determined that the sender of the message is not similar to a trusted contact, the process returns to 1006. In an alternative embodiment, if at 1008, it is determined that the sender of the message is not similar to a trusted contact, the message is identified for filtering if the recipient of the message has never sent a message to the sender of the message. In some embodiments, the total risk score determined using 906 of FIG. 9 is utilized to determine whether to allow full access to the message. If a value of the measure of total risk of the sender is above a threshold value, the message is identified as a risk and the message is filtered in 1010 to reduce its risk to the recipient.

Figure 11A:
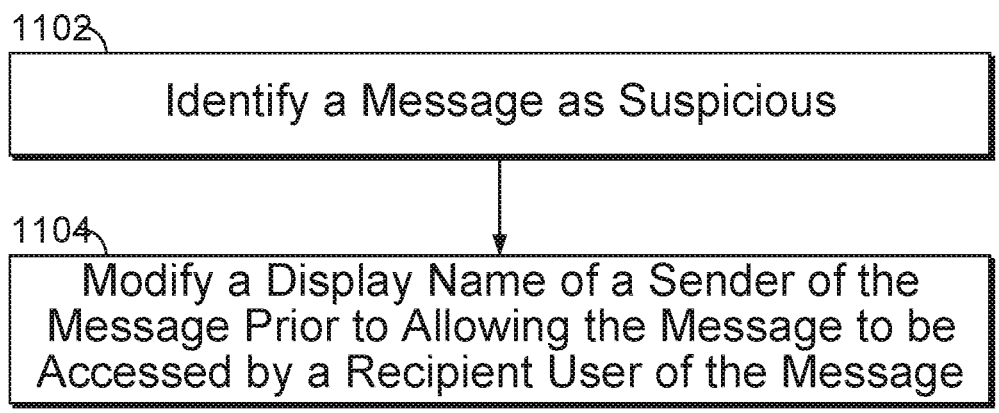
FIG. 11A is a flowchart illustrating an embodiment of a process for modifying a display name of a sender of the message.

FIG. 11A is a flowchart illustrating an embodiment of a process for modifying a display name of a sender of the message. The process of FIG. 11A may be at least in part implemented on analysis server 102, gateway 110, and/or message server 106 of FIG. 1. In some embodiments, at least a portion of the process of FIG. 11A is performed in filtering the message in 1006 and/or 1010 of FIG. 10. At least a portion of the process of FIG. 11A may be performed in 206 of FIG. 2. For example, 1104 of FIG. 11A is performed in 206 FIG. 2 as a selected security action to perform.

At 1102, a message is identified as suspicious. For example, it is identified in 708 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

At 1104, a display name of a sender of the message is modified prior to allowing the message to be accessed by a recipient user of the message. For example, the display name of the sender is rewritten to include a warning regarding its risk. In one example, consider an email with display name "Pat Peterson," but not associated with an email address of a Pat Peterson that is considered trusted. This may cause the system to determine that the email is risky, and modify the display name to "Warning! Unknown user with the name 'Pat Peterson.'" Conversely, if an email is determined to come from a trusted sender, the system may modify the display name by adding symbol(s) (e.g., icon of a star) identifying its risk. In some embodiments, display names of senders in messages identified as not suspicious are normalized, which may involve removing anything looking like a trust indicator (e.g., such as an icon of a star) from the display name, or adding another symbol to the display name. Alternatively, a message from a user that is neither considered risky nor trusted could have its display name removed and replaced by only the message address of the sender (e.g., only email address without display name), drawing the attention of the recipient to the fact that this is a user with whom the system has not determined there to be a trust relationship. This may be particularly beneficial to users who use mail clients that do not display the full email address, but only show the display name.

In some embodiments, in addition to or instead of the display name, an email address of the sender is also modified. For example, the entire "From:" field of a header of the message that includes both the display name and an email address is modified with a warning.

Figure 11B:
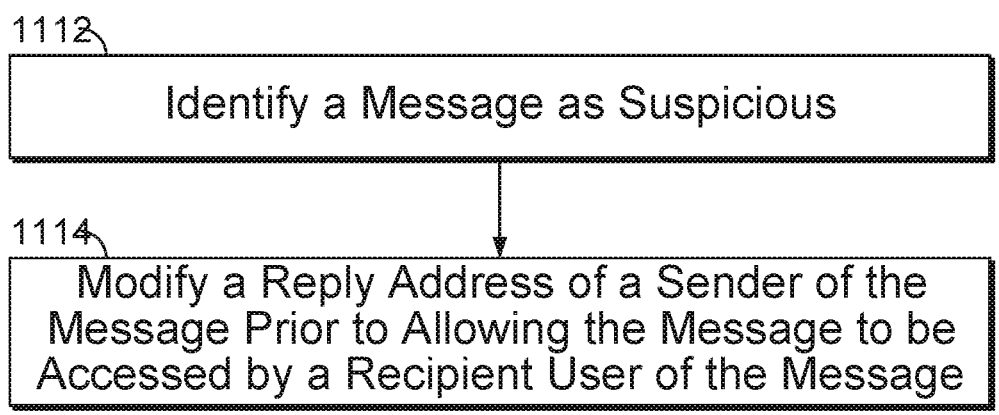
FIG. 11B is a flowchart illustrating an embodiment of a process for modifying a reply address of a sender of the message.

FIG. 11B is a flowchart illustrating an embodiment of a process for modifying a reply address of a sender of the message. The process of FIG. 11B may be at least in part implemented on analysis server 102, gateway 110, and/or message server 106 of FIG. 1. In some embodiments, at least a portion of the process of FIG. 11B is performed in filtering the message in 1006 and/or 1010 of FIG. 10. At least a portion of the process of FIG. 11B may be performed in 206 of FIG. 2. For example, 1114 of FIG. 11B is performed in 206 FIG. 2 as a selected security action to perform.

At 1112, a message is identified as suspicious. For example, it is identified in 508 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

At 1114, a reply address of a sender of the message is modified prior to allowing the message to be accessed by a recipient user of the message. In the event where the message does not have a reply address, a "Reply-To:" field is automatically added to the message. This can be a real email address, different from the "from" address of the received message, and act as a quarantine for outgoing responses to high-risk emails. In such a quarantine, the recipient system can carefully verify (e.g., whether automatically or using manual effort, or a combination thereof) that the outgoing message is safe before it is automatically sent to the "from" address of the received email.

In some embodiments, an address in a "Reply-To:" field of an email header is replaced or inserted with a warning message (e.g., not a valid reply address) regarding the suspicious risk of the message. In one example, the "reply to" address of a message is replaced/created as "Warning! This is a user you have never sent an email to—If you want to proceed, remove this text from the recipient field of the email you want to send, and add the address of the recipient you wish to send it to." This reply address will cause a pop-up on some message clients with the text above (e.g., and an error stating that it is not a valid email address) or may cause on some message clients to bounce the email.

Figure 12:
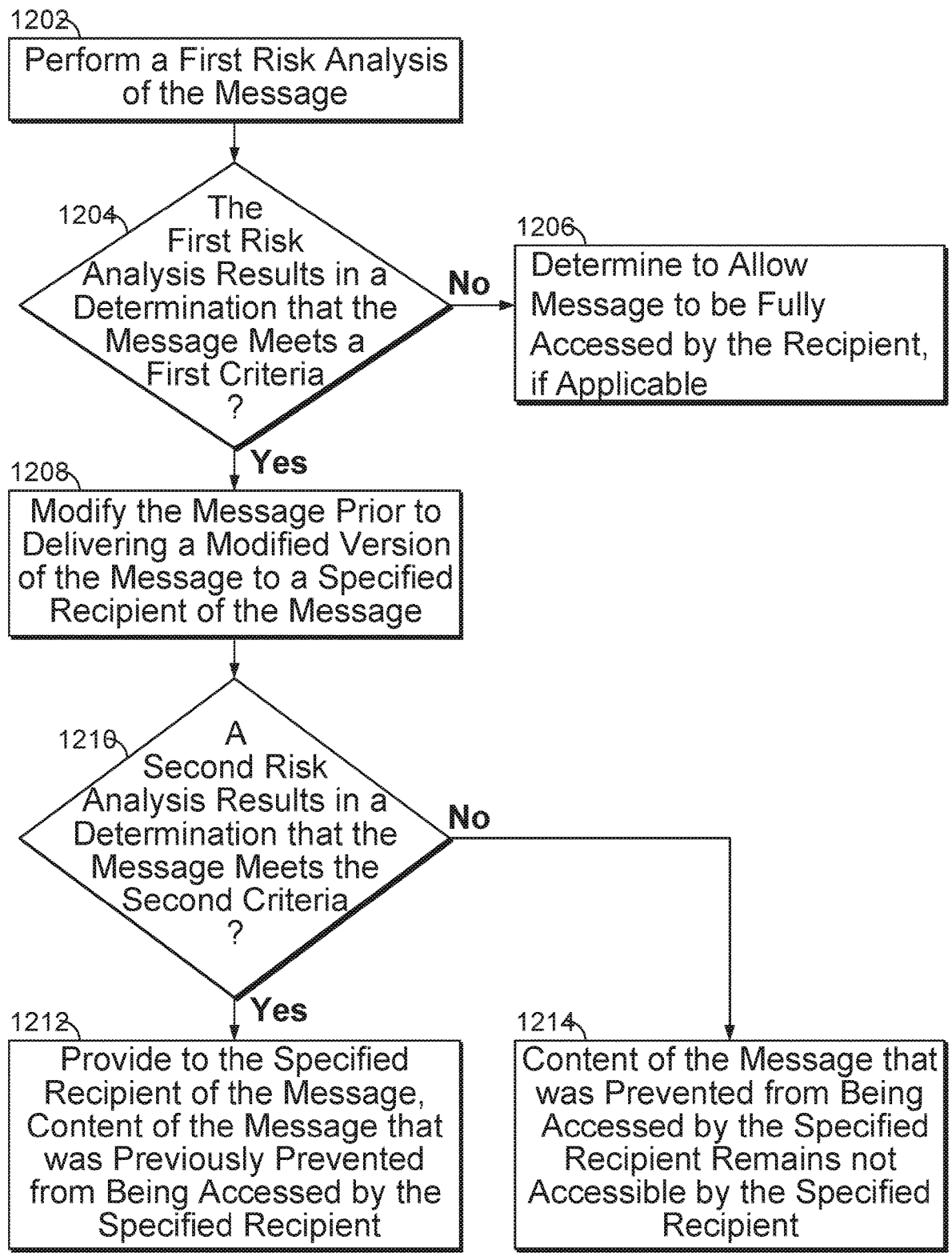
FIG. 12 is a flowchart illustrating an embodiment of a process for securing a message.

FIG. 12 is a flowchart illustrating an embodiment of a process for securing a message. The process of FIG. 12 may be at least in part implemented on analysis server 102, gateway 110, and/or message server 106 of FIG. 1. In some embodiments, at least a portion of the process of FIG. 12 is performed in filtering the message in 1006 and/or 1010 of FIG. 10. At least a portion of the process of FIG. 12 may be performed in 204 and/or 206 of the process of FIG. 2.

At 1202, a first risk analysis of the message is performed. For example, it is determined whether the message is suspicious. In some embodiments, steps 1004 and/or 1006 of FIG. 10 is performed in 1202. For example, it is determined whether the sender of the message is similar to a trusted contact. By determining whether the sender of the message is similar to a trusted contact, a likelihood of confusion by a recipient of the message that the message is from a trusted contact may be determined. In some embodiments, the determining whether the sender of the message is similar to a trusted contact includes determining a measure of similarity between the sender of the message and each contact in a list of trusted contacts. In some embodiments, the list of trusted contacts includes trusted contacts identified in 702 and/or 704 of FIG. 7. For example, a list of trusted contacts for the recipient of the message (e.g., recipient identified in a "To:" field of the message) is obtained from storage.

In some embodiments, determining the measure of similarity includes determining a string similarity measure (e.g., string distance) using a string matching algorithm (e.g., Jaro-Winkler). For each trusted contact in a group of trusted contacts, string similarity measures may be determined between an address of the trusted contact and/or a display name of the trusted contact with an address of the sender of the message (e.g., string in a "From:" field of the message between "<" and ">" characters), a display name of the sender of the message (e.g., string in a "From:" field of the message prior to "<" character), and/or a subject of the message. For example, potentially six string similarity measures may be determined for each trusted contact email/display name combination (e.g., trusted contact address compared to sender address, trusted contact address compared to sender display name, trusted contact address compared to message subject, trusted contact display name compared to sender address, trusted contact display name compared to sender display name, and trusted contact display name compared to message subject).

Comparison of the subject to the message to the trusted contact address/display name is performed to detect masquerade attempts in which the actual sender uses deceptive display names and/or subject lines to trick recipients that emails are from a trusted sender. For example, the sender joe123@gmail.com may set his display name to appear as a subject line, and use a subject line that appears as a from email address. This attacker may use the display name "Please review this material and let me know your thoughts. Fwd: slide deck, June 15 version," and the subject line "Bob Bigboss <bbigboss@bigbossventures.com>" to an email. The display name, being very long, will often hide the attacker's email address (e.g., which is displayed after the display name for a typical mail client, or not displayed at all for some mail clients). Many recipients will not realize that the subject line appears where the sender address is normally shown, and vice versa. Therefore, such recipients will believe that the email comes from Bob Bigboss <bbigboss@bigbossventures.com>, despite it being displayed in the subject field. In some embodiments, the subject of the message is only utilized to perform the determination of the measure of similarity if the display name of the sender of the email is longer than a threshold length.

In some embodiments, prior to performing the string comparison to determine the measure of similarity, element portions of the strings are sorted (e.g., alphabetically sorted) based on a predetermined order. The element portions of the string may be delimited by a space character or other special characters (e.g., comma, period, etc.). For example, strings "Bob Bigboss" and "Bigboss Bob" may be determined to be not similar in string distance despite them being a simple reversal of the order of the first/last names. Thus, the element portions "Bob" "Bigboss" in "Bob Bigboss" can be alphabetically sorted as "Bigboss Bob" prior to being used in the string comparison.

In some embodiments, determining the measure of similarity includes detecting use of substitution characters that mimic corresponding traditional alphabet/number characters in the sender address, sender display name, and/or subject of the message prior to comparison with identifiers of the trusted contact. For example, an attacker may use substitution characters to visually mimic a character in an identifier of a trusted contact (e.g., replace "o" with zero, replace with Cyrillic letter, replace with Greek letter, replace with symbol resembling a traditional letter/number, etc.). In some embodiments, if substitution characters are detected, various versions of the sender address, sender display name, and/or subject of the message that replace one or more different combinations of substitution characters with corresponding traditional characters are generated and utilized in the string comparisons with the identifiers of the trusted contacts.

At 1204, it is determined whether the first risk analysis results in a determination that the message meets a first criteria. For example, it is determined whether the message meets a criteria to be deemed suspicious. In some embodiments, message meets the first criteria if a measure of similarity (e.g., string distance measure) meets a threshold value. For example, if any string distance measure determined for a list of trusted contacts (e.g., determined in 1202) is greater than a threshold value, the message is identified as potentially an impersonation attack message and it is determined that the message meets the first criteria.

In some embodiments, the message meets the first criteria if a sender of the message has not previously sent a message to a recipient identified in the message. In some embodiments, the message meets the first criteria if a recipient identified in the message has not previously sent a message to the sender of the message. In some embodiments, the message meets the first criteria if a spam detector, a virus detector, and/or a malware detector has detected that the message includes a spam, virus or malware.

In some embodiments, a total risk score determined using 906 of FIG. 9 is utilized to determine whether message meets the first criteria. For example, if a value of the measure of total risk of the sender is above a threshold value, the message is identified as meeting the first criteria.

If at 1204 it is determined that the message does not meet the first criteria, at 1206 it is determined to allow the message to be fully accessed by the recipient, if applicable. For example, because the sender of the message exactly matches the trusted contact or sender of the message is not similar to any trusted contact, the message is allowed to be delivered (e.g., by sending the message to a mail delivery server and indicating that the message is allowed to be delivered) to the recipient user. In some embodiments, the message is allowed to be accessed by the recipient without message filtering that would otherwise be performed if the message was identified as potentially a part of an impersonation attack. In some embodiments, the message is further analyzed prior to allowing it to be fully accessed by the recipient. For example, the message may be analyzed to identify whether it includes a virus, a spam, or a malware.

If at 1204 it is determined that the message does meet the first criteria, at 1208 the message is modified prior to sending a modified version of the message to a specified recipient of the message. For example, a warning message is added to one or more header fields and/or the body of the message (e.g., add warning message to subject of message, add warning message to modify sender address, etc.). The first risk analysis is performed before sending the modified version of the message. Sending the modified version may include delivering the modified version to the specified recipient (e.g., deliver to a mailbox of the specified recipient on server 106 of FIG. 1).

In some embodiments, modifying at least a portion of the message includes modifying (e.g., replacing, adding or removing/deleting) data included in a data field of the message that includes an identification of the sender of the message (e.g., modify an identifier of the sender). Examples of the identification of the sender includes a display name, an email address (e.g., "from" email address), a reply-to address, or any other identifier/identification of the sender specified in the message. The data field of the message may be included a header of the message. For example, the data field that includes the identification of the sender is a "From:" field, a "Reply-To:" field or a "Return-Path:" field of an email message header. The contents of the data field may be modified to provide a warning to a recipient, prevent a potential confusion of an identity of the sender of the message by the recipient of the message and/or prevent the recipient from responding to the message or sending a message to the sender of the message.

In some embodiments, the received message is modified to change, remove, and/or censure at least a portion of a content of the message (e.g., remove attachment, remove hyperlinks, remove a portion of the message content beyond a selected beginning body portion, etc.). For example, a message body section of an email message is modified to censure at least a portion of a content of the email message. In some embodiments, modifying the message includes inserting an inquiry associated with a verification of the sender of the message, wherein the inquiry requests a user response.

At 1210, a second risk analysis of the message is performed and it is determined whether the second risk analysis results in a determination that the message meets the second criteria. In some embodiments, the modified version of the message is sent to the specified recipient of the message (e.g., sent to a mailbox of the specified recipient on server 106 of FIG. 1) prior to a conclusion of the second risk analysis. For example, the modified version of the message is sent and delivered to a mailbox of the specified recipient of the message prior to the conclusion of the second risk analysis. In some embodiments, the second risk analysis concludes upon determination of whether the second risk analysis results in a determination that the message meets the second criteria.

In some embodiments in 1210, any of a plurality of different types of verification/security actions may be performed to further analyze and verify the message (e.g., verify an identity of the sender of the message). For example, it is determined whether a classification of the sender of the message requested and received from the specified recipient of the message matches an automatically identified classification of the sender, and it is determined the message meets the second criteria if a user response to the requested classification matches the automatically identified classification (e.g., see the process of FIG. 13A). In another example, an automatically generated reply message to a received message is sent the sender of the received message requesting verification of an identity of the sender of the message and it is determined the message meets the second criteria if the sender has provided a valid identity in response to the reply message (e.g., see the process of FIG. 14A).

If at 1210 it is determined that the second risk analysis results in a determination that the message meets the second criteria, at 1212, content of the message that was previously prevented from being accessed by the specified recipient is provided to the specified recipient of the message. The second risk analysis may be a more in-depth and/or resource intensive analysis of the message reserved for messages that fail the first risk analysis. For example, an original version of the message prior to the modification in 1208 is sent to the specified recipient of the message. This original version may be a duplicate message in addition to the initially provided modified version of the message (e.g., original version delivered as a new message to the specified recipient) or this original version may be a replacement message of the initially provided modified version of the message (e.g., initially provided modified message is deleted from mailbox of the specified recipient of the message and replaced with the original version). In some embodiments, the content of the message that was previously prevented from being accessed is included a new message sent to the specified recipient of the message.

If at 1210 it is determined that the second risk analysis results in a determination that the message does not meet the second criteria, at 1214 content of the message that was prevented from being accessed by the specified recipient remains not accessible by the specified recipient. In some embodiments, the message is deleted or quarantined. For example, after a period of time of message not meeting the second criteria and/or if it is determined during the second risk analysis that the message is potentially hazardous to a specified recipient of the message, the message is automatically deleted or quarantined to prevent access by the specified recipient to the entire message. In some embodiments, a notification is provided to an administrator. For example, the administrator is provided a warning about the message failing the second risk analysis.

Figure 13A:
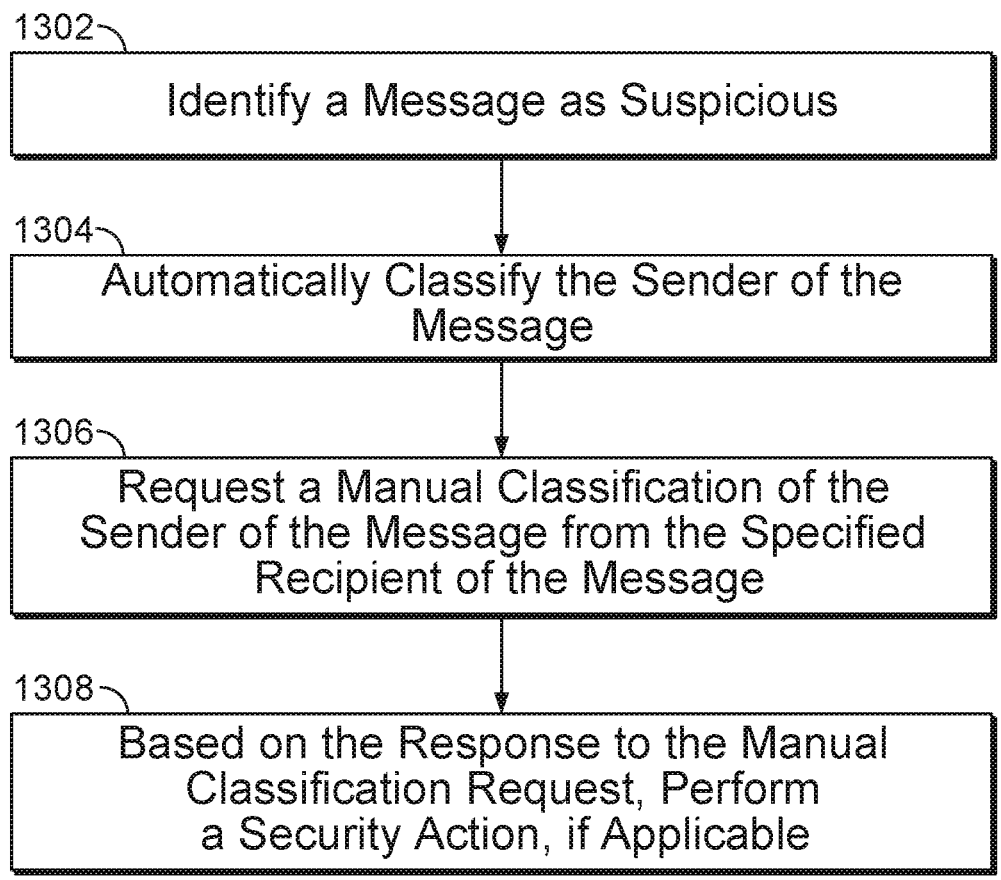
FIG. 13A is a flowchart illustrating an embodiment of a process for detecting misrecognition of a sender of a message by a recipient of the message.

FIG. 13A is a flowchart illustrating an embodiment of a process for detecting misrecognition of a sender of a message by a recipient of the message. The process of FIG. 13A may be at least in part implemented on analysis server 102, gateway 110, and/or message server 106 of FIG. 1. In some embodiments, at least a portion of the process of FIG. 13A is performed in one or more steps of the process of FIG. 2. In some embodiments, at least a portion of the process of FIG. 13A is performed in one or more steps of the process of FIG. 12. For example, at least a portion of the process of FIG. 13A is performed in performing the first and/or second risk analysis of the process of FIG. 12.

At 1302, a message is identified as suspicious. For example, it is identified in 1008 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

In some embodiments, by basing the whether the message is suspicious on knowledge about trusted contacts of the specified recipient of the message, a message is only classified as suspicious and risky based on the likelihood that the recipient will confuse the sender with a trusted contact specific to the recipient. Otherwise, the risk may be marginal if the recipient does not know or trust the sender of the message since the sender is likely not impersonating someone that the recipient already knows. Thus a message is particularly dangerous if it is not from a trusted party, but the recipient thinks it is. In contrast, if the recipient knows that an email from an untrusted party is from an untrusted party, he or she is not as much at risk as he or she is not likely to feel compelled to comply with the requests or instructions in the message At 1304, the sender of the message is automatically classified. In some embodiments, classifying the sender includes identifying a classification/category of the sender. For example, a relationship classification/category of the sender with respect to the specified recipient of the message is automatically determined based on a property of an identifier of the sender (e.g., domain), previous message history between the sender and recipient, and/or other list or database (e.g., database of business contacts of the recipient). Examples of the classification of the sender include a college, a business partner, a friend/acquaintance, or unknown.

For example, if the sender is associated with the same domain as the recipient, then the sender is classified as a colleague classification. This classification may also be used if the email address of the sender is a known personal email address of a user with a colleague message address. This personal address may be determined using manual registration of such addresses by the account owner, as well as by identification of message traffic indicative of a work account being related to a personal account, such as having closely related display names and extensive forwarding of material from one account to the other. If the sender is a service provider or a client of an entity associated with the recipient, then the sender is classified as a business partner classification. This type of classification may be identified by detection of a sufficient volume of message traffic over time between the sender and the recipient, or from a database/list of recorded business contacts/relationships. In some embodiments, the sender is classified as a friend/acquaintance classification for a given sufficient volume of message traffic over time between the sender and the recipient but cannot be classified as a colleague or a business partner. If the sender cannot be classified as a colleague, business partner, or friend/acquaintance, the sender is classified as known/stranger.

In some embodiments, the sender of the message is automatically classified based on a list of trusted contacts tracked for the recipient (e.g., tracked using the process of FIG. 7). For example, a trusted contact in the stored list of trusted contacts may be associated with a classification identifier provided by a user and/or automatically determined. An identifier of the sender of the email may be utilized to locate a corresponding entry in the stored list of trusted contacts to identify its classification.

At 1306, a manual classification of the sender of the message is requested from the specified recipient of the message. For example, before the message is fully provided to the recipient, a classification of the sender of the message is requested from the user in order to verify the recipient's believed classification of the sender as compared to the automatically determined classification. In some embodiments, the message is modified to change, remove, or obfuscate (e.g., remove attachment, remove hyperlinks, hide phone numbers, only retain a beginning portion of contents of the message and hide ending portion of the message, etc.) at least a portion of the message to prevent the recipient from having full access to the message prior to verification of the recipient's knowledge about the sender of the message. In some embodiments, the message is modified to include selection choices corresponding to the classification options (e.g., different selectable HTML hyperlinks included in the message and selection of a particular hyperlink option sends a request to the unique address of the hyperlink that can be detected by a server to identify which classification option was selected based on the unique address of the request corresponding to the selection option). In some embodiments, if a recipient replies to the message to the sender prior to providing the classification, the reply message is held/quarantined at a mail server until it is determined that it is safe to send the message. Another classification option is to identify the sender as a spammer or malware attacker. Selection of this classification may result in the removal of the email and blocking of future messages from the sender.

FIG. 13B shows an example of a modified message requesting manual classification of the sender of the message. Message 1320 includes contents of the original message 1322 as well as added selected choices 1324 that requests the recipient to classify the sender of the message.

Returning to FIG. 13A, at 1308, based on the response to the manual classification request, a security action is performed, if applicable. In some embodiments, if the manual classification response does not match the automatically determined classification, a security action is performed to warn the recipient about the mismatch and/or prevent the user from fully accessing or replying to the message. For example, the message may be deleted and replaced with a version of the message that has been modified (e.g., subject, sender display name, sender address, reply to address, and/or content of the message removed or modified with a warning indicator). In another example, the message may be deleted and quarantined for additional review by the recipient and/or an administrator. In some embodiments, in the event the sender of the message was correctly classified manually by the recipient and the automatic classification was incorrect, an opportunity is provided to add the sender of the message to the list of trusted contacts for the recipient and/or add an identifier of the sender (e.g., email address and display name) to an existing contact (e.g., as a secondary email address) in the list of trusted contacts. The sender may be added to the list of trusted contacts by the recipient, an administrator, or by the sender (e.g., by requiring the user to prove access to an account of an existing trusted contact).

Figure 14A:
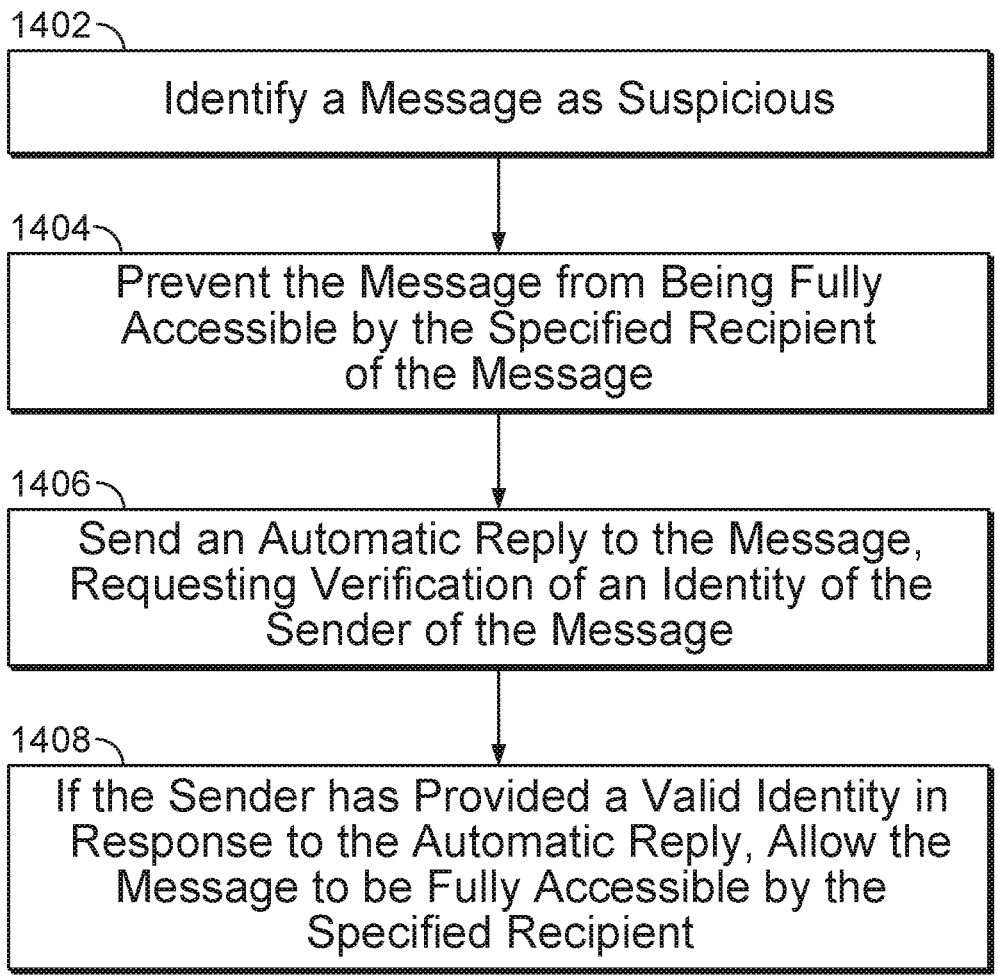
FIG. 14A is a flowchart illustrating an embodiment of a process for requiring a sender of a message to verify an identity of the sender.

FIG. 14A is a flowchart illustrating an embodiment of a process for requiring a sender of a message to verify an identity of the sender. The process of FIG. 14A may be at least in part implemented on analysis server 102, gateway 110, and/or message server 106 of FIG. 1. In some embodiments, at least a portion of the process of FIG. 14A is performed in filtering the message in 1006 and/or 1010 of FIG. 10. In some embodiments, at least a portion of the process of FIG. 14A is performed in one or more steps of the process of FIG. 12. For example, at least a portion of the process of FIG. 14A is performed in performing the first and/or second risk analysis of the process of FIG. 12. At least a portion of the process of FIG. 14A may be performed in one or more steps of the process of FIG. 2. For example, it is performed as a security action in 206 of FIG. 2.

At 1402, a message is identified as suspicious. For example, it is identified in 1008 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

At 1404, the message is prevented from being fully accessible by the specified recipient of the message. For example, at least a portion of the message is modified or removed. In another example, the message is quarantined and not delivered to the recipient.

At 1406, an automatic reply to the message is sent requesting verification of an identity of the sender of the message.

This verification attempt may be utilized to identify good emails from accounts that are not trusted, but which are nevertheless associated with trusted persons. For example, if one executive's name is John Adams, and another executive receives an email from a John Adams—but not the same account as to which she has a trust relationship—then this is a potentially deceptive email—but also an email that is potentially from another account (such as the personal account) of the trusted person. The reply message includes the message "Your email triggered an alert. Have you sent emails to the recipient using another email address? If so, please click here. Otherwise, click here." The first hyperlink (associated with the first occurrence of "here") would lead to a website where the visitor enters his or her "other" email address (e.g., trusted contact address), and a verification email is sent to that address. That verification email contains a challenge value, such as a secret string of alphanumeric characters, that the recipient has to copy and paste into the site where the email address was entered. The second hyperlink takes the user to a site where he or she is offered to solve a CAPTCHA, associate a phone number (e.g., by sending an SMS challenge value to the phone number), or perform another action that attackers are typically unwilling to perform.

FIG. 14B shows an example of an automatic reply message requesting verification of an identity of the sender of the message. Message 1420 informs the user that the sender's message has been quarantined and will not be delivered unless identity of the sender is established. Message 1420 instructs the sender to forward the automatic reply message to a second message account (e.g., account of trusted contact) that the sender has previously used to communicate with the recipient and using the second account, forward again the forwarded message to a verification system for verification of the possession of the second account.

Returning to FIG. 14A, the automatic reply to the message may be utilized to detect spoofing attempts. For example, the automatic reply is sent to a system of the sender to request verification that the sender identified in the message actually sent the message. For example, at least two installations of message security systems, where a first installation is associated with a first entity and a second installation is associated with a second entity, the second system identifies receipt of an email originating with a sender associated with the first system. The second system then sends an inquiry to the first system, where the inquiry contains information related to the email. The first system determines whether the email associated with the inquiry was sent from the indicated apparent sender, and generates a response to the second system. If the second system receives a negative response, then the email is not delivered to the intended recipient, or if it has already been delivered, then it is either removed from the inbox or a notification is sent to the recipient, warning the recipient of the email. In addition, a notification may be sent to an administrator associated with the second system. In some embodiments, a notification is also sent to an admin associated with the first system. If, on the other hand, the response to the inquiry is a positive response, then the email is delivered to the recipient. If an email has more than one recipient within the second system, then it is delivered to each such recipient. Here, the first and second systems may access emails in different ways. For example, the first system may correspond to an outbound collector of emails and the second system to an OAUTH access of one or more email boxes. The first system may also be an appliance controlling or relaying emails, or be an OAUTH-enabled method to access the various mailboxes (including the sent folder) of one or more users. In some embodiments, all communications between the two security systems are encrypted and authenticated.

At 1408, if the sender has provided a valid identity in response to the automatic reply in 1406, the message is allowed to be fully accessible by the specified recipient. For example, if the user has provided an established position of an alternate trusted account that can be trusted (e.g., account of trusted contact) or has otherwise provided or proved an identity of the sender, the message is allowed to be fully accessible. Making the message fully accessible may include allowing the message to be delivered and accessed by the recipient with all of its original content. This may also cause the sender (e.g., sender email address) to be whitelisted or associated with an increased trust value (e.g., add to trusted contacts). In some embodiments, the provided full access message includes a warning, bringing to the attention of the recipient that this is an email from a potential stranger.

If the sender does not provide a valid identity in response to the automatic reply in 906, the message may remain unable to be fully accessible by the specified recipient of the message. In some embodiments, the message is indicated to an administrator and/or deleted.

In some embodiments, if the reply to the address of the message is identified or unknown to be unattended (e.g., not monitored by a recipient user), the message is provided to the recipient in a modified form and/or with a warning.

Figure 15:
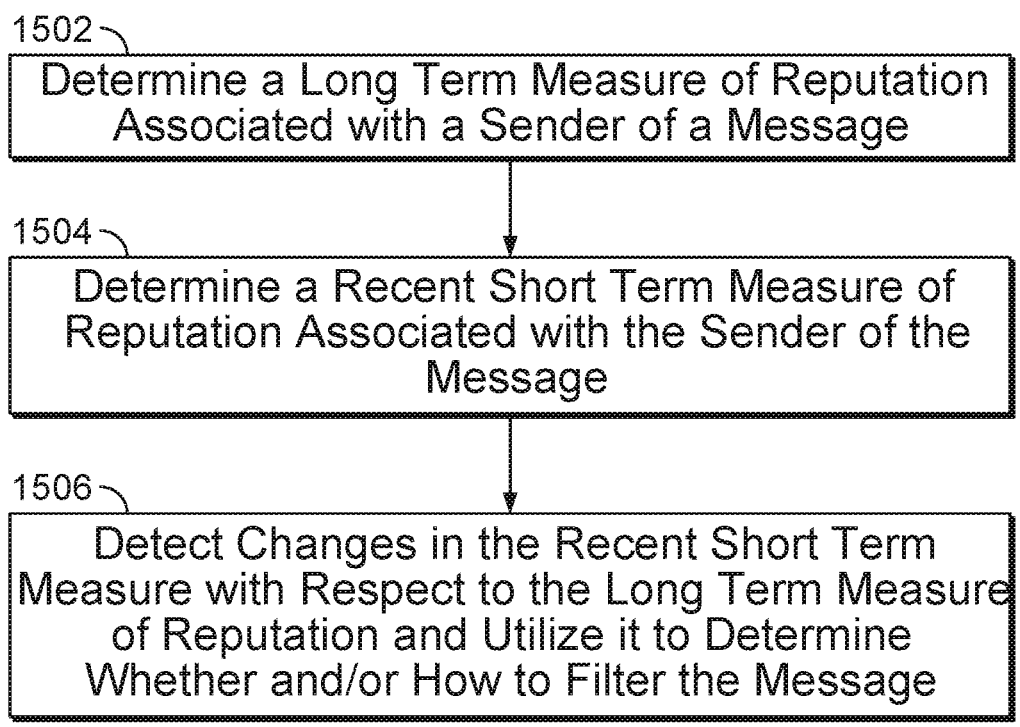
FIG. 15 is a flowchart illustrating an embodiment of a process for determining a change in historical reputation of a sender of a message.

FIG. 15 is a flowchart illustrating an embodiment of a process for determining a change in historical reputation of a sender of a message. The process of FIG. 15 may be at least in part implemented on analysis server 102, gateway 110, and/or message server 106 of FIG. 1. In some embodiments, at least a portion of the process of FIG. 15 is performed in filtering the message in 1006 and/or 1010 of FIG. 10. In some embodiments, at least a portion of the process of FIG. 15 is performed in one or more steps of the process of FIG. 12. For example, at least a portion of process of FIG. 15 is performed in performing the first and/or second risk analysis of the process of FIG. 12. At least a portion of the process of FIG. 15 may be performed in 204, 304, and/or 314 of the processes of FIGS. 2-3B.

At 1502, a long term measure of reputation associated with a sender of a message is determined. The long term measure of reputation may be for a specific address and/or domain of the sender. For example, long term measure of reputation is determined based on the amount of historical message traffic between the sender (or network domain of sender) and the recipient (or network domain of recipient). Large amounts of traffic may correspond to a high long term measure of reputation, unless there is a sufficient portion of the traffic that is flagged as undesirable (e.g., being spam, including virus/malware, etc.). Additionally, a long time period of traffic may correspond to a high long term measure of reputation, unless a sufficient portion is flagged as being undesirable. To the extent that it is available, a large open rate (e.g., the recipient opened the message) or a high response rate (e.g., whether replying to message or selecting links in message) also may correspond to a high long term measure of reputation, unless a sufficient portion is flagged as being undesirable. An example of a "sufficient" portion may mean that a fixed portion of the traffic, such as 2%. The long term measure of reputation may capture historical message traffic within several recent months. In some embodiments, when determining a long term measure of reputation for a domain, individual long term measures of reputation for accounts of the domain may be aggregated to determine the long term measure of reputation for the domain.

At 1504, a recent short term measure of reputation associated with the sender of the message is determined. The recent short term measure of reputation may be for a specific address and/or domain of the sender. The recent short term measure of reputation is determined using the same/similar factors as the long term measure of reputation but within a smaller time window. For example, the recent short term measure of reputation may capture historical message traffic within a day.

The recent short term measure of reputation may be low if a large portion (e.g., 5% of traffic within the time window) of message traffic between the sender (or network domain of sender) and the recipient (or network domain of recipient) is associated with complaints, spam detection, the detection of unwanted URLs, or unwanted attachments. An unwanted URL/attachment is one that is judged likely to be associated with risk, e.g., using a blacklist or an anti-virus scan.

Complaints may correspond to users reporting an email as spam or phish, or placing it in a spam folder. Complaints can either be local (only a very small number of users, such as less than 1% of recipients, report the message) or pervasive (a greater portion of users report the email, e.g., more than 1%).

At 1506, changes in the recent short term measure with respect to the long term measure of reputation are detected and utilized to determine whether and/or how to filter the message. For example, if the sender is associated with a low (bad) long term measure of reputation (e.g., below a threshold) and a low (bad) recent short term measure (e.g., below another threshold), the message from the sender is identified as suspicious and filtered (e.g., blocked and/or modified with a warning). In some embodiments, if the sender is associated with a high (good) long term measure of reputation (e.g., above a first threshold) but low (bad) recent short term measure (e.g., below a second threshold), the message from the sender is identified as likely taken over by a malicious attacker. For example, the message may be filtered (e.g., blocked and/or modified with a warning), may require manual review by an administrator, or require an action by the sender (e.g., require sender to respond to a challenge) prior allowing delivery of the message (e.g., modified message with warning).

In some embodiments, let $R_i$ be a reputation associated with a receiver, and for concreteness, assume that this corresponds to a numeric value between 0 and 1, inclusive. Let $B_i$ be a recent short term measure of reputation associated with an email E received by the same recipient. For concreteness, this is also a value between 0 and 1, inclusive. Here, i is a number corresponding to the recipient. Further, let G be the long term measure of reputation associated with the email E, and may be a number between 0 and 100, for example. The value $SUM(B_i*R_i)/G$ is computed, where SUM corresponds to adding the entries associated with all recipients of E. If $SUM(B_i*R_i)/G > t1$, where $t1$ is a first threshold, then a first action is taken. This action may be to block emails from the sender of E, remove E from the inbox of all recipients, and determine whether any of the users who appear to have opened E have had their computers corrupted or credentials stolen. This can be determined by asking the user, by scanning the user's machine, or by reviewing logs of incoming/outgoing traffic to the user's machine, where this review is preferably automated. Further, the action may involve increasing $R_i$ by 10% for each user who filed a response $B_i$ indicative of a threat. If $SUM(B_i*R_i)/G < t2$, where $t2 < t1$ then the reputation $R_i$ of each user who filed a response $B_i$ indicative of a threat is decreased, e.g., by 5%. If the number of users filing a response $B_i$ is indicative of a threat within a time T of receipt of the email E, then the email is considered to be associated with pervasive badness, otherwise local badness.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving at a recipient system, information of an electronic message to be delivered to an intended recipient, wherein the electronic message has been sent via a network by a message sender prior to being received at the recipient system associated with the intended recipient;
    determining for an original resource identifier included in the electronic message, a corresponding alternative resource identifier that is based on both the specific intended recipient and the original resource identifier and at least in part used to obtain the original resource identifier;
    after receiving the electronic message at the recipient system and regardless of whether the original resource identifier is determined to be associated with a suspected malicious resource, replacing the original resource identifier included in the electronic message with the corresponding alternative resource identifier to generate a modified electronic message;
    allowing the modified electronic message with the alternative resource identifier to be delivered to the intended recipient instead of the electronic message with the original resource identifier, wherein an interaction associated with the original resource identifier is tracked using the alternative resource identifier including by storing for the original resource identifier in a data structure, an entry that includes interaction information and associated context information for a request made using the alternative resource identifier;
    obtaining from the data structure storing the interaction information and the associated context information, entries for the original resource identifier to determine a scoring associated with the original resource identifier; and
    performing an action based on a determination that the scoring meets a threshold criteria, wherein performing the action includes performing one or more of the following: blocking access to the content referenced by the original resource identifier, providing a security warning, providing a modified version of the content referenced by the original resource identifier with modified functionality, logging an event associated with the request made using the alternative resource identifier, or performing an auditing operation.

2. The method of claim 1, wherein the original resource identifier is a URL hyperlink included in a body content of the electronic message, and the alternative resource identifier is generated specifically for the intended recipient of the electronic message.

3. The method of claim 1, wherein the electronic message is to be delivered to a plurality of different intended recipients and a different corresponding alternative resource identifier for the same original resource identifier is generated for each of the different intended recipients.

4. The method of claim 1, wherein the interaction associated with the original resource identifier is tracked including by receiving a notification of the request made using the alternative resource identifier.

5. The method of claim 4, wherein the logging information associated with the request includes recording a time associated with when the request was made.

6. The method of claim 1, wherein a plurality of different interactions associated with the original resource identifier by different recipients of the electronic message is tracked.

7. The method of claim 1, wherein determining the corresponding alternative resource identifier includes searching a data structure using the original resource identifier.

8. The method of claim 1, wherein performing the action includes performing an analysis based at least in part on the tracked interaction.

9. The method of claim 8, wherein performing the analysis includes determining a statistic associated with a likelihood a message recipient will request a content of the original resource identifier.

10. The method of claim 8, wherein performing the analysis includes determining a list of message recipients that requested a content of the original resource identifier.

11. The method of claim 10, further comprising performing a security action for each of the message recipients in the list.

12. The method of claim 1, wherein the recipient system includes one or more of the following: a mail transfer agent device, a mail relay device, a gateway device, a cloud security device, or a local security appliance.

13. The method of claim 1, wherein the corresponding alternative resource identifier includes a domain name associated with a security service, wherein the domain name associated with the security service is not included in the original resource identifier.

14. The method of claim 1, wherein determining the corresponding alternative resource identifier includes determining a handle value corresponding to at least the original resource identifier and including the handle value in the corresponding alternative resource identifier.

15. The method of claim 14, wherein the entry that includes the interaction information and the associated context information corresponds to the handle value.

16. The method of claim 1, wherein determining the corresponding alternative resource identifier includes encrypting at least the original resource identifier to generate an encrypted value and including the encrypted value in the corresponding alternative resource identifier.

17. A system, comprising:
a communication interface configured to receive information of an electronic message to be delivered to an intended recipient, wherein the electronic message has been sent via a network by a message sender prior to being received at the communication interface of the system; and
a processor coupled with the communication interface and configured to:
determine for an original resource identifier included in the electronic message, a corresponding alternative resource identifier that is based on both the specific intended recipient and the original resource identifier and at least in part used to obtain the original resource identifier;
after receiving the electronic message at the recipient system and regardless of whether the original resource identifier is determined to be associated with a suspected malicious resource, replace the original resource identifier included in the electronic message with the corresponding alternative resource identifier to generate a modified electronic message;
allow the modified electronic message with the alternative resource identifier to be delivered to the intended recipient instead of the electronic message with the original resource identifier, wherein an interaction associated with the original resource identifier is tracked using the alternative resource identifier including by being configured to store for the original resource identifier in a data structure, an entry that includes interaction information and associated context information for a request made using the alternative resource identifier;
obtain from the data structure storing the interaction information and the associated context information, entries for the original resource identifier to determine a scoring associated with the original resource identifier; and
perform an action based on a determination that the scoring meets a threshold criteria, wherein performing the action includes performing one or more of the following: blocking access to the content referenced by the original resource identifier, providing a security warning, providing a modified version of the content referenced by the original resource identifier with modified functionality, logging an event associated with the request made using the alternative resource identifier, or performing an auditing operation.

18. The system of claim 17, wherein performing the action includes performing an analysis based at least in part on the tracked interaction.

19. The system of claim 18, wherein performing the analysis includes determining a statistic associated with a likelihood a message recipient will request a content of the original resource identifier.

20. A computer program product, the computer program product being embodied in a non-transitory computer readable storage medium and comprising computer instructions for:
receiving at a recipient system, information of an electronic message to be delivered to an intended recipient, wherein the electronic message has been sent via a network by a message sender prior to being received at the recipient system associated with the intended recipient;
determining for an original resource identifier included in the electronic message, a corresponding alternative resource identifier that is based on both the specific intended recipient and the original resource identifier and at least in part used to obtain the original resource identifier;
after receiving the electronic message at the recipient system and regardless of whether the original resource identifier is determined to be associated with a suspected malicious resource, replacing the original resource identifier included in the electronic message with the corresponding alternative resource identifier to generate a modified electronic message;
allowing the modified electronic message with the alternative resource identifier to be delivered to the intended recipient instead of the electronic message with the original resource identifier, wherein an interaction associated with the original resource identifier is tracked using the alternative resource identifier including by storing for the original resource identifier in a data structure, an entry that includes interaction information and associated context information for a request made using the alternative resource identifier;
obtaining from the data structure storing the interaction information and the associated context information, entries for the original resource identifier to determine a scoring associated with the original resource identifier; and
performing an action based on a determination that the scoring meets a threshold criteria, wherein performing the action includes performing one or more of the following: blocking access to the content referenced by the original resource identifier, providing a security warning, providing a modified version of the content referenced by the original resource identifier with modified functionality, logging an event associated with the request made using the alternative resource identifier, or performing an auditing operation.

\* \* \* \* \*

UNITED STATES PATENT AND TRADEMARK OFFICE
CERTIFICATE OF CORRECTION

PATENT NO. : 10,880,322 B1  
APPLICATION NO. : 16/155739  
DATED : December 29, 2020  
INVENTOR(S) : Bjorn Markus Jakobsson and Patrick Richard Peterson Page 1 of 1

It is certified that error appears in the above-identified patent and that said Letters Patent is hereby corrected as shown below:

On the Title Page
In page 3, Column 2, item (56), U.S. patent documents, cite no. 55, delete "Liebmann" and insert --Liebmann et al--, therefor.
In page 3, Column 2, item (56), U.S. patent documents, cite no. 42, delete "Starink" and insert --Starink et al--, therefor.
In page 3, Column 2, item (56), U.S. patent documents, cite no. 23, delete "Brown" and insert --Brown et al--, therefor.

In the Specification
In Column 22, Line(s) 4, after "BoxTM", insert --)--.
In Column 24, Line(s) 63, before "elements", insert --MUA--.
In Column 25, Line(s) 14, delete "MLA" and insert --MUA--, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*